(12) United States Patent
Yang et al.

(10) Patent No.: US 10,564,807 B2
(45) Date of Patent: Feb. 18, 2020

(54) MESSAGE USER INTERFACES FOR CAPTURE AND TRANSMITTAL OF MEDIA AND LOCATION CONTENT

(71) Applicant: Apple Inc., Cupertino, CA (US)

(72) Inventors: Lawrence Y. Yang, Bellevue, WA (US); Roberto Garcia, Santa Clara, CA (US); Justin Wood, Los Altos, CA (US); Kyle S. Macomber, Los Altos, CA (US); Óscar Morales Vivo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 15/366,763

(22) Filed: Dec. 1, 2016

(65) Prior Publication Data

US 2017/0083202 A1  Mar. 23, 2017

Related U.S. Application Data

(63) Continuation of application No. 14/928,865, filed on Oct. 30, 2015, now Pat. No. 10,416,844, which is a
(Continued)

(51) Int. Cl.
*G06F 3/0481* (2013.01)
*G06F 3/0482* (2013.01)
(Continued)

(52) U.S. Cl.
CPC .......... *G06F 3/0482* (2013.01); *G06F 1/1694* (2013.01); *G06F 3/016* (2013.01);
(Continued)

(58) Field of Classification Search
CPC .... G06F 3/0482; G06F 3/0412; G06F 3/0481; G06F 3/04817; G06F 3/04842; G06F 3/016
See application file for complete search history.

(56) References Cited

U.S. PATENT DOCUMENTS 5,475,653 A   12/1995   Yamada et al.
5,801,700 A   9/1998    Ferguson
(Continued)

FOREIGN PATENT DOCUMENTS

AU    2016102028 B4   7/2017
CN    1852335 A       10/2006
(Continued)

OTHER PUBLICATIONS

Non-Final Office Action received for U.S. Appl. No. 15/425,273, dated Oct. 3, 2018, 10 pages.
(Continued)

*Primary Examiner* — Dino Kujundzic
(74) *Attorney, Agent, or Firm* — Dentons US LLP

(57) ABSTRACT

A device provides user interfaces for displaying messages in a messaging application. The device receives a plurality of messages from a first participant within a time interval and determines whether the plurality of messages meets message grouping criteria. In accordance with a determination that the plurality of messages does not meet the message grouping criteria, the device displays a plurality of separate bounded message areas representing the plurality of messages. In accordance with a determination that the plurality of messages meets the message grouping criteria, the device displays a single group bounded message area representing the plurality of messages.

48 Claims, 60 Drawing Sheets

Related U.S. Application Data continuation of application No. 14/503,376, filed on Sep. 30, 2014, now Pat. No. 9,185,062.

(60) Provisional application No. 62/047,622, filed on Sep. 8, 2014, provisional application No. 62/006,071, filed on May 31, 2014.

(51) Int. Cl.

| | | |
|---|---|---|
| *H04L 12/58* | (2006.01) | |
| *G06F 3/0488* | (2013.01) | |
| *G06F 1/16* | (2006.01) | |
| *G06Q 10/10* | (2012.01) | |
| *H04W 4/02* | (2018.01) | |
| *G06F 3/01* | (2006.01) | |
| *G06F 3/041* | (2006.01) | |
| *G06F 3/0484* | (2013.01) | |
| *G06F 3/0487* | (2013.01) | |
| *G06F 3/16* | (2006.01) | |
| *G06F 3/0485* | (2013.01) | |
| *H04N 5/232* | (2006.01) | |

(52) U.S. Cl.
CPC .......... *G06F 3/0412* (2013.01); *G06F 3/0481* (2013.01); *G06F 3/0485* (2013.01); *G06F 3/0487* (2013.01); *G06F 3/0488* (2013.01); *G06F 3/04817* (2013.01); *G06F 3/04842* (2013.01); *G06F 3/04883* (2013.01); *G06F 3/04886* (2013.01); *G06F 3/16* (2013.01); *G06Q 10/107* (2013.01); *H04L 51/04* (2013.01); *H04L 51/046* (2013.01); *H04L 51/08* (2013.01); *H04L 51/10* (2013.01); *H04L 51/20* (2013.01); *H04L 51/22* (2013.01); *H04L 51/34* (2013.01); *H04N 5/23216* (2013.01); *H04N 5/23293* (2013.01); *H04W 4/02* (2013.01)

(56) References Cited

U.S. PATENT DOCUMENTS

| | | | |
|---|---|---|---|
| 6,002,402 A | 12/1999 | Schacher | |
| 6,014,429 A | 1/2000 | Laporta et al. | |
| 6,191,807 B1 | 2/2001 | Hamada et al. | |
| 6,323,846 B1 | 11/2001 | Westerman et al. | |
| 6,362,842 B1 | 3/2002 | Tahara et al. | |
| 6,570,557 B1 | 5/2003 | Westerman et al. | |
| 6,677,932 B1 | 1/2004 | Westerman | |
| 6,721,784 B1 | 4/2004 | Leonard et al. | |
| 6,809,724 B1 | 10/2004 | Shiraishi et al. | |
| 7,149,893 B1 | 12/2006 | Leonard et al. | |
| 7,365,736 B2 | 4/2008 | Marvit et al. | |
| 7,593,749 B2 | 9/2009 | Vallstrom et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,789,225 B2 | 9/2010 | Whiteis | |
| 7,797,390 B2 | 9/2010 | Hagale et al. | |
| 7,834,861 B2 | 11/2010 | Lee | |
| 7,844,914 B2 | 11/2010 | Andre et al. | |
| 7,908,219 B2 | 3/2011 | Abanami et al. | |
| 7,953,393 B2 | 5/2011 | Chin et al. | |
| 7,957,762 B2 | 6/2011 | Herz et al. | |
| 8,006,002 B2 | 8/2011 | Kalayjian et al. | |
| 8,121,586 B2 | 2/2012 | Araradian et al. | |
| 8,150,930 B2* | 4/2012 | Satterfield ............. G06F 3/0481 709/206 | |
| 8,239,784 B2 | 8/2012 | Hotelling et al. | |
| 8,255,830 B2 | 8/2012 | Ording et al. | |
| 8,279,180 B2 | 10/2012 | Hotelling et al. | |
| 8,285,258 B2 | 10/2012 | Schultz et al. | |
| 8,381,135 B2 | 2/2013 | Hotelling et al. | |
| 8,479,122 B2 | 7/2013 | Hotelling et al. | |
| 8,572,493 B2 | 10/2013 | Qureshi | |
| 8,811,951 B1 | 8/2014 | Faaborg et al. | |
| 8,922,485 B1 | 12/2014 | Lloyd | |
| 9,100,944 B2 | 8/2015 | Newham et al. | |
| 9,185,062 B1 | 11/2015 | Yang et al. | |
| 9,191,988 B2 | 11/2015 | Newham | |
| 9,207,835 B1 | 12/2015 | Yang et al. | |
| 9,400,489 B2 | 7/2016 | Kim et al. | |
| 9,477,208 B2 | 10/2016 | Lee et al. | |
| 9,483,529 B1* | 11/2016 | Pasoi ...................... H04L 51/32 | |
| 9,575,591 B2 | 2/2017 | Yang et al. | |
| 9,998,888 B1 | 6/2018 | Chang et al. | |
| 10,003,938 B2 | 6/2018 | Chang et al. | |
| 2002/0015024 A1 | 2/2002 | Westerman et al. | |
| 2002/0037715 A1 | 3/2002 | Mauney et al. | |
| 2002/0057284 A1 | 5/2002 | Dalby et al. | |
| 2002/0115478 A1 | 8/2002 | Fujisawa et al. | |
| 2002/0120869 A1 | 8/2002 | Engstrom | |
| 2002/0126135 A1* | 9/2002 | Ball ......................... G06F 3/14 345/600 | |
| 2003/0081506 A1 | 5/2003 | Karhu | |
| 2004/0041841 A1 | 3/2004 | LeMogne et al. | |
| 2004/0070511 A1 | 4/2004 | Kim | |
| 2005/0138552 A1* | 6/2005 | Venolia ................. G06Q 10/107 715/273 | |
| 2005/0190059 A1 | 9/2005 | Wehrenberg | |
| 2005/0191159 A1 | 9/2005 | Benko | |
| 2005/0198128 A1 | 9/2005 | Anderson et al. | |
| 2005/0268237 A1 | 12/2005 | Crane et al. | |
| 2006/0017692 A1 | 1/2006 | Wehrenberg et al. | |
| 2006/0019639 A1 | 1/2006 | Adams et al. | |
| 2006/0019649 A1 | 1/2006 | Feinleib et al. | |
| 2006/0026245 A1 | 2/2006 | Cunningham et al. | |
| 2006/0026536 A1 | 2/2006 | Hotelling et al. | |
| 2006/0033724 A1 | 2/2006 | Chaudhri et al. | |
| 2006/0044283 A1 | 3/2006 | Eri et al. | |
| 2006/0092177 A1 | 5/2006 | Blasko | |
| 2006/0195787 A1 | 8/2006 | Topiwala et al. | |
| 2006/0197753 A1 | 9/2006 | Hotelling | |
| 2007/0036300 A1 | 2/2007 | Brown et al. | |
| 2007/0085157 A1 | 4/2007 | Fadell et al. | |
| 2007/0117549 A1 | 5/2007 | Arnos | |
| 2007/0150834 A1 | 6/2007 | Muller et al. | |
| 2007/0150836 A1 | 6/2007 | Deggelmann et al. | |
| 2007/0150842 A1 | 6/2007 | Chaudhri et al. | |
| 2007/0173233 A1 | 7/2007 | Vander Veen et al. | |
| 2007/0216659 A1 | 9/2007 | Amineh | |
| 2007/0236475 A1 | 10/2007 | Wherry | |
| 2008/0014989 A1 | 1/2008 | Sandegard et al. | |
| 2008/0052945 A1 | 3/2008 | Matas et al. | |
| 2008/0055264 A1 | 3/2008 | Anzures et al. | |
| 2008/0057926 A1 | 3/2008 | Forstall et al. | |
| 2008/0070593 A1 | 3/2008 | Altman et al. | |
| 2008/0079589 A1 | 4/2008 | Blackadar et al. | |
| 2008/0091166 A1 | 4/2008 | Fitzgerald et al. | |
| 2008/0165136 A1 | 7/2008 | Christie et al. | |
| 2008/0216022 A1* | 9/2008 | Lorch ................. H04M 1/72555 715/847 | |
| 2008/0320391 A1 | 12/2008 | Lemay et al. | |
| 2009/0005011 A1 | 1/2009 | Christie et al. | |
| 2009/0037536 A1 | 2/2009 | Braam | |
| 2009/0049502 A1 | 2/2009 | Levien et al. | |
| 2009/0051648 A1 | 2/2009 | Shamaie et al. | |
| 2009/0051649 A1 | 2/2009 | Rondel | |
| 2009/0055494 A1 | 2/2009 | Fukumoto et al. | |
| 2009/0164219 A1 | 6/2009 | Yeung et al. | |
| 2009/0177981 A1 | 7/2009 | Christie et al. | |
| 2009/0181726 A1 | 7/2009 | Vargas et al. | |
| 2009/0187842 A1 | 7/2009 | Collins et al. | |
| 2009/0254840 A1 | 10/2009 | Churchill et al. | |
| 2009/0298444 A1 | 12/2009 | Shigeta et al. | |
| 2009/0313582 A1* | 12/2009 | Rupsingh ............ G06F 3/04817 715/835 | |
| 2010/0058231 A1 | 3/2010 | Duarte et al. | |
| 2010/0094809 A1 | 4/2010 | Consul et al. | |
| 2010/0124906 A1 | 5/2010 | Hautala | |

(56) References Cited

U.S. PATENT DOCUMENTS

| | | |
|---|---|---|
| 2010/0125785 A1 | 5/2010 | Moore et al. |
| 2010/0162138 A1* | 6/2010 | Pascal ................. G06Q 10/107 715/758 |
| 2010/0281409 A1 | 11/2010 | Rainisto et al. |
| 2010/0287249 A1 | 11/2010 | Yigang et al. |
| 2010/0325194 A1 | 12/2010 | Williamson et al. |
| 2010/0332518 A1* | 12/2010 | Song ..................... G06F 3/0483 707/769 |
| 2011/0003587 A1 | 1/2011 | Belz et al. |
| 2011/0059769 A1 | 3/2011 | Brunolli |
| 2011/0080356 A1 | 4/2011 | Kang et al. |
| 2011/0096011 A1 | 4/2011 | Suzuki |
| 2011/0151418 A1 | 6/2011 | Delespaul et al. |
| 2011/0157046 A1 | 6/2011 | Lee et al. |
| 2011/0164058 A1 | 7/2011 | Lemay |
| 2011/0167383 A1 | 7/2011 | Schuller et al. |
| 2011/0183650 A1 | 7/2011 | McKee et al. |
| 2011/0225547 A1 | 9/2011 | Fong et al. |
| 2011/0239158 A1 | 9/2011 | Barraclough et al. |
| 2011/0254684 A1 | 10/2011 | Antoci et al. |
| 2011/0265041 A1 | 10/2011 | Ganetakos et al. |
| 2011/0276901 A1* | 11/2011 | Zambetti ............ H04L 12/1827 715/753 |
| 2011/0279323 A1 | 11/2011 | Hung et al. |
| 2011/0306393 A1 | 12/2011 | Goldman et al. |
| 2011/0316769 A1 | 12/2011 | Boettcher et al. |
| 2012/0008526 A1 | 1/2012 | Borghei |
| 2012/0022872 A1 | 1/2012 | Gruber et al. |
| 2012/0102437 A1 | 4/2012 | Worley et al. |
| 2012/0105358 A1 | 5/2012 | Momeyer et al. |
| 2012/0108215 A1 | 5/2012 | Kameli et al. |
| 2012/0117507 A1 | 5/2012 | Tseng et al. |
| 2012/0131458 A1 | 5/2012 | Hayes et al. |
| 2012/0149405 A1* | 6/2012 | Bhat ....................... H04L 51/26 455/466 |
| 2012/0150970 A1 | 6/2012 | Peterson et al. |
| 2012/0158511 A1 | 6/2012 | Lucero et al. |
| 2012/0172088 A1 | 7/2012 | Kirch et al. |
| 2012/0216127 A1 | 8/2012 | Meyr |
| 2012/0218177 A1 | 8/2012 | Pang et al. |
| 2012/0239949 A1 | 9/2012 | Kalyanasundaram et al. |
| 2012/0302256 A1 | 11/2012 | Pat et al. |
| 2012/0304084 A1 | 11/2012 | Kim et al. |
| 2012/0306770 A1 | 12/2012 | Moore et al. |
| 2013/0002580 A1 | 1/2013 | Sudou |
| 2013/0007665 A1 | 1/2013 | Chaudhri et al. |
| 2013/0026293 A1 | 1/2013 | Schneider et al. |
| 2013/0063364 A1 | 3/2013 | Moore |
| 2013/0065566 A1 | 3/2013 | Gisby et al. |
| 2013/0067027 A1 | 3/2013 | Song et al. |
| 2013/0091298 A1 | 4/2013 | Ozzie et al. |
| 2013/0091443 A1* | 4/2013 | Park ........................ G06F 3/0485 715/758 |
| 2013/0093833 A1 | 4/2013 | Al-Asaaed et al. |
| 2013/0120106 A1 | 5/2013 | Cauwels et al. |
| 2013/0159941 A1 | 6/2013 | Langlois et al. |
| 2013/0212470 A1 | 8/2013 | Karunamuni et al. |
| 2013/0222236 A1 | 8/2013 | Gärdenfors et al. |
| 2013/0234924 A1 | 9/2013 | Janefalkar et al. |
| 2013/0243924 A1 | 9/2013 | Bhandari et al. |
| 2013/0244633 A1 | 9/2013 | Jacobs et al. |
| 2013/0254714 A1 | 9/2013 | Shin et al. |
| 2013/0262298 A1 | 10/2013 | Morley et al. |
| 2013/0275924 A1 | 10/2013 | Weinberg et al. |
| 2013/0307809 A1 | 11/2013 | Sudou |
| 2013/0310089 A1 | 11/2013 | Gianoukos et al. |
| 2013/0321314 A1 | 12/2013 | Oh et al. |
| 2013/0322634 A1 | 12/2013 | Bennett et al. |
| 2013/0346882 A1 | 12/2013 | Shiplacoff et al. |
| 2013/0347018 A1 | 12/2013 | Limp et al. |
| 2014/0032682 A1 | 1/2014 | Prado et al. |
| 2014/0055552 A1 | 2/2014 | Song et al. |
| 2014/0058873 A1 | 2/2014 | Sorensen et al. |
| 2014/0059448 A1* | 2/2014 | Lee .......................... H04L 51/00 715/752 |
| 2014/0066105 A1 | 3/2014 | Bridge et al. |
| 2014/0073256 A1 | 3/2014 | Newham et al. |
| 2014/0085487 A1 | 3/2014 | Park et al. |
| 2014/0136990 A1 | 5/2014 | Gonnen et al. |
| 2014/0181183 A1 | 6/2014 | Houjou et al. |
| 2014/0189533 A1 | 7/2014 | Krack et al. |
| 2014/0222933 A1* | 8/2014 | Stovicek ........... H04M 1/72547 709/206 |
| 2014/0239733 A1 | 8/2014 | Mach et al. |
| 2014/0240122 A1 | 8/2014 | Roberts et al. |
| 2014/0344711 A1* | 11/2014 | Hallerstrom Sjostedt ................... H04L 51/22 715/752 |
| 2014/0365944 A1 | 12/2014 | Moore et al. |
| 2015/0007049 A1 | 1/2015 | Langlois |
| 2015/0040029 A1 | 2/2015 | Koum et al. |
| 2015/0089660 A1 | 3/2015 | Song et al. |
| 2015/0100537 A1 | 4/2015 | Grieves et al. |
| 2015/0102992 A1 | 4/2015 | Klement et al. |
| 2015/0172393 A1 | 6/2015 | Oplinger et al. |
| 2015/0185849 A1 | 7/2015 | Levesque et al. |
| 2015/0188869 A1* | 7/2015 | Gilad ...................... H04L 51/22 715/752 |
| 2015/0248389 A1 | 9/2015 | Kahn et al. |
| 2015/0264303 A1 | 9/2015 | Chastney et al. |
| 2015/0271120 A1* | 9/2015 | Langholz ............... H04L 51/16 709/206 |
| 2015/0286387 A1 | 10/2015 | Gu et al. |
| 2015/0286391 A1 | 10/2015 | Jacobs et al. |
| 2015/0312185 A1 | 10/2015 | Langholz et al. |
| 2015/0331881 A1 | 11/2015 | Myles |
| 2015/0350141 A1 | 12/2015 | Yang et al. |
| 2016/0036996 A1 | 2/2016 | Midholt et al. |
| 2016/0041597 A1 | 2/2016 | Graham et al. |
| 2016/0054841 A1 | 2/2016 | Yang et al. |
| 2016/0062540 A1 | 3/2016 | Yang et al. |
| 2016/0062570 A1 | 3/2016 | Dascola et al. |
| 2016/0065707 A1 | 3/2016 | Yang et al. |
| 2016/0065708 A1 | 3/2016 | Yang et al. |
| 2016/0066277 A1 | 3/2016 | Yang et al. |
| 2016/0073223 A1 | 3/2016 | Woolsey et al. |
| 2016/0165600 A1* | 6/2016 | Choi ...................... H04L 51/34 370/336 |
| 2016/0277885 A1 | 9/2016 | Shan et al. |
| 2016/0294958 A1 | 10/2016 | Zhang et al. |
| 2016/0295384 A1 | 10/2016 | Shan et al. |
| 2016/0299526 A1 | 10/2016 | Inagaki et al. |
| 2016/0342141 A1 | 11/2016 | Koumaiha |
| 2017/0048686 A1 | 2/2017 | Chang et al. |
| 2017/0083189 A1 | 3/2017 | Yang et al. |
| 2017/0147197 A1 | 5/2017 | Yang et al. |
| 2017/0153795 A1 | 6/2017 | Yang et al. |
| 2017/0220212 A1 | 8/2017 | Yang et al. |
| 2018/0146349 A1 | 5/2018 | Chang et al. |
| 2018/0181185 A1 | 6/2018 | Graham et al. |
| 2018/0270627 A1 | 9/2018 | Chang et al. |
| 2019/0158645 A1 | 5/2019 | Yang et al. |

FOREIGN PATENT DOCUMENTS

| | | |
|---|---|---|
| CN | 101276255 A | 10/2008 |
| CN | 101390371 A | 3/2009 |
| CN | 101873386 A | 10/2010 |
| CN | 102111505 A | 6/2011 |
| CN | 201928419 U | 8/2011 |
| CN | 102695302 A | 9/2012 |
| CN | 103207674 A | 7/2013 |
| CN | 103309606 A | 9/2013 |
| CN | 103440247 A | 12/2013 |
| CN | 103500079 A | 1/2014 |
| CN | 103576902 A | 2/2014 |
| CN | 103581544 A | 2/2014 |
| CN | 103583031 A | 2/2014 |
| CN | 103677520 A | 3/2014 |
| CN | 103959751 A | 7/2014 |
| CN | 104205785 A | 12/2014 |

(56) References Cited

FOREIGN PATENT DOCUMENTS

| | | |
|---|---|---|
| CN | 205263700 U | 5/2016 |
| EP | 1885109 A2 | 2/2008 |
| EP | 2574026 A1 | 3/2013 |
| EP | 2582120 A1 | 4/2013 |
| EP | 2610701 A1 | 7/2013 |
| EP | 2610701 A9 | 4/2014 |
| EP | 2849042 A1 | 3/2015 |
| JP | 11-45117 A | 2/1999 |
| JP | 2002-366485 A | 12/2002 |
| JP | 2006-72489 A | 3/2006 |
| JP | 2006-079427 A | 3/2006 |
| JP | 2006-113637 A | 4/2006 |
| JP | 2006-129429 A | 5/2006 |
| JP | 2010-503126 A | 1/2010 |
| JP | 2010-503332 A | 1/2010 |
| JP | 2011-107823 A | 6/2011 |
| JP | 2012-508530 A | 4/2012 |
| JP | 2012-198369 A | 10/2012 |
| JP | 2013-48389 A | 3/2013 |
| JP | 2014-057129 A | 3/2014 |
| KR | 10-2004-0089329 A | 10/2004 |
| TW | 200532429 A | 10/2005 |
| WO | 2008/030972 A1 | 3/2008 |
| WO | 2009/071112 A1 | 6/2009 |
| WO | 2010/054373 A2 | 5/2010 |
| WO | 2012128824 A1 | 9/2012 |
| WO | 2012/170446 A2 | 12/2012 |
| WO | 2013093558 A1 | 6/2013 |
| WO | 2013/169842 A2 | 11/2013 |
| WO | 2013/169865 A2 | 11/2013 |
| WO | 2013169875 A2 | 11/2013 |
| WO | 2014/083001 A2 | 6/2014 |
| WO | 2014105276 A1 | 7/2014 |
| WO | 2015038684 A1 | 3/2015 |
| WO | 2015120358 A1 | 8/2015 |
| WO | 2016/036472 A1 | 3/2016 |

OTHER PUBLICATIONS

Decision to Grant received for Danish Patent Application No. PA201770126, dated Mar. 27, 2018, 2 pages.
Non-Final Office Action received for U.S. Appl. No. 14/928,865, dated Mar. 27, 2018, 15 pages.
Notice of Acceptance received for Australian Patent Application No. 2015312369, dated Mar. 21, 2018, 3 pages.
Office Action received for Chinese Patent Application No. 201510290133.1, dated Feb. 9, 2018, 10 pages (5 pages of English Translation and 5 pages of Official Copy).
Office Action received for Chinese Patent Application No. 201510291012.9, dated Feb. 8, 2018, 10 pages (5 pages of English Translation and 5 pages of Official Copy).
Notice of Allowance received for Japanese Patent Application No. 2018-072632, dated Dec. 7, 2018, 4 pages (1 page of English Translation and 3 pages of Official Copy).
Basu, Saikat, "MS Outlook Tip: How to Automatically Organize Incoming Emails", Available online at <http://www.makeuseof.com/tag/ms-outlook-productivity-tip-how-to-move-emails-to-indivicual-folders-automatically/>, Sep. 27, 2009, pp. 1-6.
"How to Move Mail to Different Folders in Gmail", Available online at <https://web.archive.org/web/20140731230338/http://www.wikihow.com/Move-Mail-to-Different-Folders-in-Gmail>, Jul. 31, 2014, pp. 1-4.
Non-Final Office Action received for U.S. Appl. No. 14/841,608, dated Apr. 12, 2017, 9 pages.
Office Action received for Australian Patent Application No. 2017100198, dated Apr. 20, 2017, 4 pages.
Office Action received for Danish Patent Application No. PA201770089, dated Apr. 25, 2017, 10 pages.
Office Action received for German Patent Application No. 212015000194.6, dated Mar. 16, 2017, 2 pages (1 pages of English Translation and 1 page of Official Copy).

Office Action received for European Patent Application No. 15759981.2, dated May 16, 2018, 6 pages.
Office Action received for Japanese Patent Application No. 2018-072632, dated Jul. 9, 2018, 5 Pages (2 Pages of English Translation and 3 pages of Official Copy).
Mobile How to, "How to Send a Picture Message/MMS—Samsung Galaxy Note 3", Online Available at: https://www.youtube.com/watch?v=-3d0z8-KeDw, Nov. 3, 2013, 1 page.
Office Action received for Australian Patent Application No. 2016102029, dated Feb. 22, 2017, 4 pages.
Office Action received for Danish Patent Application No. PA201770126, dated Oct. 18, 2017, 3 pages.
International Preliminary Report on Patentability received for PCT Patent Application No. PCT/US2016/046828, dated Mar. 1, 2018, 19 pages.
Notice of Allowance received for Taiwanese Patent Application No. 104128704, dated Feb. 21, 2018, 5 pages (2 pages of English Translation and 3 pages of Official copy).
International Preliminary Report on Patentability received for PCT Patent Application No. PCT/US2015/043487, dated Feb. 16, 2017, 13 pages.
International Search Report and Written Opinion received for PCT Patent Application No. PCT/US2016/046828, dated Dec. 15, 2016, 22 pages.
Invitation to Pay Additional Fees received for PCT Patent Application No. PCT/US2016/046828, dated Sep. 23, 2016, 2 pages.
Non-Final Office Action received for U.S. Appl. No. 14/841,623, dated Feb. 2, 2017, 17 pages.
Non-Final Office Action received for U.S. Appl. No. 15/142,661, dated Jan. 25, 2017, 29 pages.
Notice of Allowance received for U.S. Appl. No. 14/838,235, dated Dec. 29, 2016, 4 pages.
Office Action received for Australian Patent Application No. 2016102028, dated Feb. 13, 2017, 4 pages.
Office Action received for Chinese Patent Application No. 201620393549.6, dated Jan. 13, 2017, 2 Pages (Official Copy only). (See Communication Under 37 CFR § 1.98(a)(3)).
Office Action received for Chinese Patent Application No. 201620393748.7, dated Jan. 13, 2017, 2 Pages (Official Copy only). (See Communication Under 37 CFR § 1.98(a)(3)).
Final Office Action received for U.S. Appl. No. 14/503,355, dated Sep. 8, 2017, 25 pages.
Final Office Action received for U.S. Appl. No, 14/841,623, dated Sep. 5, 2017, 16 pages.
Notice of Allowance received for Chinese Patent Application No. 201620830403.3, dated Sep. 8, 2017, 1 page (Official copy only) (See Communication under 37 CFR § 1.98(a) (3)).
Notice of Allowance received for U.S. Appl. No. 15/142,661, dated Oct. 4, 2017, 23 pages.
Office Action received for Australian Patent Application No. 2017100760, dated Aug. 10, 2017, 4 pages.
Office Action received for Japanese Patent Application No. 2017-510297, dated Jul. 10, 2017, 10 pages (5 pages of English Translation and 5 pages of Official Copy).
Office Action received for Taiwanese Patent Application No. 104128704, dated Jul. 31, 2017, 7 pages (3 pages of English Translation and 4 pages of Official Copy).
How to use popular SNS confidence (wechat) in China 2 _ voice message, press together, shake function etc., Available at "http://seechina365.com/2014/04/05/wechat02/", Apr. 5, 2014, 27 pages (14 pages of English Translation and 13 pages of Official Copy).
Notice of Allowance received for U.S. Appl. No. 15/142,661, dated Feb. 15, 2018, 9 pages.
Office Action received for Australian Patent Application No. 2017100760, dated Jan. 30, 2018, 3 pages.
Office Action received for European Patent Application No. 15729286.3, dated Feb. 7, 2018, 7 pages.
Office Action received for European Patent Application No. 15728307.8, dated Feb. 8, 2018, 7 pages.
WhatsApp"users over 400 million people! I tried to investigate the most used messaging application in the world", Available at "http://www.appps.jp/2128786/", Jan. 24, 2014, 10 pages (2 pages of English Translation and 8 pages of Official Copy).

(56) References Cited

OTHER PUBLICATIONS

Airize, "Notification & Control Center Problem Issue Solution", Available online at :—"https://www.youtube.com/watch?v=K0zCueYlaTA", Dec. 6, 2013, 1 page.
Iosvlog Daily, "iOS 7 Notification Center Complete Walkthrough", Available online at :—"https://www.youtube.com/watch?v=gATXto42LA", Jun. 10, 2013, 1 page.
Leonard, Jonathan Oh, "How to: Dismiss Banner Notifications or Toast Notifications on ios7", Available online at :—"https://www.youtube.com/watch?v=vSjHnBFIW_M", Dec. 17, 2013, 1 page.
Lewis, Jeffery, "iOS Notification Banner Pull Down to Notification Center in iOS 7 Beta 5", Available online at :—"https://www.youtube.com/watch?v=nP0s6ETPxDg", Aug. 6, 2013, 1 page.
Office Action received for Australian Patent Application No. 2017100197, dated Apr. 28, 2017, 4 Pages.
Office Action received for Taiwanese Patent Application No. 104128519, dated Mar. 29, 2017, 16 pages (7 pages of English Translation and 9 pages of Official Copy).
Patterson, Ben, "iOS 7 tip: Alerts, Banners, and Badgesâwhats the Difference?", Available online at :—"https://web.archive.org/web/20140128072440/http://heresthethingblog.com/2014/01/22/ios-7-tip-whats-difference-alert/ ", Jan. 22, 2014, 5 Pages.
Search Report received for Danish Patent Application No. PA201770125, dated May 5, 2017, 10 pages.
Search Report received for Danish Patent Application No. PA201770126, dated Apr. 26, 2017, 8 Pages.
Office Action received for European Patent Application No. 15759981.2, dated Apr. 19, 2018, 6 pages.
Extended European Search Report received for European Patent Application No. 18170262.2, dated Jul. 25, 2018, 8 pages.
Office Action received for Danish Patent Application No. PA201770125, dated Jul. 20, 2018, 2 pages.
Office Action received for European Patent Application No. 15759981.2, dated Aug. 6, 2018, 10 pages.
Notice of Allowance received for Korean Patent Application No. 10-2017-7005628, dated Jun. 18, 2018, 5 pages (2 pages of English Translation and 3 pages of Official Copy).
Search Report and Opinion received for Netherlands Patent Applicaiton No. 2015354, dated Jun. 22, 2017, 24 pages (10 pages of English Translation and 14 pages of Official Copy).
Notice of Allowance received for Taiwanese Patent Application No. 104128519, dated Nov. 20, 2017, 5 pages (2 page of English Translation and 3 pages of Official Copy).
Office Action received for Japanese Patent Application No. 2018-018497, dated Dec. 10, 2018, 8 pages (4 pages of English Translation and 4 pages of Official Copy).
Office Action Received for Korean Patent Application No. 10-2018-7027006, dated Jan. 14, 2019, 6 pages (2 pages of English Translation and 4 pages of Official Copy).
CNET Download.Com, "WeChat for Android", Available at <http://download.cnet.com/WeChat/3000-2150_4-75739423.html>, 6 pages.
Digitalstreetsa.com, "Why WeChat might kill Whatsapp's future", Available at <http://digitalstreetsa.com/why-wechatmight-kill-whatsapps-future/>, 10 pages.
Final Office Action received for U.S. Appl. No. 14/838,235, dated Jun. 15, 2016, 18 pages.
Grothaus, Michael, "WhatsApp Introduces Major New Audio Features", Engadget, Available at <http://www.engadget.com/2013/08/07/whatsapp-introduces-major-new-audio-features/>, 4 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
International Search Report and Written Opinion received for PCT Patent Application No. PCT/US2015/043487, dated Jan. 29, 2016, 19 pages.
International Search Report and Written Opinion received for PCT Patent Application No. PCT/US2015/044083, dated Feb. 4, 2016, 33 pages.
International Search Report and Written Opinion received for PCT Patent Application No. PCT/US2015/046787, dated Apr. 1, 2016, 26 pages.
Invitation to Pay Additional Fees and Partial Search Report received for PCT Patent Application No. PCT/US2015/043487, dated Nov. 9, 2015, 4 pages.
Invitation to Pay Additional Fees received for PCT Patent Application No. PCT/US2015/044083, dated Nov. 4, 2015, 11 pages.
Invitation to Pay Additional Fees received for PCT Patent Application No. PCT/US2015/046787, dated Dec. 15, 2015, 8 pages.
Non Final Office Action received for U. S. Appl. No. 14/817,572, dated Sep. 12, 2016, 9 pages.
Non Final Office Action received for U.S. Appl. No. 14/503,386, dated Jan. 7, 2015, 19 pages.
Non-Final Office Action received for U.S. Appl. No. 14/503,376, dated Dec. 22, 2014, 21 pages.
Non-Final Office Action received for U.S. Appl. No. 14/838,235, dated Jan. 5, 2016, 3 pages.
Norman, Don, "Affordances and Design", Jng.org, Available at <http://jnd.org/dn.mss/affordances_and.html>, 5 pages.
Notice of Allowance received for Chinese Patent Application No. 201520365358.4, dated Nov. 20, 2015, 4 pages.
Notice of Allowance received for Chinese Patent Application No. 201520365843.1, dated Feb. 15, 2016, 5 pages.
Notice of Allowance received for Chinese Patent Application No. 201520669842.6, dated May 18, 2016, 4 pages.
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Notice of Allowance received for U.S. Appl. No. 14/503,386, dated Jul. 30, 2015, 12 pages.
Notice of Allowance received for U.S. Appl. No. 14/503,386, dated Sep. 24, 2015, 5 pages.
Notice of Allowance received for U.S. Appl. No. 14/838,235, dated Oct. 4, 2016, 7 pages.
Office Action received for Australian Patent Application No. 2015100711, dated Jul. 27, 2015, 7 pages.
Office Action received for Australian Patent Application No. 2015100711, dated Nov. 19, 2015, 6 pages.
Office Action received for Australian Patent Application No. 2015101188, dated Apr. 14, 2016, 3 pages.
Office Action received for Chinese Patent Application No. 201520365358.4, dated Aug. 11, 2015, 4 pages.
Office Action received for Chinese Patent Application No. 201520365843.1, dated Aug. 25, 2015, 4 pages.
Office Action received for Chinese Patent Application No. 201520365843.1, dated Nov. 16, 2015, 2 pages.
Office Action received for Chinese Patent Application No. 201520669842.6, dated Dec. 4, 2015, 7 pages.
Office Action received for Chinese Patent Application No. 201620393549.6, dated Aug. 18, 2016, 2 pages.
Office Action received for Chinese Patent Application No. 201620393748.7, dated Aug. 18, 2016, 2 pages.
Office Action received for Danish Patent Application No. PA201570550, dated Dec. 7, 2015, 6 pages.
Office Action received for Danish Patent Application No. PA201570550, dated Jan. 19, 2016, 2 pages.
Office Action received for Danish Patent Application No. PA201570550, dated Oct. 19, 2016, 3 pages.
S., Rohan, "WeChat Review—Communication Application with Screenshots", Absolute Blogger, Available at <http://www.absoluteblogger.com/2012/10/wechat-review-communication-application.html>, 5 pages.
Samsung Gear 2, "User Manual", Available online at <http://wvvw.manualslib.com/download/754923/Samsung-Gear-2.html>, pp. 1-97.
Samsung, "SM-R380", User Manual, 2014, 78 pages.

(56) References Cited

OTHER PUBLICATIONS

"WeChat TVC—Hold to Talk", YouTube video: https://www.youtube.com/watch?v=E_UxteOWVSo, 1 page.
Wechat Wiki, "WeChat Wiki", Available on http://web.archive.org/web/20130514131044/http://wechat.wikia.com/wiki/WeChat_Wiki (Last Accessed on Jan. 4, 2014), 12 pages.
Office Action received for Korean Patent Application No.10-2017-7005628, dated May 10, 2017, 12 pages (5 pages of English Translation and 7 pages of Official Copy).
Notice of Allowance received for U.S. Appl. No. 14/841,608, dated Nov. 14, 2017, 5 pages.
Notice of Allowance received for U.S. Appl. No. 14/817,572, dated Nov. 30, 2017, 26 pages.
Intention to Grant received for Denmark Patent Application No. PA201570550, dated Dec. 22, 2016, 2 pages.
International Preliminary Report on Patentability received for PCT Application No. PCT/US2015/032309, dated Dec. 15, 2016, 8 pages.
International Preliminary Report on Patentability received for PCT Patent Application No. PCT/US2015/032305, dated Dec. 15, 2016, 8 pages.
Non-Final Office Action received for U.S. Appl. No. 14/503,355, dated Dec. 30, 2016, 23 pages.
Office Action received for Taiwanese Patent Application No. 104128704, dated Nov. 2, 2016, 12 pages (5 pages of English Translation and 7 pages of Official Copy).
"Samsung Gear 2 User Manual", Available at http://www.slideshare.net/badaindonesia/samsung-gear-2-user-manual, 5 pages.
Final Office Action received for U.S. Appl. No. 14/928,865, dated Dec. 5, 2018, 15 pages.
Non-Final Office Action received for U.S. Appl. No. 15/985,570, dated Aug. 16, 2018, 23 pages.
Notice of Allowance received for U.S. Appl. No. 15/876,673, dated May 4, 2018, 27 pages.
Office Action received for Taiwanese Patent Application No. 104107332, dated Oct. 29, 2018, 12 pages (5 pages of English Translation and 7 pages of Official Copy).
Office Action Received for Chinese Patent Application No. 201620830403.3, dated Jun. 7, 2017, 1 page (Official Copy only) (See Communication under 37 CFR § 1.98(a) (3)).
Iphone, "User Guide for iOS 7.1 Software", Mar. 2014, 162 pages.
Non-Final Office Action received for U.S. Appl. No. 14/841,614, dated Jul. 27, 2017, 13 pages.
Samsung, "SM-G900F User Manual", English (EU). Rev.1.0, Mar. 2014, 249 pages.
Non-Final Office Action received for U.S. Appl. No. 14/503,355, dated Sep. 4, 2018, 25 pages.
Office Action received for Australian Patent Application No. 2018204430, dated Aug. 15, 2018, 5 pages.
Office Action received for Chinese Patent Application No. 201510549056.7, dated Aug. 7, 2018, 7 pages (2 pages of English Translation and 5 pages of Official Copy).
Final Office Action received for U.S. Appl. No. 14/841,614, dated May 10, 2018, 13 pages.
Notice of Allowance received for Japanese Patent Application No. 2017-510297, dated May 7, 2018, 4 pages (1 page of English Translation and 3 pages of Official copy).
Office Action received for Japanese Patent Application No. 2017-514992, dated Apr. 6, 2018, 11 pages (6 pages of English Translation and 5 Page of Official Copy).
Final Office Action received for U.S. Appl. No. 14/817,572, dated Mar. 23, 2017, 14 pages.
International Preliminary Report on Patentability received for PCT Patent Application No. PCT/US2015/044083, dated Mar. 16, 2017, 24 pages.
International Preliminary Report on Patentability received for PCT Patent Application No. PCT/US2015/046787, dated Mar. 16, 2017, 19 pages.
Notice of Allowance received for Danish Patent Application No. PA201570550, dated Mar. 20, 2017, 2 pages.

Office Action received for Australian Patent Application No. 2015312369, dated Mar. 29, 2017, 3 Pages.
Certificate of Examination received for Australian Patent Application No. 2017100760 dated Feb. 9, 2018, 2 pages.
Notice of Acceptance received for Australian Patent Application No. 2015267259, dated Jan. 30, 2018, 3 pages.
Notice of Acceptance received for Australian Patent Application No. 2015267260, dated Jan. 30, 2018, 3 pages.
Notice of Allowance received for U.S. Appl. No. 14/841,623, dated Feb. 23, 2018, 8 pages.
Office Action received for Korean Patent Application No. 10-2017-7005628, dated Jan. 30, 2018, 6 pages (2 pages of English translation and 4 pages of official copy).
Notice of Allowance received for U.S. Appl. No. 14/841,614, dated Oct. 24, 2018, 10 pages.
Extended European Search Report received for European Patent Application No. 17167629.9, dated Jun. 2, 2017, 7 pages.
Non-Final Office Action received for U.S. Appl. No. 15/431,435, dated Jun. 8, 2017, 13 pages.
Office Action received for Australian Patent Application No. 2015267259, dated Jun. 2, 2017, 2 pages.
Office Action received for Australian Patent Application No. 2015267260, dated Jun. 2, 2017, 2 pages.
Office Action received for Chinese Patent Application No. 201620830403.3, dated Mar. 7, 2017, 1 page (Only Official Copy). {See Communication under 37 CFR § 1.98(a) (3)}.
Notice of Allowance received for Chinese Patent Application No. 201510290133.1, dated Jan. 9, 2019, 2 pages (1 page of English Translation and 1 page of Official Copy).
Intention to Grant received for Denmark Patent Application No. PA201770126, dated Jan. 19, 2018, 2 pages.
Notice of Allowance received for Japanese Patent application No. 2017514993, dated Jan. 12, 2018, 4 pages (1 page of English Translation and 3 pages of Official copy).
Notice of Allowance received for U.S. Appl. No. 15/431,435, dated Jan. 23, 2018, 8 pages.
Office Action received for Chinese Patent Application No. 2015105490567, dated Nov. 24, 2017, 15 pages (6 pages of English Translation and 9 pages of Official Copy).
Office Action received for Denmark Patent Application No. PA201770125, dated Jan. 26, 2018, 5 pages.
Office Action received for Japanese Patent Application No. 2017-510297, dated Dec. 4, 2017, 5 pages (2 page of English Translation and 3 pages of Official copy).
Supplemental Notice of Allowance received for U.S. Appl. No. 14/841,608, dated Jan. 25, 2018, 2 pages.
Notice of Acceptance received for Australian Patent Application No. 2018204430, dated Jun. 26, 2019, 3 pages.
Notice of Allowance received for Japanese Patent Application No. 2018-018497, dated Jun. 21, 2019, 4 pages (1 page of English Translation and 3 pages of Official Copy).
Notice of Allowance received for Taiwanese Patent Application No. 104107332, dated Jun. 21, 2019, 5 pages (2 pages of English Translation and 3 pages of Official Copy).
Office Action received for European Patent Application No. 15760008.1, dated Jul. 16, 2019, 9 pages.
Summons to Attend Oral Proceedings received for European Patent Application No. 15728307.8, dated Jun. 28, 2019, 10 pages.
Summons to Attend Oral Proceedings received for European Patent Application No. 15729286.3, dated Jun. 27, 2019, 9 pages.
Office Action received for Chinese Patent Application No, 201710267617.3, dated Jul. 10, 2019, 18 pages (4 pages of English Translation and 14 pages of Official copy).
Notice of Allowance received for Korean Patent Application No. 10-2018-7027006, dated May 23, 2019, 4 pages (1 pages of English Translation and 3 pages of Official Copy).
Office Action received for Chinese Patent Application No, 201580047640.0, dated Aug. 5, 2019, 18 pages (7 pages of English Translation and 11 pages of Official Copy).
Intention to Grant received for European Patent Application No. 15759981.2, dated Mar. 21, 2019, 8 pages.
Notice of Allowance received for U.S. Appl. No. 14/928,865, dated Apr. 3, 2019, 7 pages.

(56) References Cited

OTHER PUBLICATIONS

Office Action received for Australian Patent Application No. 2018203215, dated Mar. 29, 2019, 3 pages.
Office Action received for Chinese Patent Application No. 201510549056.7, dated Mar. 15, 2019, 7 pages (3 pages of English Translation and 4 pages of Official Copy).
Notice of Allowance received for Japanese Patent Application No. 2017-514992, dated Feb. 15, 2019, 4 pages (1 page of English Translation and 3 pages of Official Copy).
Notice of Allowance received for U.S. Appl. No. 15/425,273, dated Mar. 7, 2019, 8 pages.
Notice of Allowance received for U.S. Appl. No. 15/985,570, dated Mar. 13, 2019, 22 pages.
Search Report and Opinion received for Netherlands Patent Application No. 2019878, dated Apr. 6, 2018, 24 pages (12 pages of English Translation and 12 pages of Official Copy).
Corrected Notice of Allowance received for U.S. Appl. No. 14/928,865, dated Aug. 5, 2019, 2 pages.
Intention to Grant received for European Patent Application No. 15759981.2, dated Aug. 12, 2019, 8 pages.
Notice of Allowance received for U.S. Appl. No. 14/928,865, dated Jul. 22, 2019, 7 pages.
Office Action received for Chinese Patent Application No. 201580029071.7, dated Jul. 2, 2019, 29 pages (8 pages of English Translation and 21 pages of Official Copy).
Non-Final Office Action received for U.S. Appl. No. 15/902,401, dated Jul. 19, 2019, 11 pages.
Notice of Allowance received for Chinese Patent Application No. 201510549056.7, dated Jul. 2, 2019, 2 pages (1 page of English Translation and 1 page of Official Copy).
Corrected Notice of Allowance received for U.S. Appl. No. 14/928,865, dated May 16, 2019, 2 pages.
Final Office Action received for U.S. Appl. No. 14/503,355, dated May 20, 2019, 27 pages.
Non-Final Office Action received for U.S. Appl. No. 15/366,890, dated May 8, 2019, 16 pages.
Office Action received for Chinese Patent Application No. 201580046788.2, dated Apr. 15, 2019, 13 pages (6 pages of English Translation and 7 pages of Official Copy).
Office Action received for European Patent Application No. 18170262.2, dated May 16, 2019, 6 pages.
Office Action received for European Patent Application No. 18170262.2, dated May 27, 2019, 6 pages.
Ambrogi, Robert, "Send Secure, Self-Destructing Messages with Wickr", LawSites Blog, Available online at: https://www.lawsitesblog.com/2013/11/send-secure-self-destructing-messages-wickr.html, Nov. 5, 2013, 3 pages.
Olson, Parmy, "Delete by Default: Why More Snapchat-Like Messaging Is on Its Way", Forbes.com, Available Online at https://www.forbes.com/sites/parmyolson/2013/11/22/delete-by-default-why-more-snapchat-like-messaging-is-on-its-way, 2013, 6 pages.
Corrected Notice of Allowance received for U.S. Appl. No. 14/841,614, dated Jan. 8, 2019, 3 pages.
Notice of Allowance received for Chinese Patent Application No. 201510291012.9, dated Jan. 9, 2019, 2 pages (1 page of English Translation and 1 page of Official Copy).
Office Action received for European Patent Application No. 17167629.9, dated Jan. 25, 2019, 7 pages.
Minutes of Oral Proceedings received for European Patent Application No. 15728307.8, mailed on Dec. 13, 2019, 4 pages.
Minutes of Oral Proceedings received for European Patent Application No. 15729286.3, mailed on Dec. 13, 2019, 4 pages.
Notice of Acceptance received for Australian Patent Application No. 2018203215, dated Nov. 20, 2019, 3 pages.
Result of Consultation received for European Patent Application No. 15728307.8, mailed on Nov. 21, 2019, 7 pages.
Result of Consultation received for European Patent Application No. 15729286.3, mailed on Nov. 21, 2019, 6 pages.

* cited by examiner

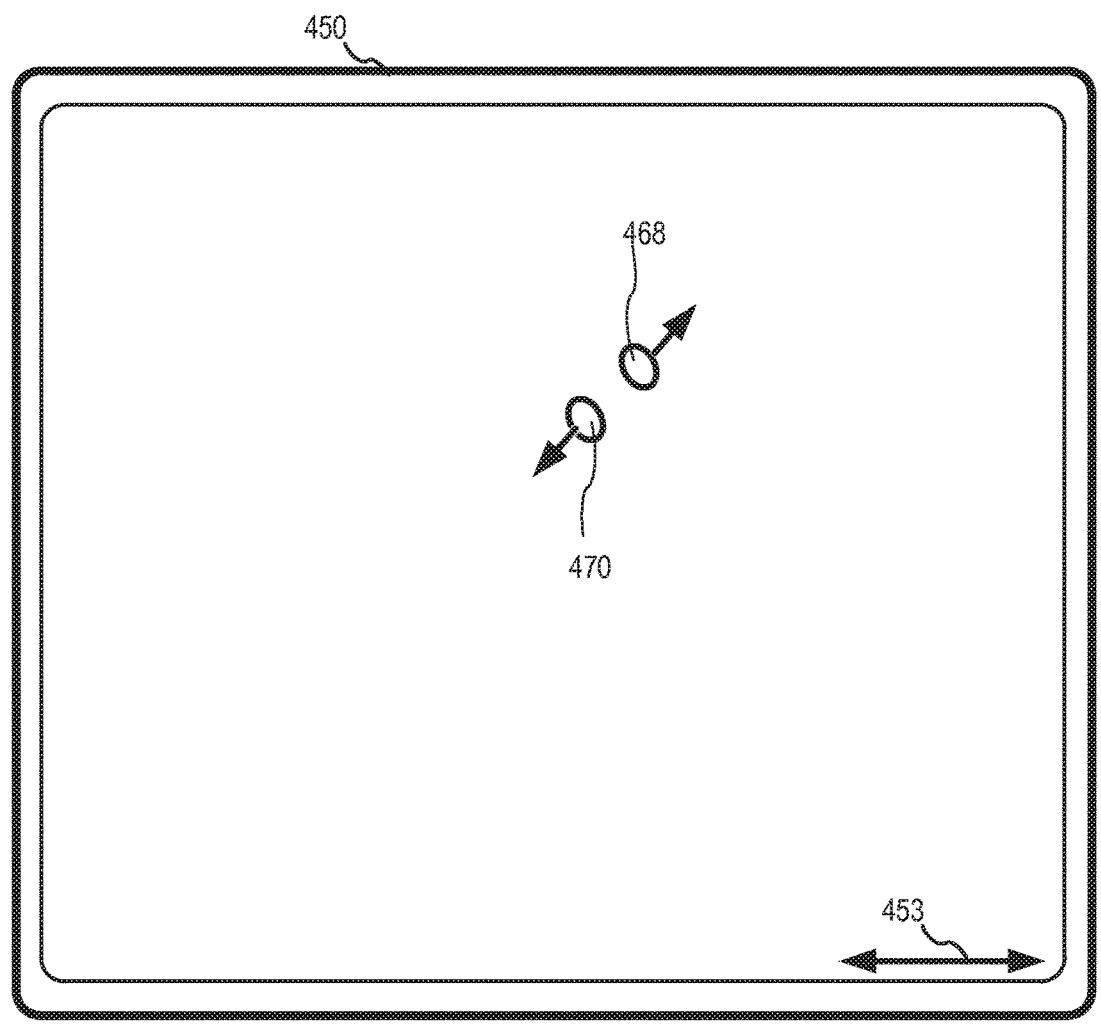
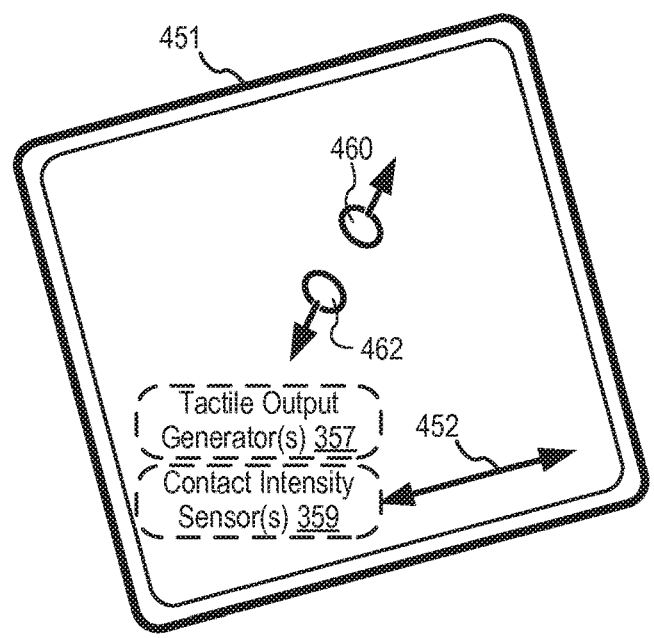
FIG. 4B

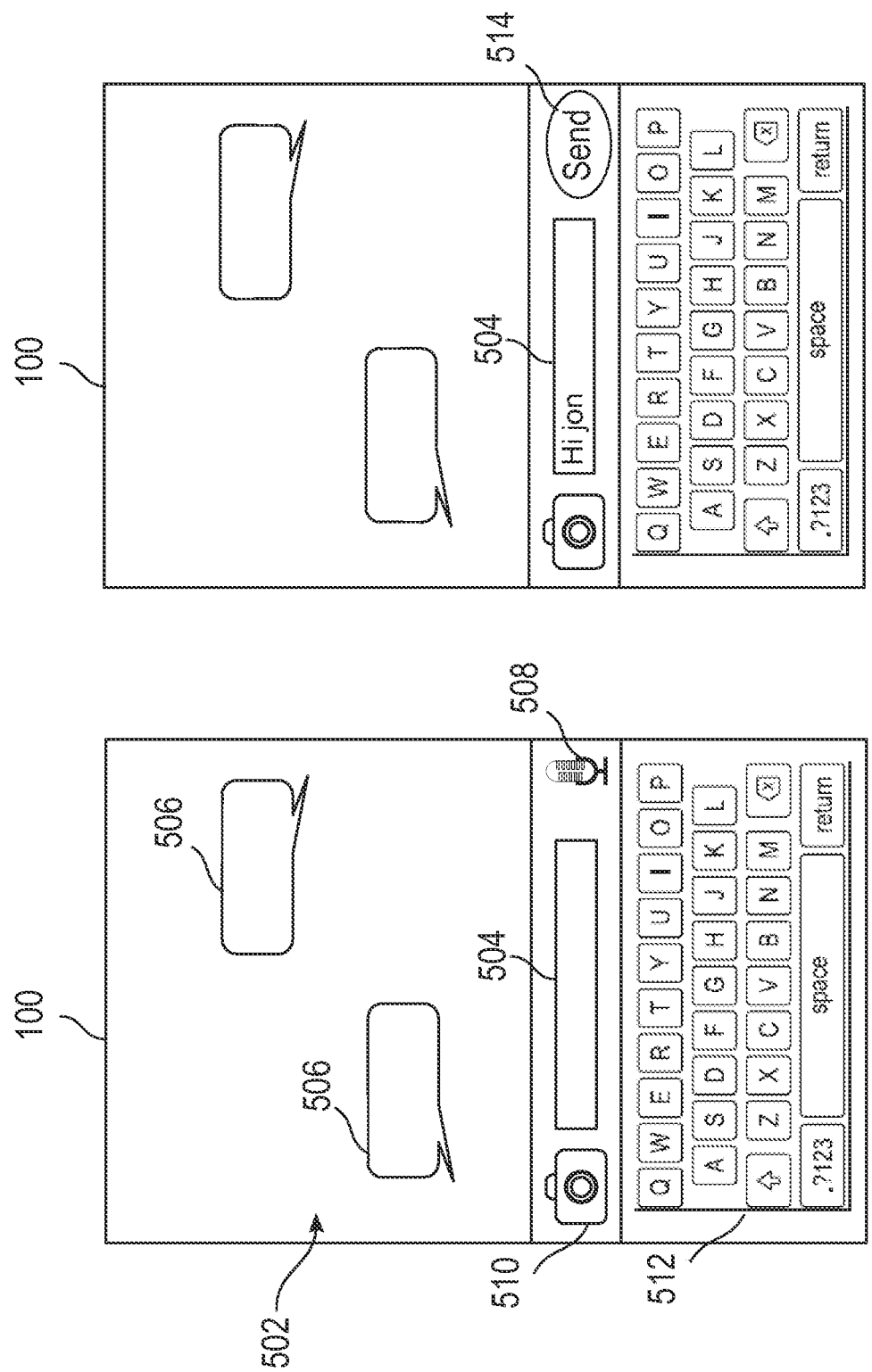

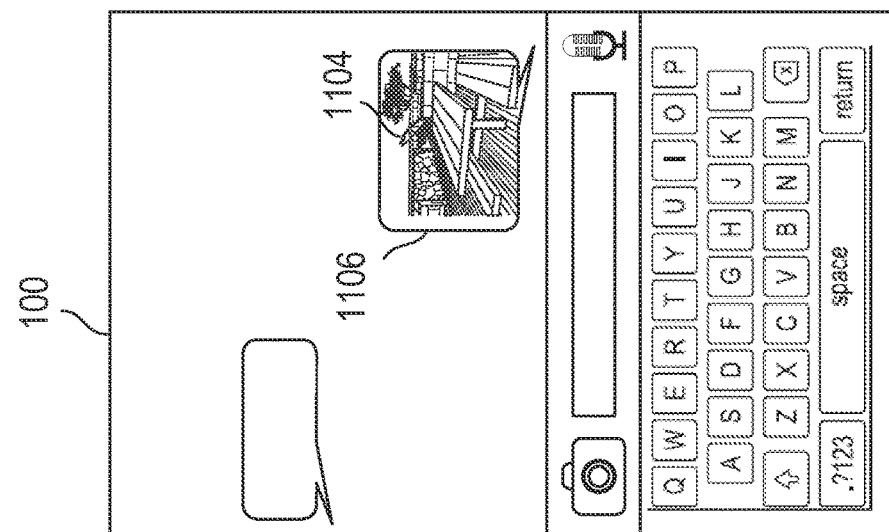
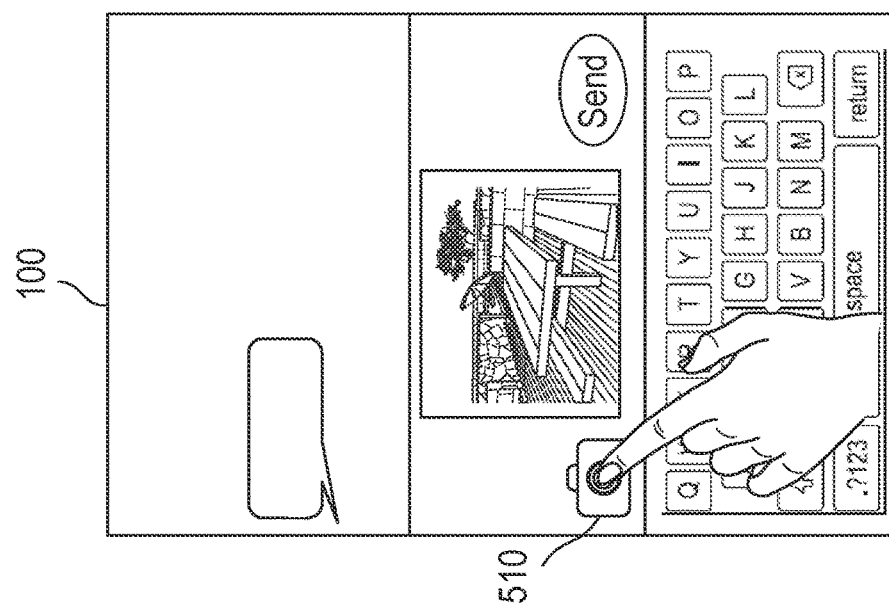
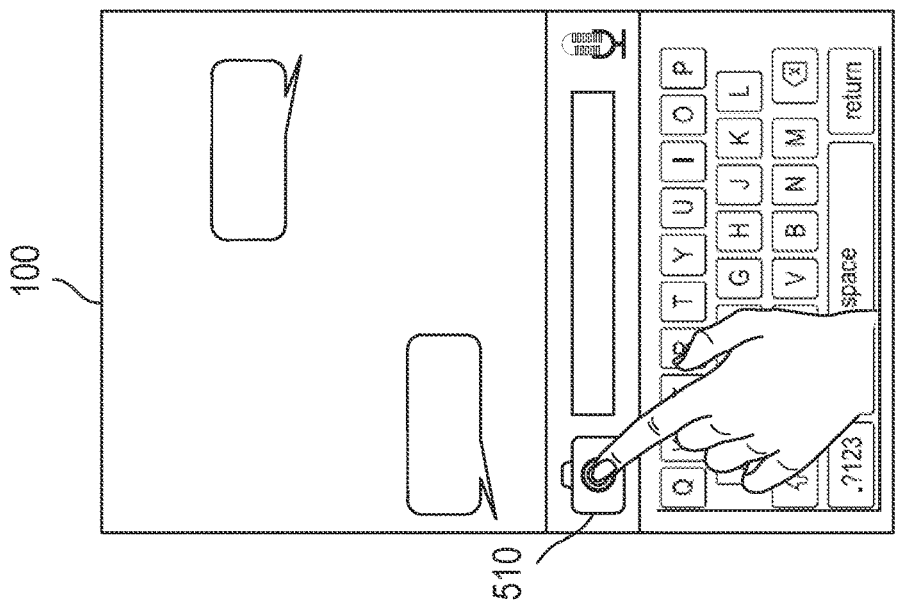
FIG. 11E
FIG. 11D
FIG. 11C

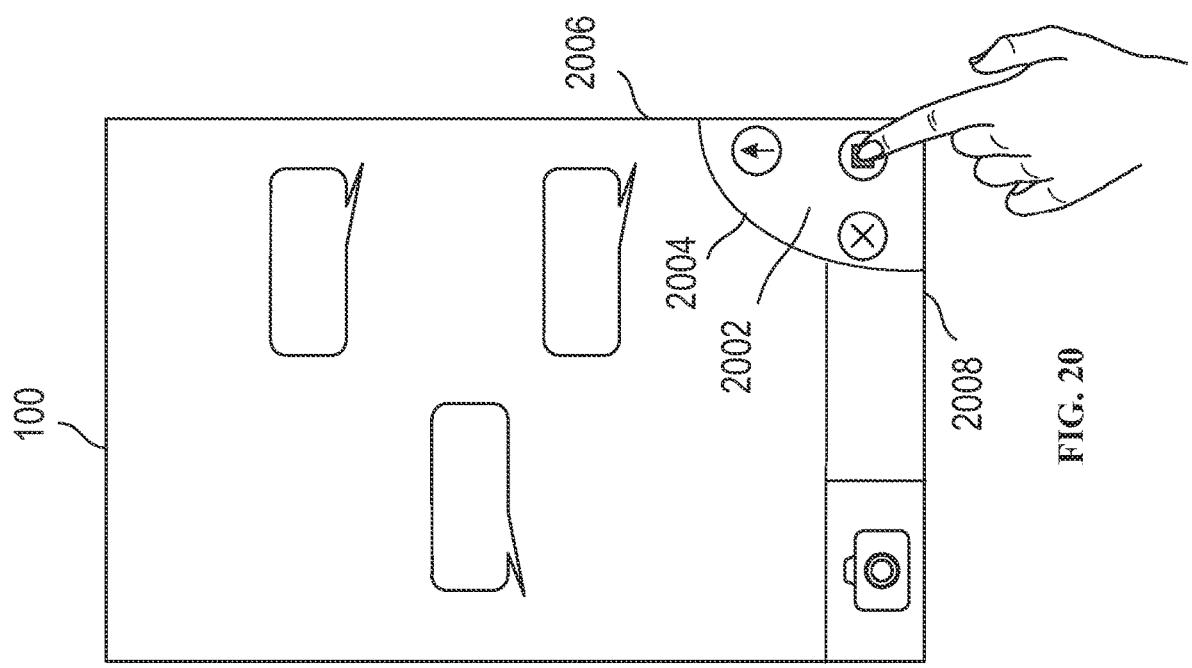

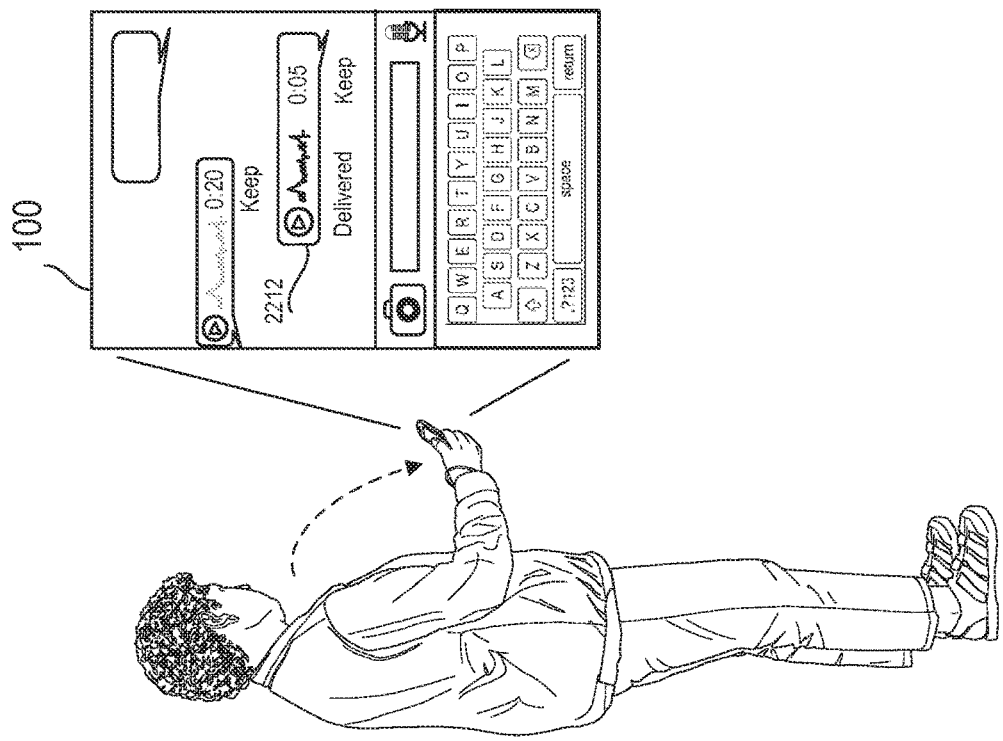
FIG. 22C
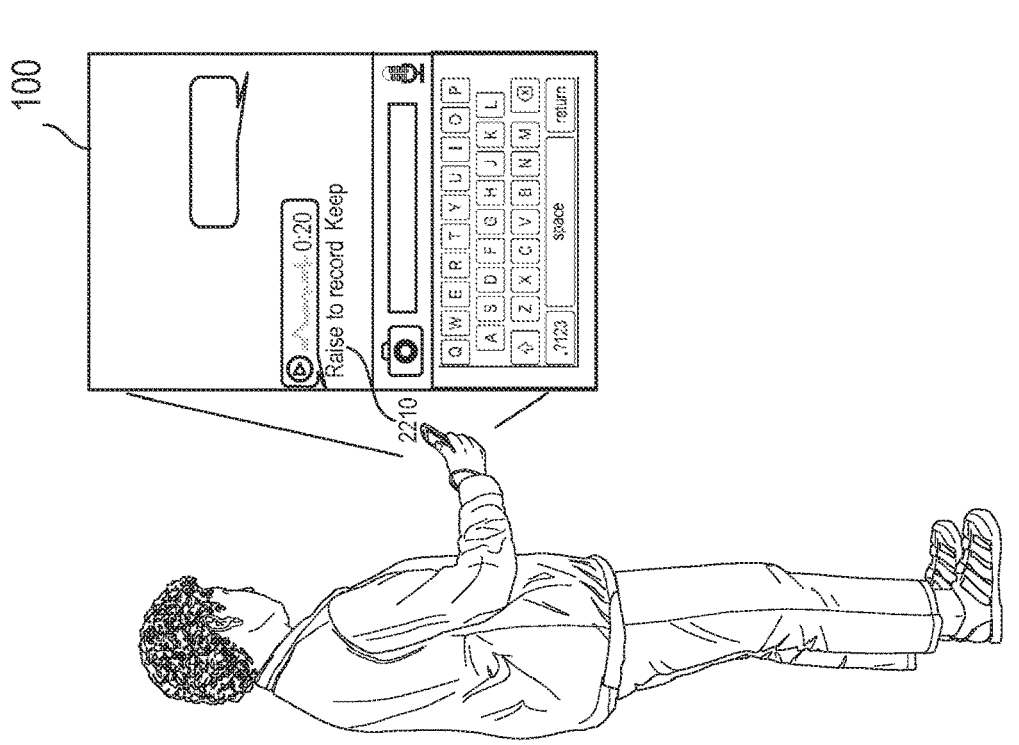
FIG. 22B
FIG. 22A

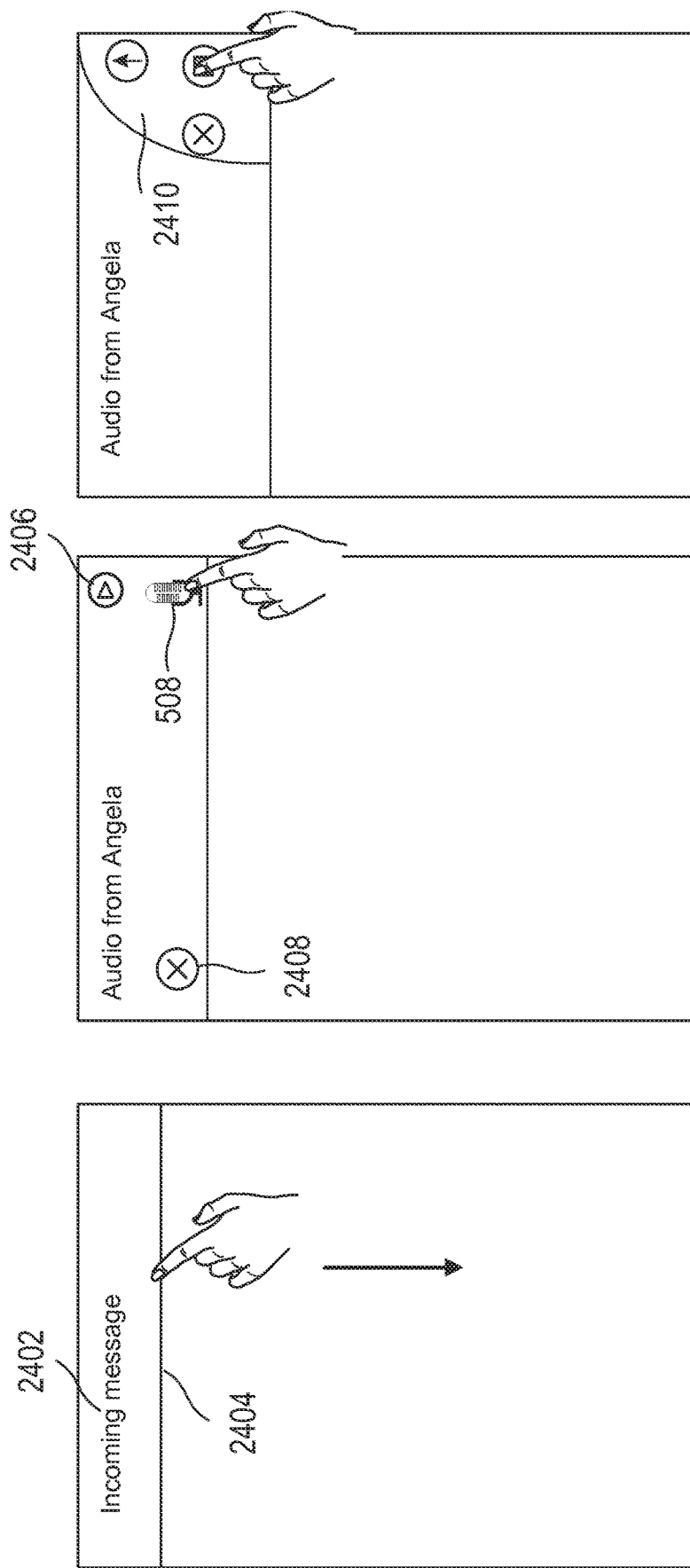

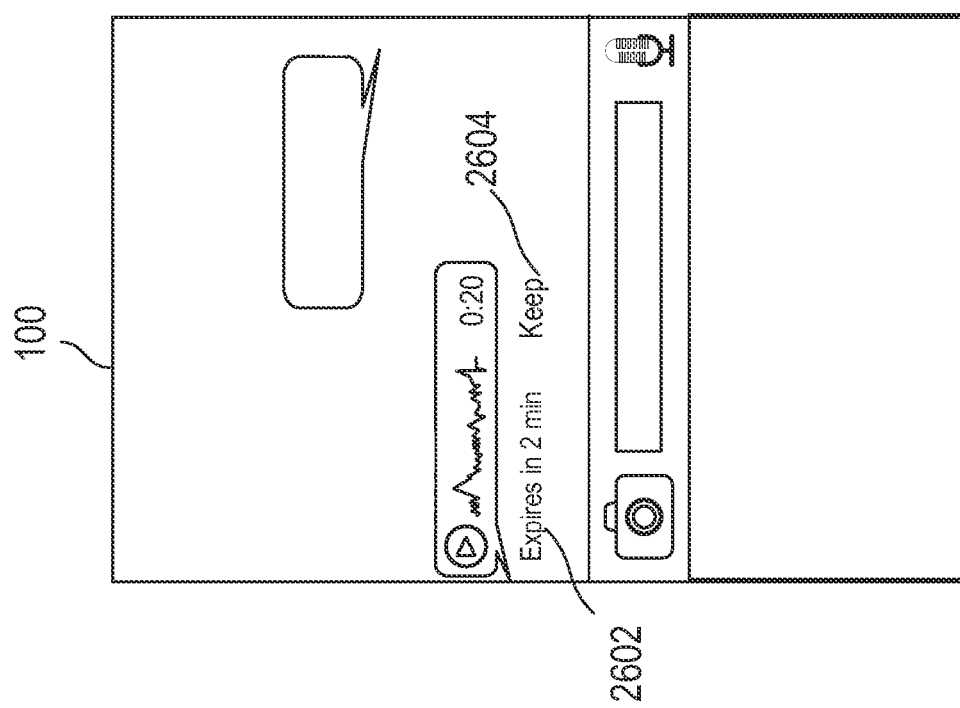

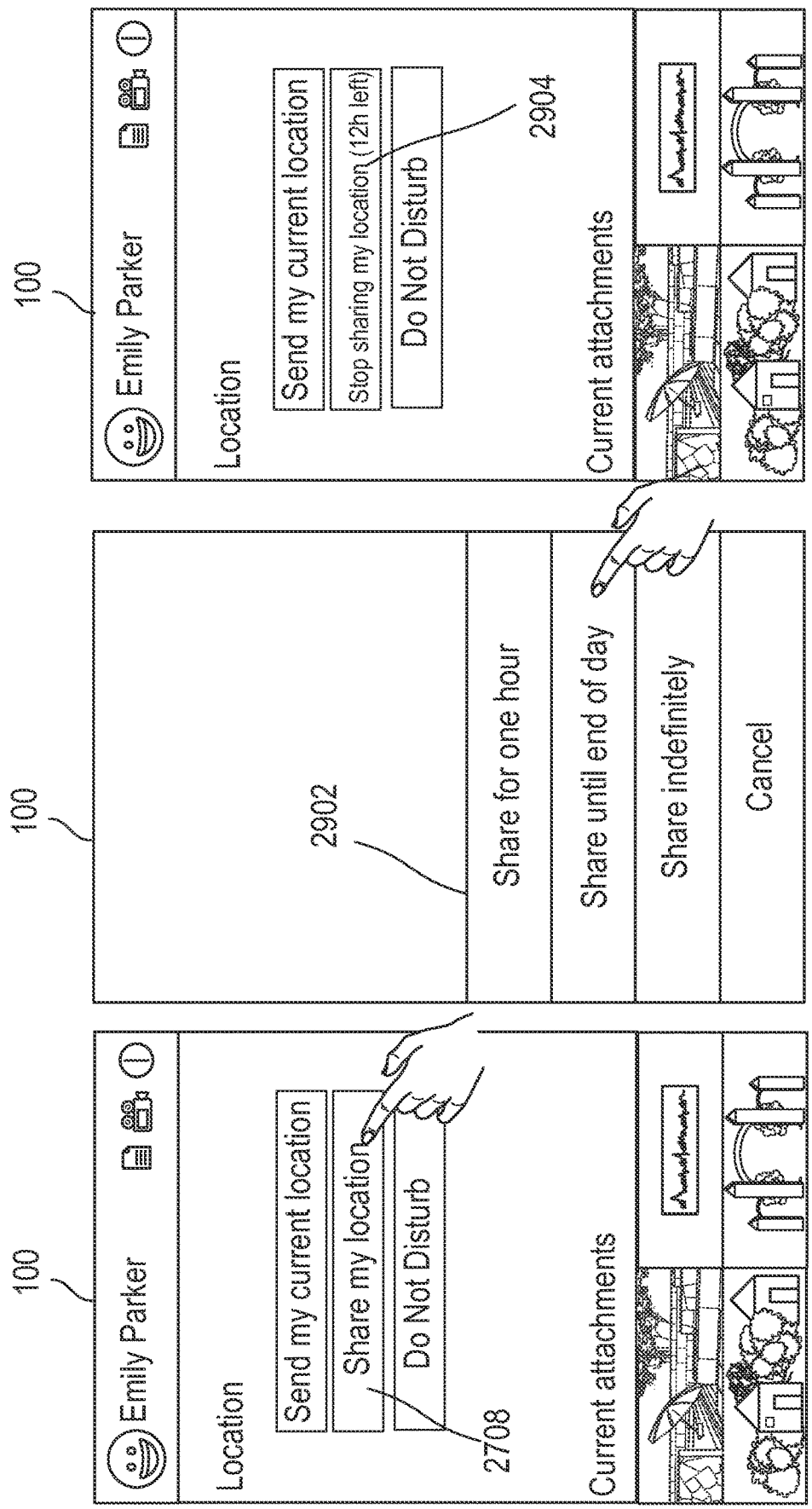

3300

3302

Display a media affordance and a message region for displaying messages sent between participants in a message conversation

3304

Detect a gesture that includes detecting a contact at a location corresponding to the media affordance

3306

In response to detecting the contact, display a send affordance

3308

Detect a continuation of the gesture that includes detecting movement of the contact followed by detecting liftoff of the contact

3310

Determine whether the contact moved to the location of the send affordance

No → B OR B'

Yes

3312

If the contact moved to the location of the send affordance, and in response to detecting the liftoff, send media captured in response to at least a portion of the gesture to a participant in the message conversation.

3402
Display a media affordance and a message region for displaying messages sent between participants in a message conversation

3404
Detect a first input corresponding to a location of the media affordance on the display

3406
In response to detecting the first input, display a record affordance and a send affordance

3408
Detect a second input corresponding to a location of the record affordance on the display

3434
In response to detecting the second input, begin to record a video

3412
Detect a third input corresponding to a location of the send affordance on the display

3414
In response to detecting the third input, send the recorded video to a participant and remove the send affordance and the record affordance from the display

| Optionally, insert a thumbnail representation of the recorded video into the displayed message conversation |

Display a representation of a first audio message received from a first participant in a message conversation

3504

Detect a request to play the first audio message

Optionally, detecting the request comprises detecting a raising of the device while the representation of the first audio message is displayed, or comprises detecting a contact at the location of the displayed representation of the first audio message

3506

In response to detecting the request, play the first audio message

3508

After playing the first audio message, detect a raising of the device

3510

In response to detecting the raising of the device, record a second audio message Optionally, while recording the second audio message, detect a lowering of the device, and in response to detecting the lowering of the device, cease to record the second audio message

3512

After recording the second audio message, send the second audio message to the first participant Optionally, the second audio message is sent in response to detecting the lowering of the device

Receive a first message

---

3704

Display a representation of the first message, wherein the first message is scheduled to be deleted upon satisfaction of expiration criteria

---

3706

Display an affordance for keeping the first message

---

3708

If the affordance is selected prior to satisfaction of the expiration criteria, keep the first message

- - -

Optionally, if the first message contains media, save the media in a media library

---

3710

If the expiration criteria have been satisfied without detecting selection of the affordance, cease to display the representation of the first message

- - -

Optionally, receive a second message, wherein the second message is not deleted based on the expiration criteria

Display a message region for displaying messages sent between a first participant and a second participant in a message conversation

3804

Display a share-location affordance for sharing the location of the first participant with the second participant as the location changes over at least a predetermined time period

3806

Detect a contact at a location that corresponds to a location of the share-location affordance

3808

In response to detecting the contact, provide the second participant with information enabling the second participant to determine a current location of the first participant during at least the predetermined time period Optionally, in response to detecting the contact, display at least two affordances corresponding to at least two predetermined time periods and allow user to select one of the at least two predetermined time periods during which location information is provided Optionally, receive location information dynamically indicating a location of a first external device from the second participant and display a location of user's device and the location of the first external device on a map Optionally, add a third participant to the message conversation, receive location information from the third participant indicating the location of a second external device, and display the location of the second external device on a map Optionally, display a details affordance with the message conversation, detect a contact at a location corresponding to the details affordance, and in response to detecting the contact, display a map showing the location of two or more participants that have shared their location

3902
Display a message region for displaying a message conversation

3904
Receive a request to add media to the message conversation

3906
In response to receiving the request, display a media selection interface concurrently with at least a portion of the message conversation. The interface includes a plurality of affordances for selecting media to add to the message conversation. At least a subset of the affordances includes thumbnail representations of media available for adding to the message conversation

3908
Detect selection of a respective affordance from the plurality of affordances

3910
In response to detecting the selection, select corresponding media to add to the message conversation Optionally, add the media to the message conversation Optionally, the plurality includes a live preview affordance. In response to detecting the selection of the live preview affordance, capture a new image based on the live camera preview and select the new image to add to the message conversation

Detect one or more conditions that are interpreted as a request to record an audio message for a designated contact

4604

In response to detecting the one or more conditions, generate an audio recording using a microphone

4606

Determine whether the audio recording meets rejection criteria

Yes

No

4608

Send the audio recording to the designated contact

4610

Forgo sending the audio recording to the designated contact

Display a media affordance, a message compose field, and a message region for displaying messages sent between participants in a message conversation

4904

Detect a contact at a location that corresponds to the location of the media affordance

4906

In response to detecting the contact, display a media preview in the message compose field

4908

Detect liftoff of the contact

4910

In response to detecting the liftoff, capture media displayed in the media preview, and send the captured media to a participant in the message conversation Optionally, display a send button for sending the message. The captured media is sent to the participant in response to detecting a contact at a location corresponding to the send button.

Optionally, the captured media is sent to the participant in response to detecting the liftoff.

Optionally, in response to detecting the liftoff, a representation of the captured media is displayed in the message compose field. Detect user entry of additional content in the message compose field. The additional content and the captured media are sent to the participant in response to detecting the contact.

FIG. 49

MESSAGE USER INTERFACES FOR CAPTURE AND TRANSMITTAL OF MEDIA AND LOCATION CONTENT

CROSS-REFERENCE TO RELATED APPLICATIONS

This application is a continuation of U.S. Non-provisional patent application Ser. No. 14/928,865, "MESSAGE USER INTERFACES FOR CAPTURE AND TRANSMITTAL OF MEDIA AND LOCATION CONTENT," filed on Oct. 30, 2015, which is a continuation of U.S. Non-provisional patent application Ser. No. 14/503,376, "MESSAGE USER INTERFACES FOR CAPTURE AND TRANSMITTAL OF MEDIA AND LOCATION CONTENT," filed on Sep. 30, 2014, which claims the benefit of priority of U.S. Provisional Patent Application Ser. No. 62/006,071, "MESSAGE USER INTERFACES FOR CAPTURE AND TRANSMITTAL OF MEDIA AND LOCATION CONTENT," filed on May 31, 2014, and of U.S. Provisional Application Ser. No. 62/047,622, "MESSAGE USER INTERFACES FOR CAPTURE AND TRANSMITTAL OF MEDIA AND LOCATION CONTENT," filed Sep. 8, 2014. The content of these applications is hereby incorporated by reference for all purposes.

This application is related to: U.S. patent application Ser. No. 13/153,374, "MOTION PATTERN CLASSIFICATION AND GESTURE RECOGNITION," filed on Jun. 3, 2011; and U.S. patent application Ser. No. 13/153,335, "MOTION-BASED DEVICE OPERATIONS," filed on Jun. 3, 2011. The content of these applications is hereby incorporated by reference for all purposes.

FIELD

The disclosed examples relate generally to user interfaces of electronic devices.

BACKGROUND

Messages can include a variety of media, such as audio, video, or images. Some systems may require users to launch media applications outside of the messaging application in order to capture, transmit, and view media. Furthermore, including media in a message may require the user to perform multiple steps to capture the content, include the captured content in a message, and send the message to a recipient. The recipient may then need to perform multiple steps or explicitly launch a separate media application to play back or view the content.

SUMMARY

In addition to sharing media, users may also wish to easily share their location information with one or more other users from within a message application, or initiate an audio operation for communication. A message user interface that supports quick capture and sending of media and location information in a message, or initiates an audio operation, to one or more recipients is desirable.

In some embodiments, a method for capturing and sending media from within a message application comprises: at an electronic device having a touch-sensitive surface and a display: displaying, on the display, a media affordance and a message region for displaying messages sent between participants in a message conversation; detecting a gesture on the touch-sensitive surface that includes detecting a contact at a location on the touch-sensitive surface that corresponds to a location of the media affordance on the display; in response to detecting the contact: displaying a send affordance on the display; detecting a continuation of the gesture that includes detecting movement of the contact across the touch-sensitive surface followed by detecting liftoff of the contact from the touch-sensitive surface; determining whether the contact moved to a location on the touch-sensitive surface that corresponds to a location of the send affordance on the display; and in accordance with a determination that the contact moved to the location on the touch-sensitive surface that corresponds to the location of the send affordance, and in response to detecting the liftoff, sending media captured in response to at least a portion of the gesture to a participant in the message conversation.

In some embodiments, a method for capturing and sending video from within a message application comprises: at an electronic device having a touch-sensitive surface and a display: displaying, on the display, a media affordance and a message region for displaying messages sent between participants in a message conversation; detecting a first input on the touch-sensitive surface, wherein the first input corresponds to a location of the media affordance on the display; in response to detecting the first input, displaying a record affordance and a send affordance; detecting a second input on the touch-sensitive surface, wherein the second input corresponds to a location of the record affordance on the display; in response to detecting the second input, beginning to record a video; detecting a third input on the touch-sensitive surface, wherein the third input corresponds to a location of the send affordance on the display; and in response to detecting the third input: sending the recorded video to a participant, and removing the send affordance and the record affordance from the display.

In some embodiments, a method for sharing location information comprises: at an electronic device comprising a touch-sensitive surface and a display: displaying, on the display, a message region for displaying messages sent between a first participant and a second participant in a message conversation; displaying a share-location affordance for sharing the location of the first participant with the second participant as the location changes over at least a predetermined time period; detecting a selection of the share-location affordance; and in response to detecting the selection of the share-location affordance: providing the second participant with information enabling the second participant to determine a current location of the first participant during at least the predetermined time period.

In some embodiments, a method for adding media to a conversation comprises: at an electronic device having a camera sensor, a touch-sensitive surface, and a display: displaying, on the display, a message region for displaying a message conversation: receiving a request to add media to the message conversation; in response to receiving the request, displaying a media selection interface concurrently with at least a portion of the message conversation, wherein the media selection interface includes a plurality of affordances for selecting media for addition to the message conversation, at least a subset of the plurality of affordances including thumbnail representations of media available for adding to the message conversation; detecting selection of a respective affordance from the plurality of affordances; and in response to detecting selection of the respective affordance, selecting corresponding media for addition to the message conversation.

In some embodiments, a method for capturing and sending media comprises: at an electronic device having a touch-sensitive surface and a display: displaying, on the display, a media affordance, a message compose field, and a message region for displaying messages sent between participants in a message conversation; detecting a contact at a location on the touch-sensitive surface that corresponds to a location of the media affordance on the display; in response to detecting the contact, displaying a media preview in the message compose field; detecting a liftoff of the contact from the touch-sensitive surface; in response to detecting the liftoff, capturing media displayed in the media preview; and sending the captured media to a participant in the message conversation.

In some embodiments, a method for capturing, sending, and playing audio messages from within a message application comprises: at an electronic device having a touch-sensitive surface and a display: displaying a representation of a first audio message received from a first participant in a message conversation; detecting a request to play the first audio message; in response to detecting the request, playing the first audio message; after playing the first audio message, detecting a raising of the device; in response to detecting the raising of the device, recording a second audio message; and after recording the second audio message, sending the second audio message to the first participant.

In some embodiments, a method for grouping messages for display in a conversation comprises: at an electronic device comprising a touch-sensitive surface and a display: receiving a plurality of messages from a first participant within a time interval; determining whether the plurality of messages meets message grouping criteria; in accordance with a determination that the plurality of messages does not meet the message grouping criteria, displaying a plurality of separate bounded message areas representing the plurality of messages; and in accordance with a determination that the plurality of messages meets the message grouping criteria, displaying a single group bounded message area representing the plurality of messages.

In some embodiments, a method for deleting expired messages from a message conversation comprises: at an electronic device comprising a touch-sensitive surface and a display: receiving a first message; displaying a representation of the first message on the display, wherein the first message is scheduled to be deleted upon satisfaction of expiration criteria; displaying an affordance for keeping the first message; in accordance with a determination that the affordance was selected prior to the satisfaction of the expiration criteria, keeping the first message; and in accordance with a determination that the expiration criteria has been satisfied without detecting selection of the affordance, ceasing to display the representation of the first message on the display.

In some embodiments, a method for initiating an audio operation includes: at an electronic device comprising a microphone: detecting a change in device context based on movement of the electronic device and one or more proximity sensor readings; in response to detecting the change in device context: determining whether the device meets audio-operation criteria, wherein the audio-operation criteria include a criterion that is met when the movement of the electronic device satisfies movement criteria and the one or more proximity sensor readings satisfy a proximity criteria; and in accordance with a determination that the change in device context satisfies the audio-operation criteria, initiating an audio operation; and in accordance with a determination that the change in device context does not satisfy the audio-operation criteria, forgoing initiation of the audio operation.

In some embodiments, method for sending an audio message includes: at an electronic device comprising at least one microphone: detecting one or more conditions that are interpreted as a request to record an audio message for a designated contact; in response to detecting the one or more conditions, generating an audio recording using the at least one microphone; determining whether the audio recording meets rejection criteria; in accordance with a determination that the rejection criteria is not satisfied, sending the audio recording to the designated contact; and in accordance with a determination that the rejection criteria is satisfied, forgoing sending of the audio recording to the designated contact.

DESCRIPTION OF THE FIGURES

FIG. 4B illustrates an exemplary user interface for a multifunction device with a touch-sensitive surface that is separate from the display in accordance with some embodiments.

FIGS. 5A-5B illustrate exemplary messaging user interfaces.

FIGS. 11C-11E illustrate exemplary messaging user interfaces.

FIG. 20 illustrates an exemplary messaging user interface.

FIGS. 22A-22D illustrate exemplary messaging user interfaces.

FIGS. 24A-24C illustrate exemplary messaging user interfaces.

FIG. 26 illustrates an exemplary messaging user interface.

FIGS. 29A-29C illustrate exemplary messaging user interfaces.

FIG. 33 is a flow diagram illustrating a process for capturing and sending media.

FIG. 34 is a flow diagram illustrating a process for capturing and sending media.

FIG. 35 is a flow diagram illustrating a process for capturing and sending media.

FIG. 37 is a flow diagram illustrating a process for managing messages based on expiration criteria.

FIG. 38 is a flow diagram illustrating a process for sharing location information.

FIG. 39 is a flow diagram illustrating a process for adding media to a conversation.

FIG. 46 is a flow diagram illustrating a process for sending an audio recording.

FIG. 49 is a flow diagram illustrating a process for capturing and sending media.

DETAILED DESCRIPTION

Figure 1A:
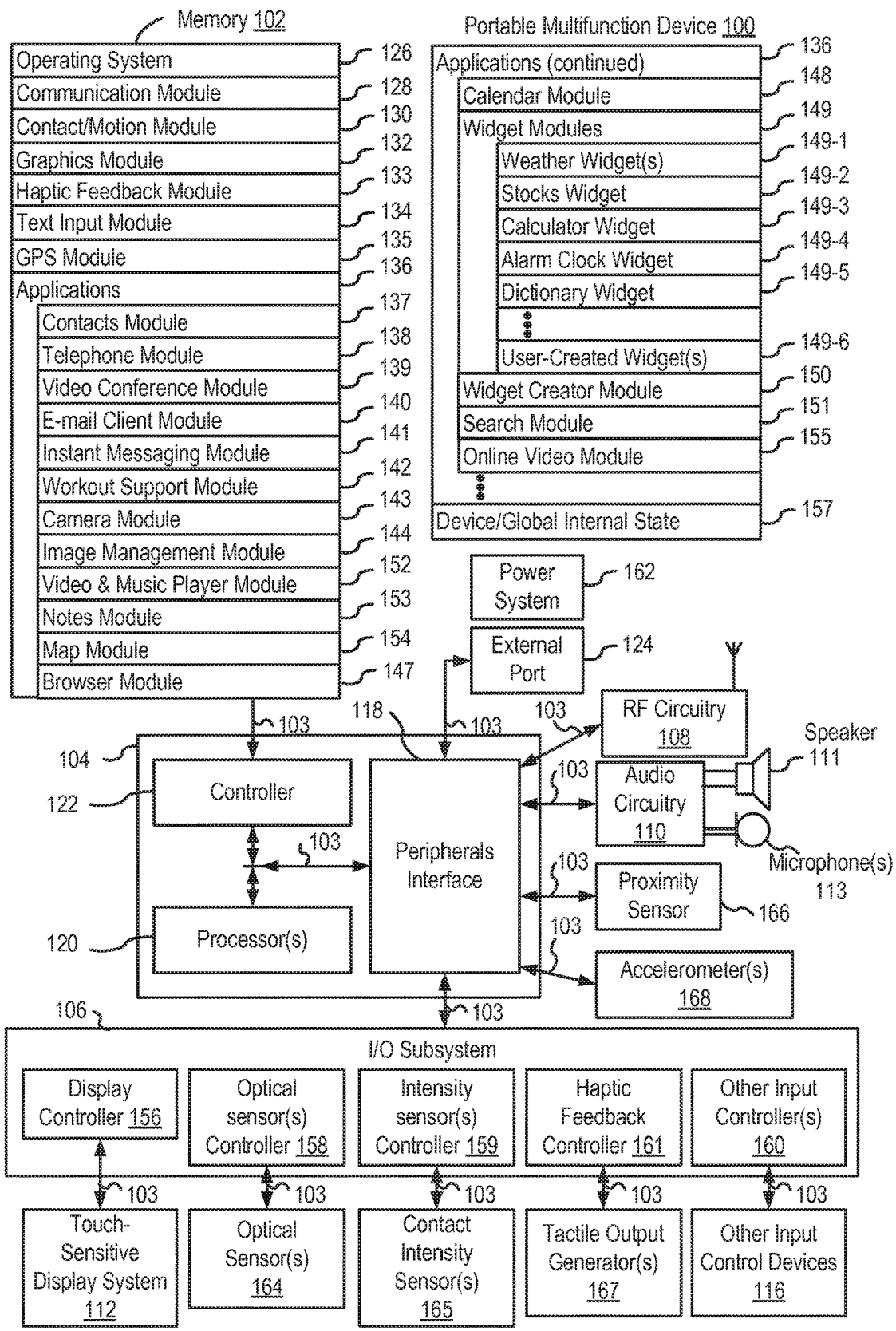
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices with faster, more efficient methods and interfaces for capturing, sending, and playing media content or location data on portable electronic devices. Such methods and interfaces reduce the cognitive burden on a user and produce a more efficient human-machine interface. For battery-operated devices, such methods and interfaces conserve power and increase the time between battery charges.

Below, FIGS. 1A-1B, 2, 3, and 4A-4B provide a description of exemplary devices for performing the techniques for capturing, sending, and playing or viewing media objects or location content. FIGS. 5A-32C illustrate exemplary user message user interfaces for capturing, sending, playing or viewing media objects or location content, and sending recorded audio messages. FIGS. 33-49 are flow diagrams illustrating methods of capturing, sending, and playing or viewing media and location content, grouping messages for display, removing expired messages from a conversation, initiating an audio operation, and sending a recorded message.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., a touch screen displays and/or touchpads), are, optionally, used. It should also be understood that, in some embodiments, the device is not a portable communications device, but is a desktop computer with a touch-sensitive surface (e.g., touch screen display and/or a touchpad).

In the discussion that follows, an electronic device that includes a display and a touch-sensitive surface is described. It should be understood, however, that the electronic device optionally includes one or more other physical user-interface devices, such as button(s), a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience, and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication, wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, webpages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
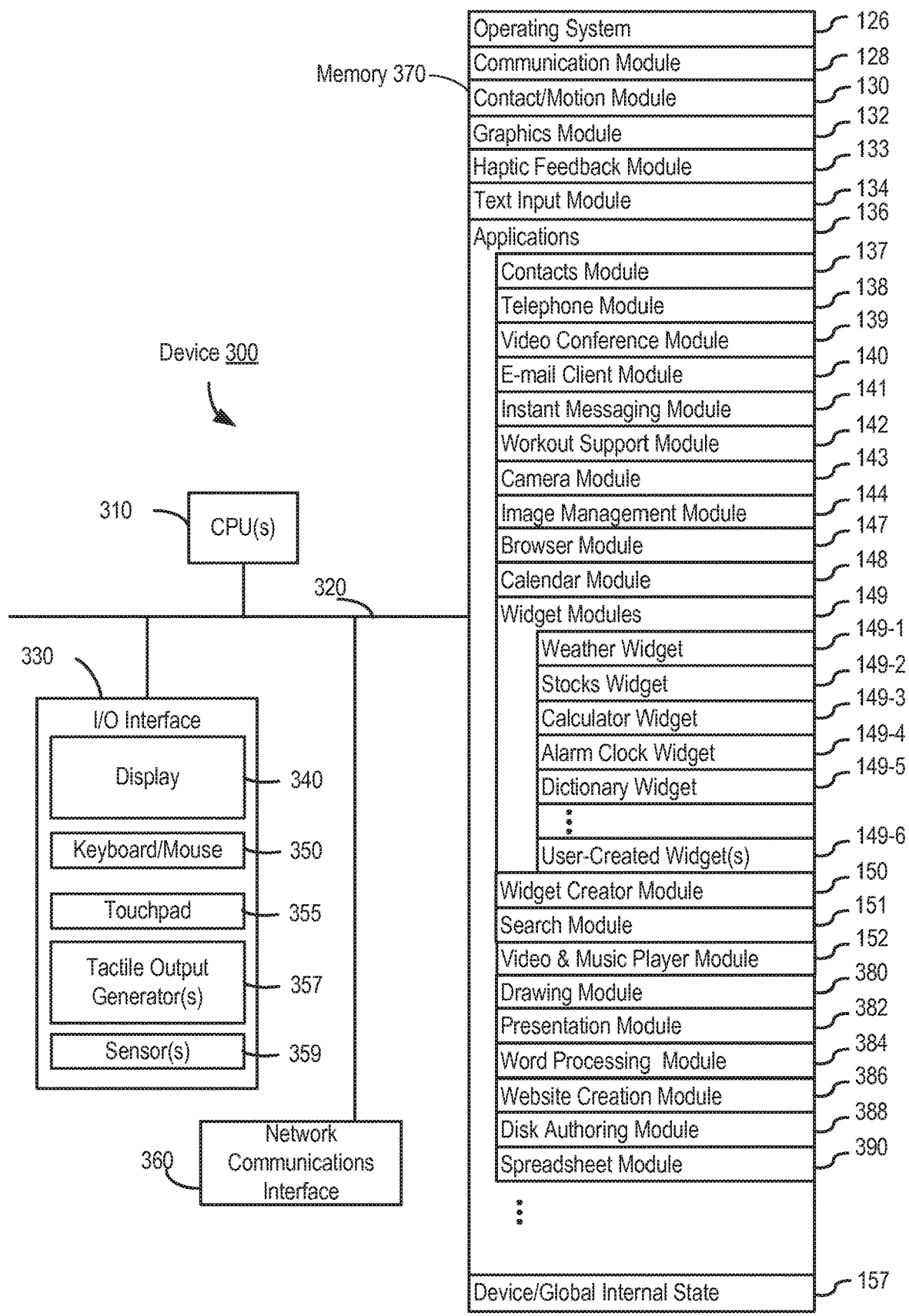
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web-pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conferencing module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web-pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
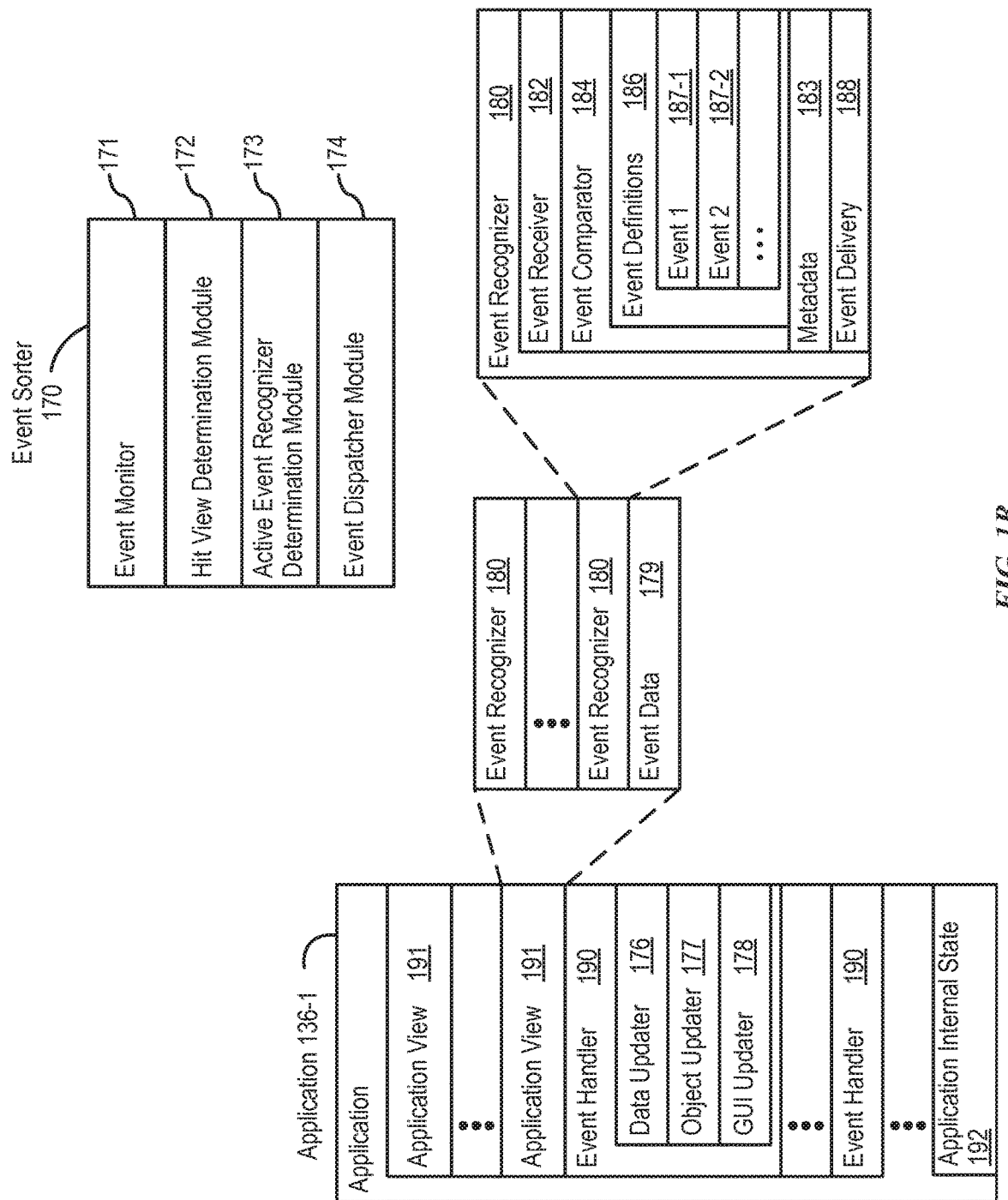
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration). In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (186) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof, are optionally utilized as inputs corresponding to sub-events which define an event to be recognized.

Figure 2:
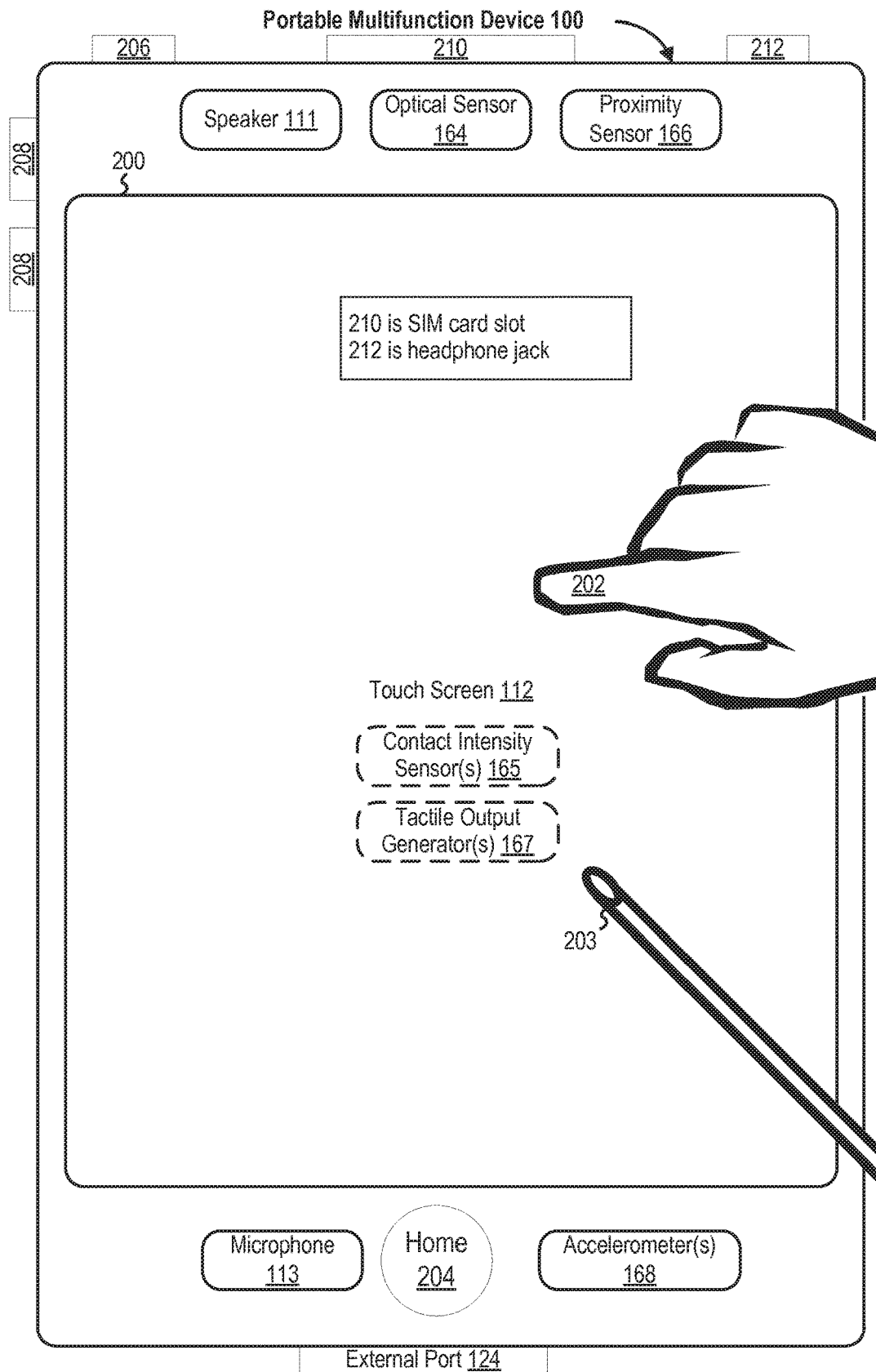
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is optionally used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
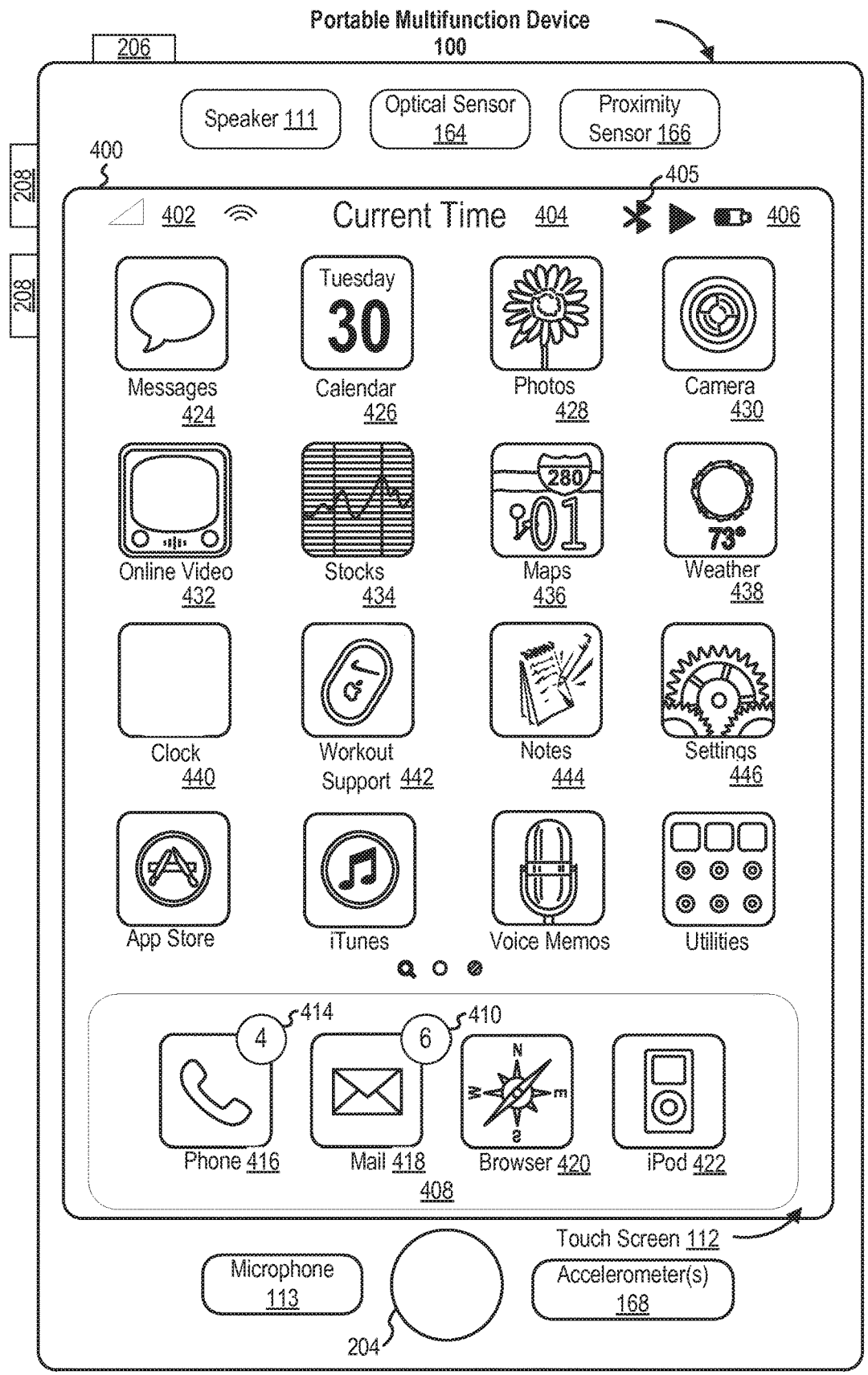
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100 and/or 300 (FIGS. 1A, 1B, and 3). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, the term "open application" or "executing application" refers to a software application with retained state information (e.g., as part of device/global internal state 157 and/or application internal state 192). An open or executing application may be any one of the following types of applications:
  an active application, which is currently displayed on a display screen of the device that the application is being used on;
  a background application (or background processes) which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed to embodiments of message user interfaces for capturing, sending, and viewing or playing media and location data.

FIG. 5A depicts an exemplary message user interface that can be displayed by device 100. The message user interface includes a message region 502 for displaying messages sent between participants in a message conversation, along with a message compose field 504 for composing a message. Messages exchanged by the participants can be displayed inside bounded message areas 506. In some embodiments, a bounded message area is a contiguous region that is visually distinguished from a background of the application canvas.

In this embodiment, the message user interface includes two media affordances for capturing and sending media streams: an audio capture affordance 508 for capturing and sending an audio message, and a visual-media capture affordance 510 for capturing and sending an image or a video. In this embodiment, the visual-media capture affordance and the audio data capture affordance are displayed on either side of the message compose field. The message user interface also includes a virtual keyboard 512 for entering text in the message compose field 504. In some embodiments, as shown in FIG. 5B, in response to detecting a user input in the message compose field 504, device 100 can replace display of the audio capture affordance 508 with display of a send button 514 for sending a message.

As will be described in more detail below, device 100 can capture and send a variety of media—such as audio, video, and images—from within the messaging application.

Figure 6B:
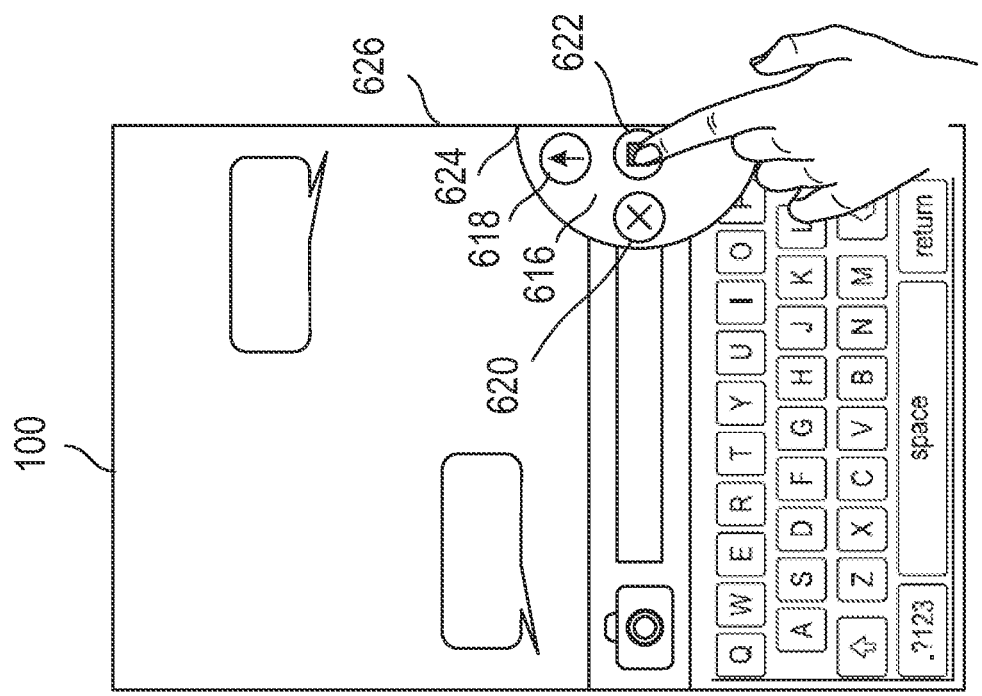
FIGS. 6A-6B illustrate exemplary messaging user interfaces.
Figure 6A:
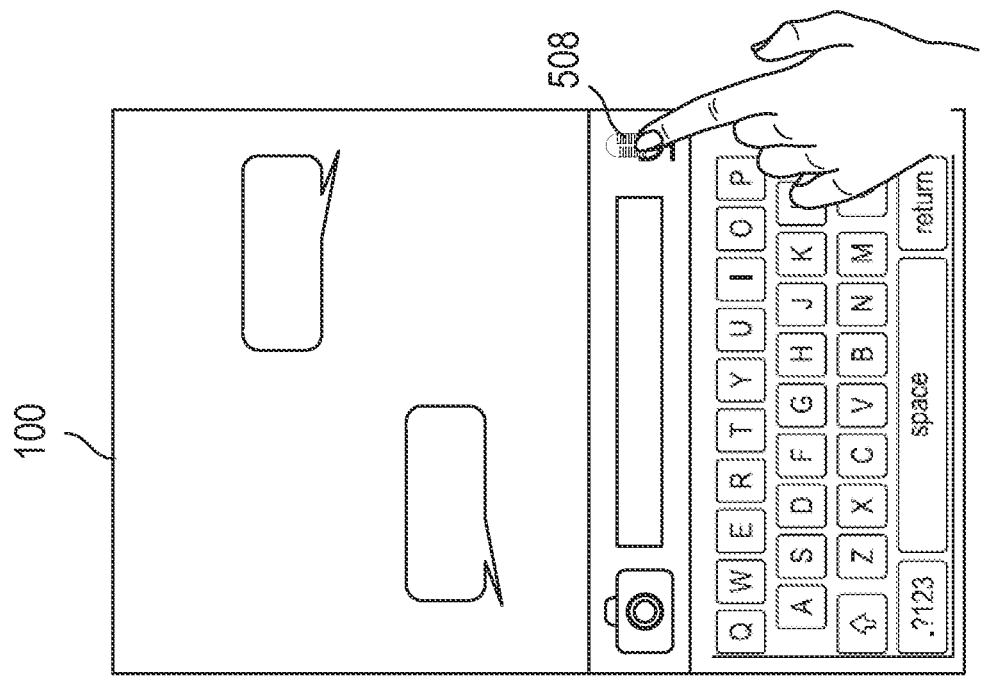

Device 100 can record and send an audio message from within the messaging application. For example, as depicted by FIGS. 6A-6B, in response to detecting a contact on audio capture affordance 508, device 100 can display a visually distinguished region 616 containing a plurality of affordances 618, 620, 622 and begin to record an audio message using a microphone of device 100. The audio message may be a user speaking or singing, for example, or some other type of audio message that can be captured by device 100.

In the embodiment depicted in FIG. 6B, the visually distinguished region 616 contains a send affordance 618 for sending the captured audio message to a participant in the message conversation, a cancel affordance 620 for ceasing to record the audio message and forgoing sending the audio message to a participant, and a record affordance 622 for recording an audio message. In some embodiments, the send affordance is displayed near the media affordance on the display.

In this embodiment, the visually distinguished region 616 is displayed on the same side of the display as the audio capture affordance 508, and is vertically centered on the location corresponding to the audio capture affordance 508. Thus, as a user makes contact with the audio capture affordance 508, the visually distinguished region 616 appears around the location of the audio capture affordance, with the record affordance 622 replacing the audio capture affordance 508.

As shown in FIG. 6B, the exemplary visually distinguished region 616 is bounded by an edge 626 of the display and a semi-circle 624 that begins and ends at the edge 626 of the display and encloses the send affordance 618, the cancel affordance 620, and the record affordance 622 against the edge of the display. The visually distinguished region 616 may provide the user with a visual indication that device 100 has entered a media capture mode.

Figure 7A:
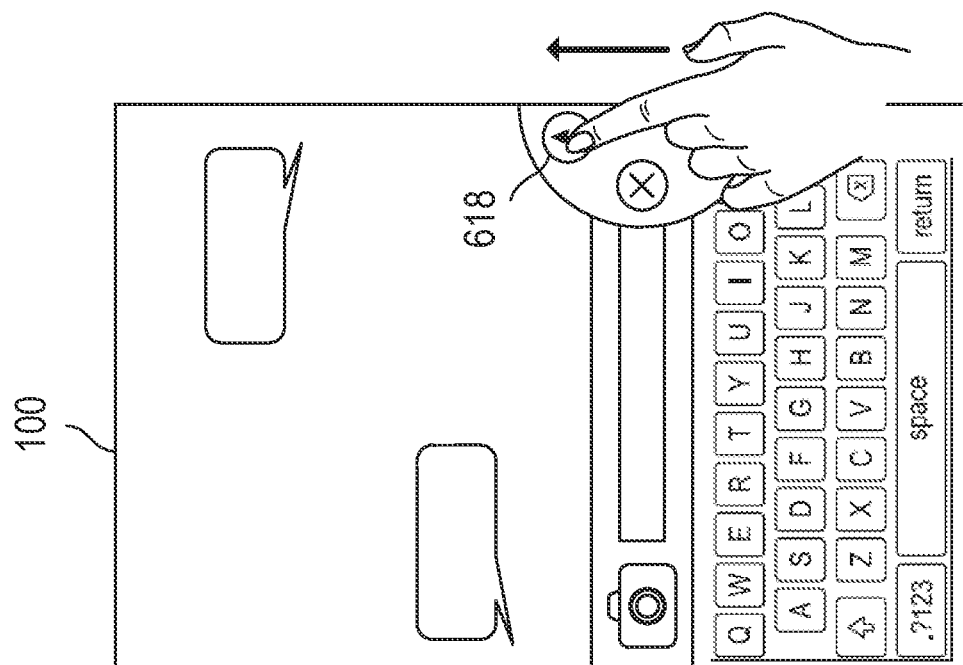
FIGS. 7A-7D illustrate exemplary messaging user interfaces.
Figure 7B:
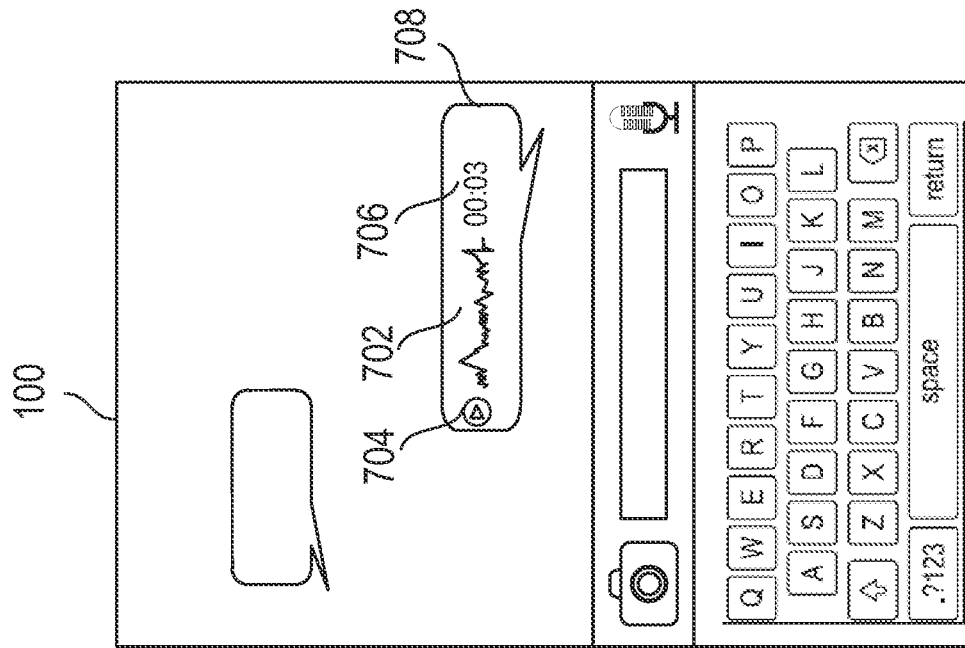

In some embodiments, device 100 can continue to record an audio message as long as the contact is maintained at the location on the display corresponding to the record affordance. As depicted in FIGS. 7A-7B, in response to detecting a swipe gesture on the display to the send affordance 618, device 100 can stop recording the audio message and immediately send the recorded audio message to a participant in the message conversation. The swipe gesture may correspond to a movement of the contact on the display to the send affordance 618 followed by a liftoff of the contact at the send affordance 618. In some embodiments, the movement of the contact is detected after the send affordance is displayed.

In some embodiments, in conjunction with sending media (such as an audio message) to a participant in the message conversation, a representation of the media is displayed in the message region. For example, as shown in FIG. 7B, in some embodiments, device 100 can display a representation of a sent audio message in a bounded message area 708 that is inserted into the message conversation. In this embodiment, the representation of the audio message includes an image of a waveform 702 representing the audio message, a playback affordance 704 for playing the audio message, and a time duration 706 of the audio message. In some embodiments, the waveform may be generated based on the recorded audio message and depict specific characteristics of the audio content of the message. In some embodiments, the waveform may instead be iconic. In some embodiments, the length of the waveform may correspond to the length of the audio recording.

In some embodiments, while recording an audio message device 100 can display a representation of the audio message in a message compose field. The representation may be a waveform as described above, and may dynamically change shape as the user records an audio message to indicate the changing audio content being recorded.

In some embodiments, in response to detecting a contact on the playback affordance 704, device 100 can play the audio message. In some embodiments, the color of the playback affordance may change after the audio message has been played to provide a visual indication to the user that the audio message has been played. In some embodiments, a portion of the playback affordance may change in appearance as a corresponding portion of the audio message is played, providing a visual indication of the elapsed playing time.

In some embodiments, device 100 can display the waveform 702 representing the audio message in an initial color, and change the waveform color when the audio message is played to provide a visual indication to the user that the audio message has been played. In some embodiments, device 100 can change the color of a portion of the waveform 702 as a corresponding portion of the audio message is played, providing a visual representation of the elapsed playing time. The above-described audio message representations and color changes may be used to represent any audio message exchanged from within the messaging application, where it is represented in the message conversation, in the message compose field, or elsewhere.

In some embodiments, device 100 can stop recording the audio message in response to detecting the movement of the contact away from the audio capture affordance, either towards the send affordance or in another direction. In some embodiments, device 100 can send the recorded audio message in response to detecting a liftoff at the location corresponding to the send affordance 618 after the movement of the contact. The initial contact on the audio capture affordance and the subsequent movement of the contact to the send affordance may be performed by a user as a single, continuous contact on the display.

Figure 7D:
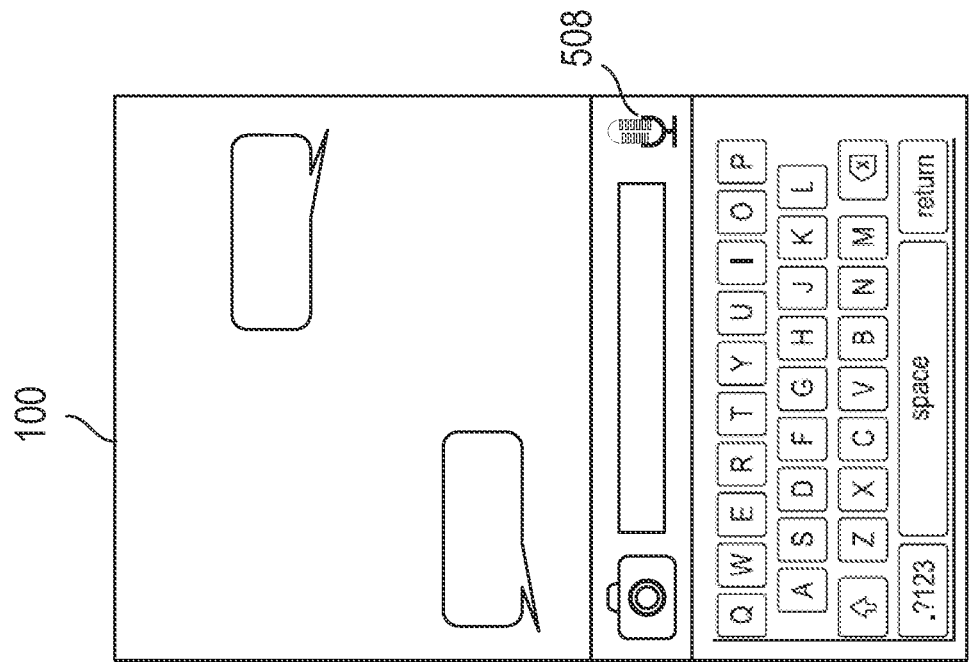
Figure 7C:
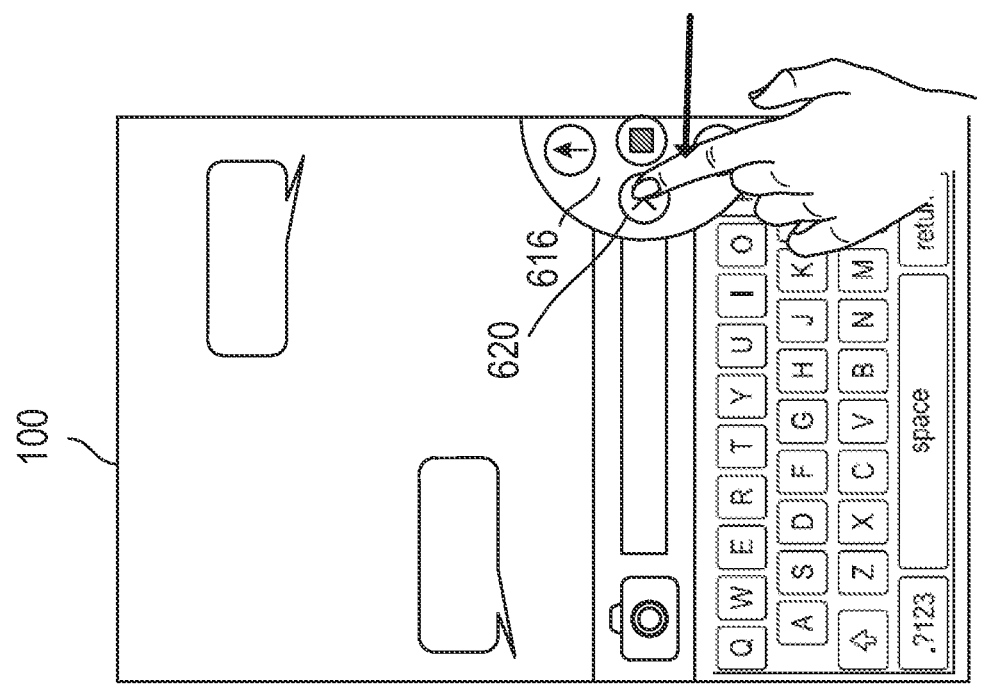

As depicted in FIGS. 7C-7D, in some embodiments, if device 100 detects a swipe gesture on the display to the cancel affordance 618, device 100 can cease to record the audio message, remove the visually distinguished region 616 from the display, re-display the audio capture affordance 508, and forgo sending the audio message to a participant. In some embodiments, as discussed earlier with respect to the send affordance, the swipe gesture may correspond to a single, continuous movement of the contact starting from the initial contact on the audio capture affordance 508 across the display to the cancel affordance 620, followed by a liftoff at the cancel affordance 620.

Figure 8:
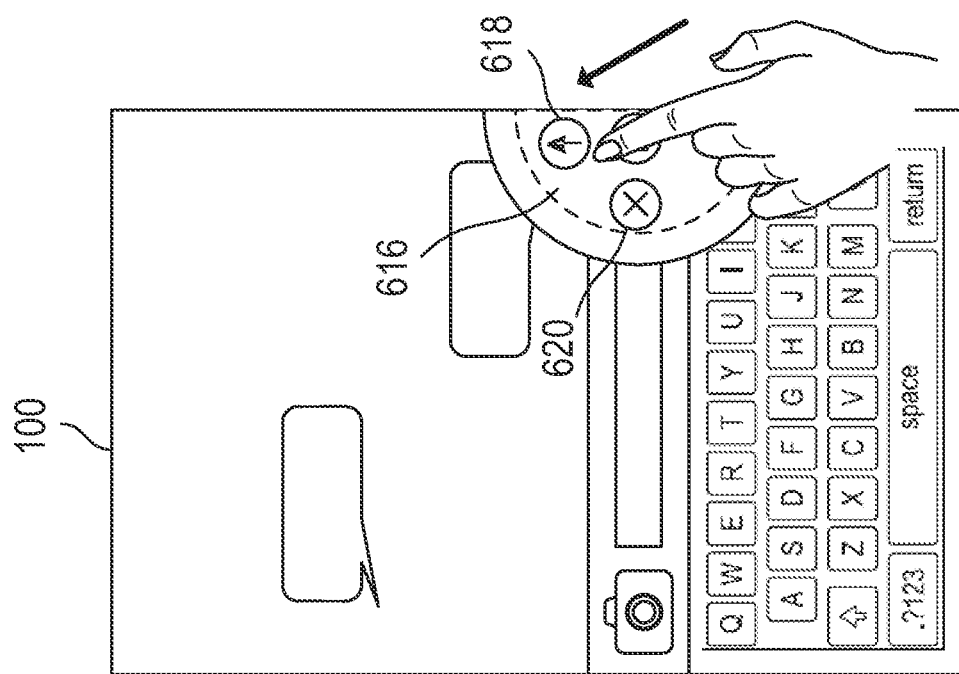
FIG. 8 illustrates an exemplary messaging user interface.

In some embodiments, as depicted in FIG. 8, in response to detecting a movement of the contact on the display away from the record affordance, device 100 can expand the visually distinguished region 616. In some embodiments, the visually distinguished region expands in accordance with movement of the contact (e.g., the expansion of the visually distinguished region is proportional to the movement of the contact while the visually distinguished region is expanding). In some embodiments, the send affordance 618 and the cancel affordance 620 displayed inside the visually distinguished region 616 can move outwards in accordance with the expansion of the visually distinguished region 616. Expanding the visually distinguished region may provide the user with an indication that device 100 has detected a movement away from the location of the record affordance, and may also provide the user with a larger area of the display for performing a swipe gesture, potentially making it easier for the user to control the trajectory or destination of the swipe gesture.

Figure 9B:
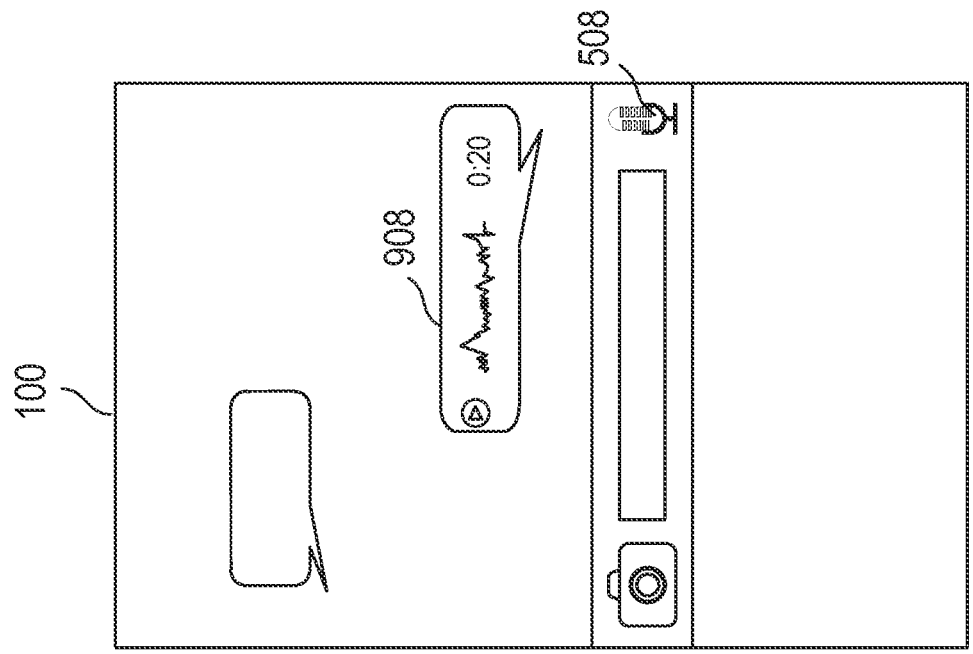
FIGS. 9A-9B illustrate exemplary messaging user interfaces.
Figure 9A:
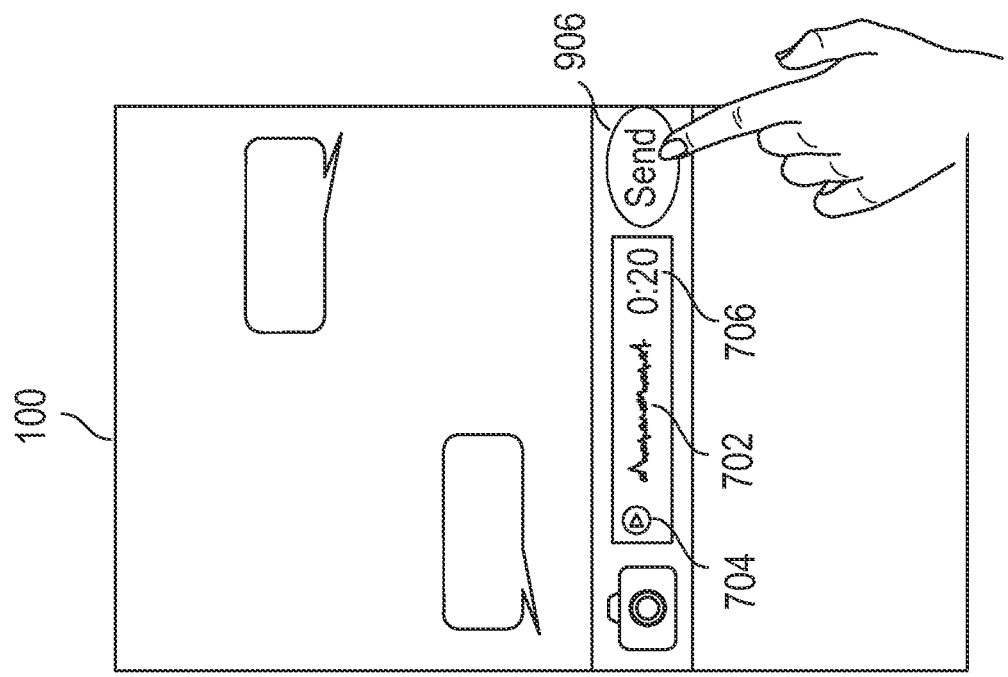

In some embodiments, as shown in FIG. 9A, if device 100 detects that a liftoff of the contact from the display without detecting a previous movement of the contact to the send affordance or the cancel affordance, device 100 can stop recording the audio message, display a representation of the audio message in the message compose field 504, and replace the audio capture affordance with a send button 906 for sending the recorded audio message to a participant in the message conversation.

As previously discussed with respect to FIG. 7A, the representation of the recorded audio message displayed in the message compose field can include an image of a waveform 702 representing the recorded audio message, a duration 706 of the recorded audio message, and a playback affordance 704 for playing the recorded audio message.

As shown in FIG. 9B, in response to detecting a contact on the send button 906, device 100 can send the recorded audio message to a participant in the message conversation and replace the send button 906 with the audio capture affordance 508. As shown in FIG. 9B, in some embodiments, after sending the audio message in response to a contact on the send button, device 100 can display a representation of the sent audio message in a bounded message area 908 that is inserted into the message conversation.

Thus, as described above with respect to FIGS. 5A-9B, device 100 can display message user interfaces in a messaging application that enable a user to record and send an audio message from within the messaging application, without requiring the user to launch a separate application.

Furthermore, in some embodiments, the user can record and send audio message using a single, continuous gesture on the display, comprising an initial contact on the audio capture affordance followed by a movement to the send affordance and a liftoff. This approach increases efficiency of the user interface and reduces the cognitive burden on the user.

Figure 10B:
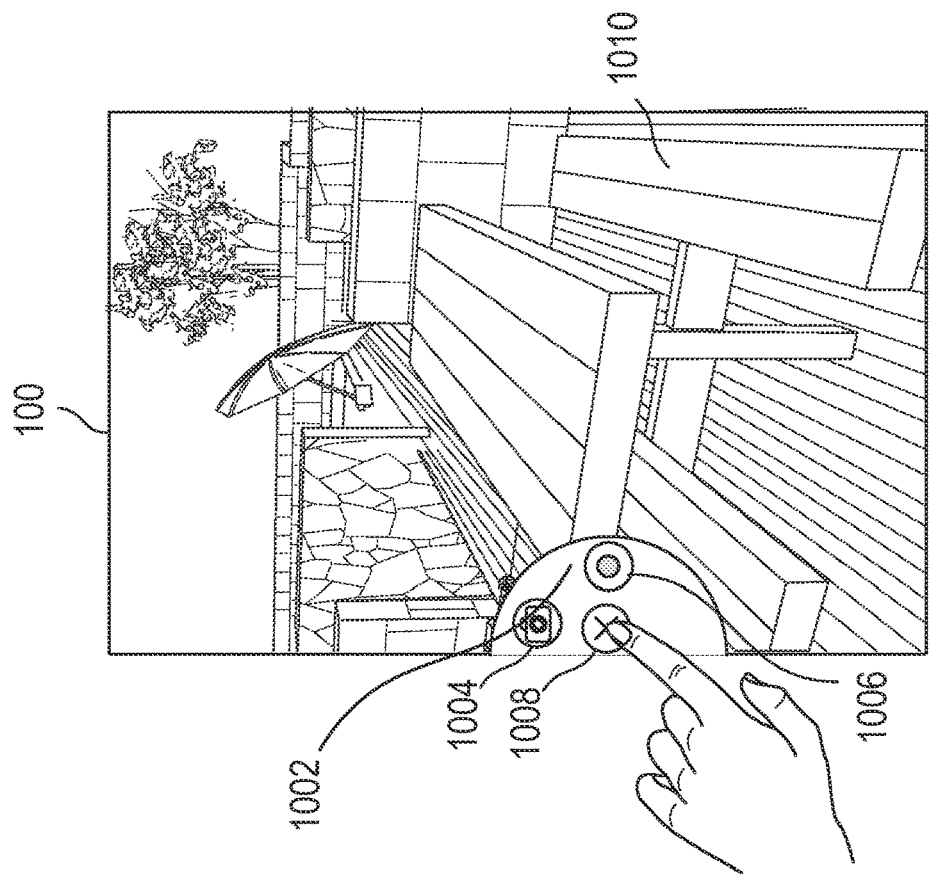
FIGS. 10A-10B illustrate exemplary messaging user interfaces.
Figure 10A:
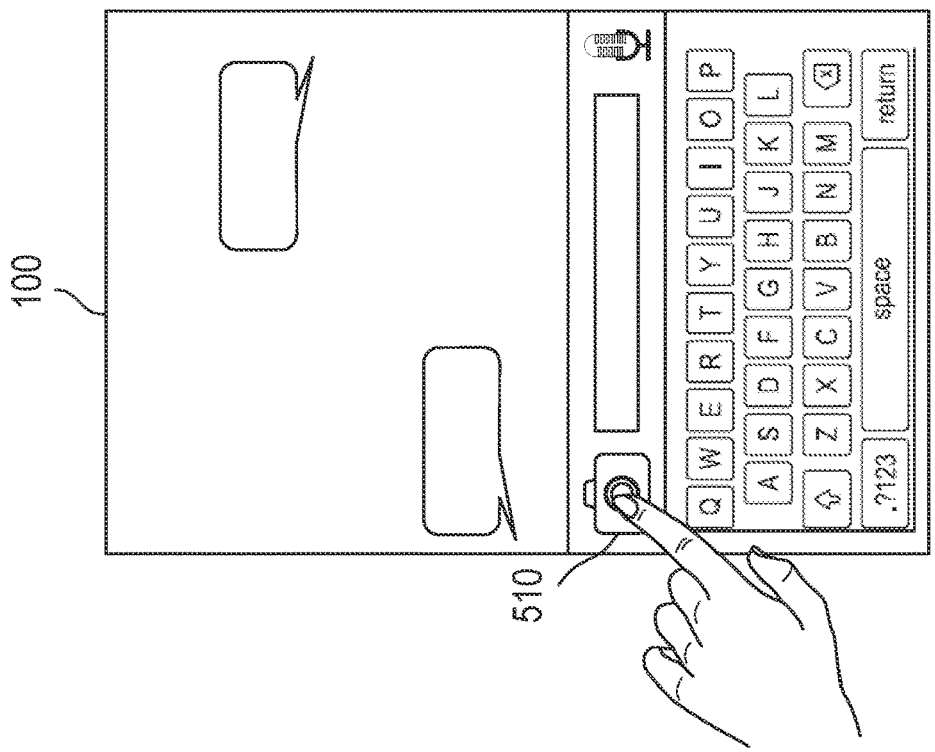

Device 100 can also capture and send camera images from within the messaging application. As shown in FIGS. 10A-10B, in response to detecting a contact on the visual-media capture affordance 510, device 100 can display a camera user interface. The camera user interface includes a media preview 1010 from a camera sensor on device 100, and a visually distinguished region 1002 containing an image affordance 1004 for capturing an image using the camera sensor and a record affordance 1006. The visual-media capture affordance 510 is replaced with a cancel affordance 1008. In some embodiments, the media preview replaces display of the message region.

In this embodiment, the visually distinguished region 1002 appears on the same side of the display as the visual-media capture affordance 510, and is vertically centered on the location corresponding to the visual-media capture affordance 510. Thus, as a user makes contact with the visual-media capture affordance 510, the visually distinguished region 1002 appears around the location of the visual-media capture affordance, and the cancel affordance replaces the visual-media capture affordance.

Figure 11B:
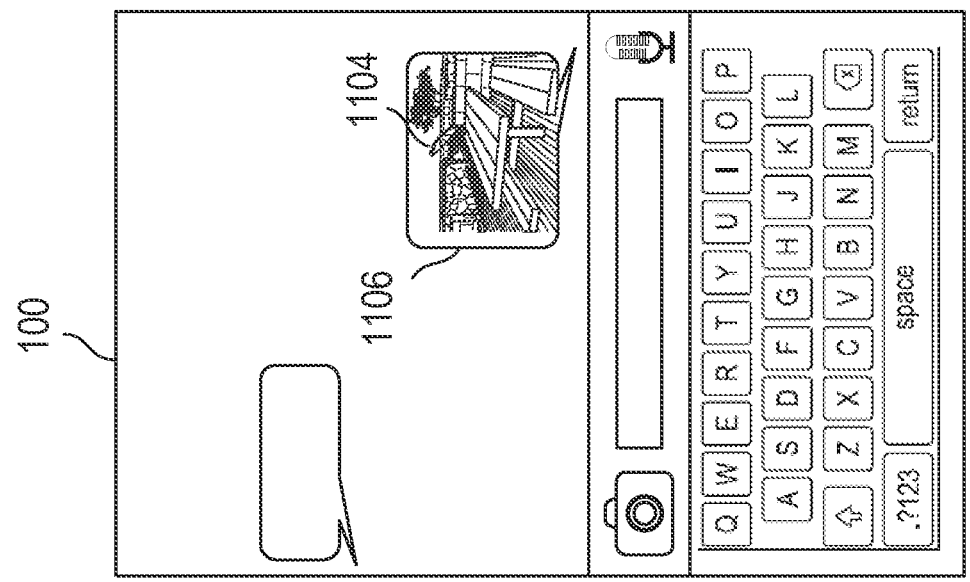
FIGS. 11A-11B illustrate exemplary messaging user interfaces.
Figure 11A:
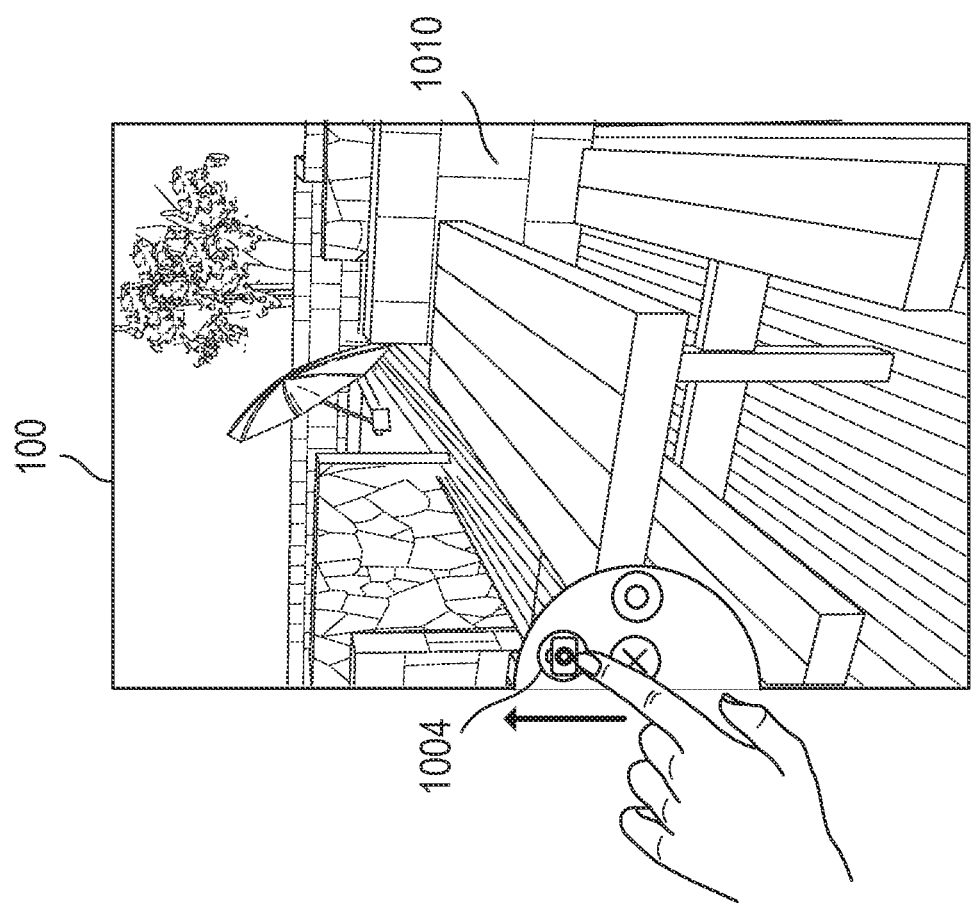

As depicted in FIGS. 11A-11B, in response to detecting a swipe gesture on the display to the image affordance 1004, device 100 can capture an image shown in the preview and send the image as a message to a participant. The swipe gesture may correspond to a movement of the contact across the display to the image affordance 1004, followed by a liftoff at the image affordance 1004. In some embodiments, device 100 can capture the image in response to detecting the movement, and send the image in response to the liftoff.

As shown in FIG. 11B, in some embodiments, after sending the image as a message, device 100 can cease to display the preview and re-display the message region, message compose field, and media affordances. Device 100 can display a thumbnail 1104 representing the captured image in a bounded message area 1106 that is inserted into the displayed message conversation.

FIGS. 11C-11E depict another technique device 100 can use for quick capture and send of an image from within the messaging application. As depicted in FIGS. 11A-11B, in response to detecting a contact on the visual media affordance, device 100 can expand the message compose field and display a camera preview in the message compose field. In response to detecting a liftoff of the contact from the visual media affordance, device 100 can capture an image. In some embodiments, the image may be displayed in the message compose field, and a user may enter text in the message compose field adjacent to the captured image. In some embodiments, the captured image may be sent as a message to a participant in response to detecting the liftoff from the visual-media affordance, or in response to detecting a contact on the send button. As depicted in FIG. 11C, after sending the image, device 100 can display a thumbnail representing the image in a bounded message area that is inserted into the displayed message conversation.

Device 100 can also capture and send a video from within the messaging application. As previously described with respect to FIG. 10A, in response to detecting a contact on the visual-media capture affordance 510, device 100 can display a camera preview and a visually distinguished region with an image affordance for capturing an image, a record affordance for capturing a video, and a cancel affordance for cancelling the media capture.

Figure 12A:
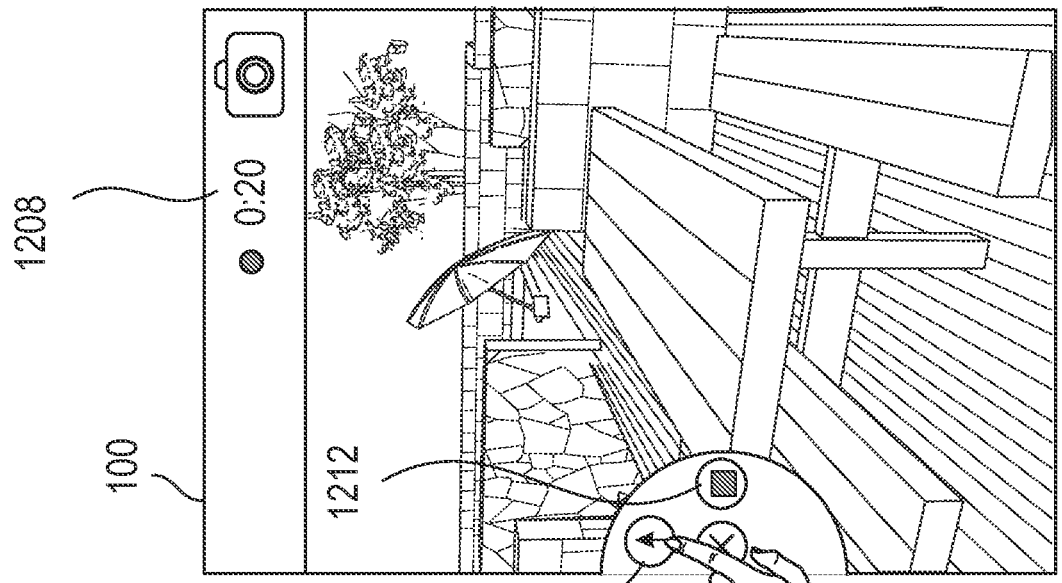
FIGS. 12A-12B illustrate exemplary messaging user interfaces.
Figure 12B:
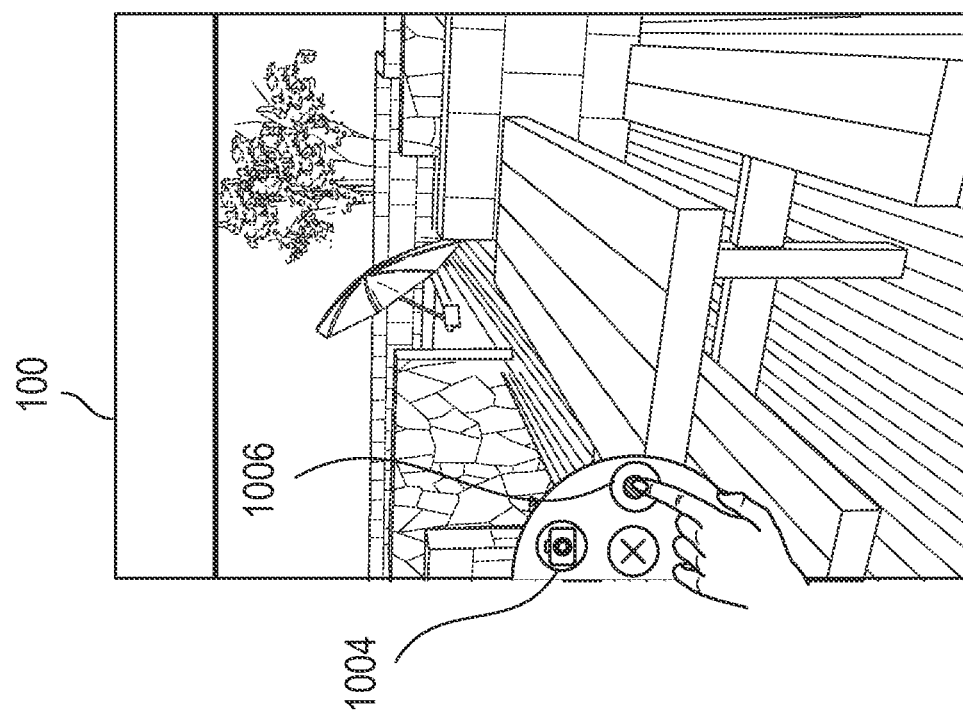

As depicted in FIGS. 12A-12B, in response to detecting a contact on the record affordance 1006, device 100 can begin recording a video, replace the record affordance with a stop affordance 1212 for ceasing to record the video, and replace the image affordance 1004 with a send affordance 1210 for sending the video to a participant. In some embodiments, device 100 can begin recording the video in response to detecting a movement of the contact onto the record affordance 1006, or in response to a touch or tap on the record affordance 1006. In some embodiments, while device 100 is recording a video, device 100 can display an indication of the elapsed recording time 1208.

Figure 13C:
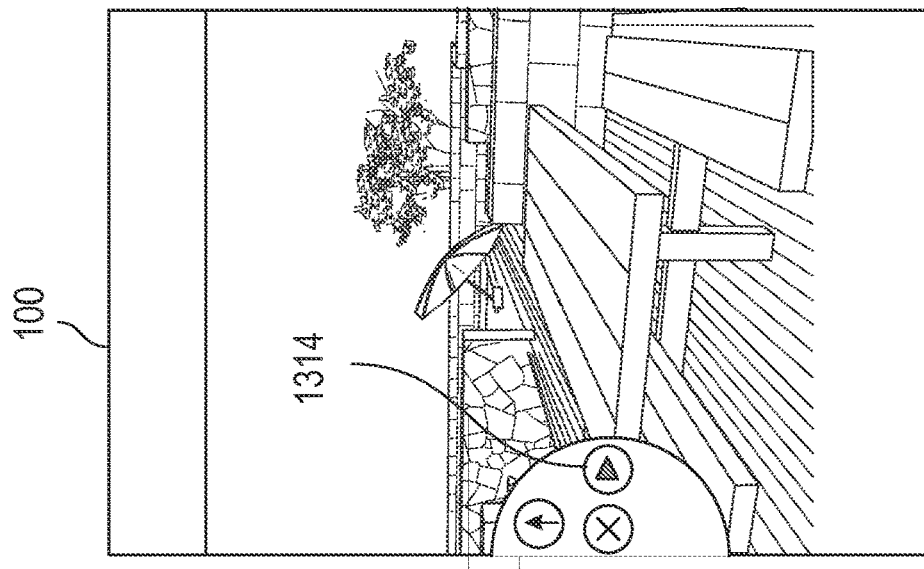
FIGS. 13A-13C illustrate exemplary messaging user interfaces.
Figure 13B:
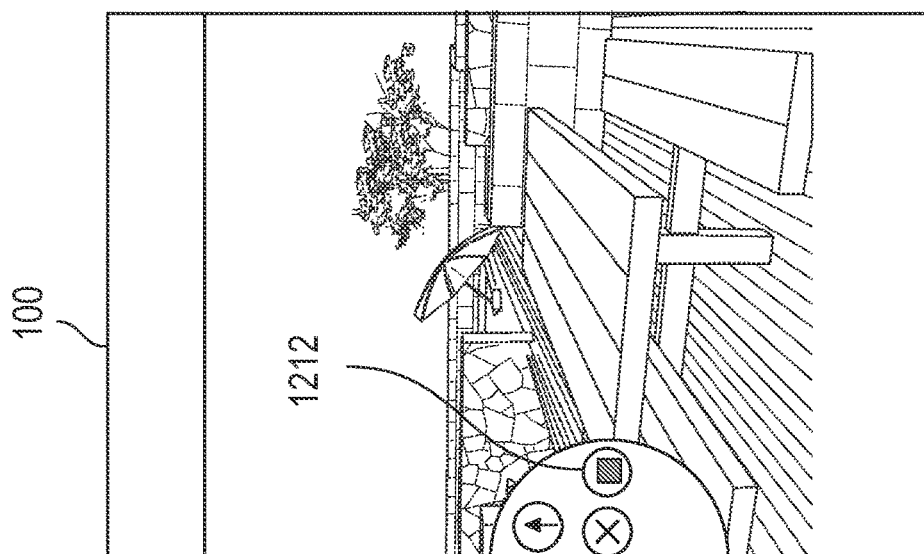
Figure 13A:
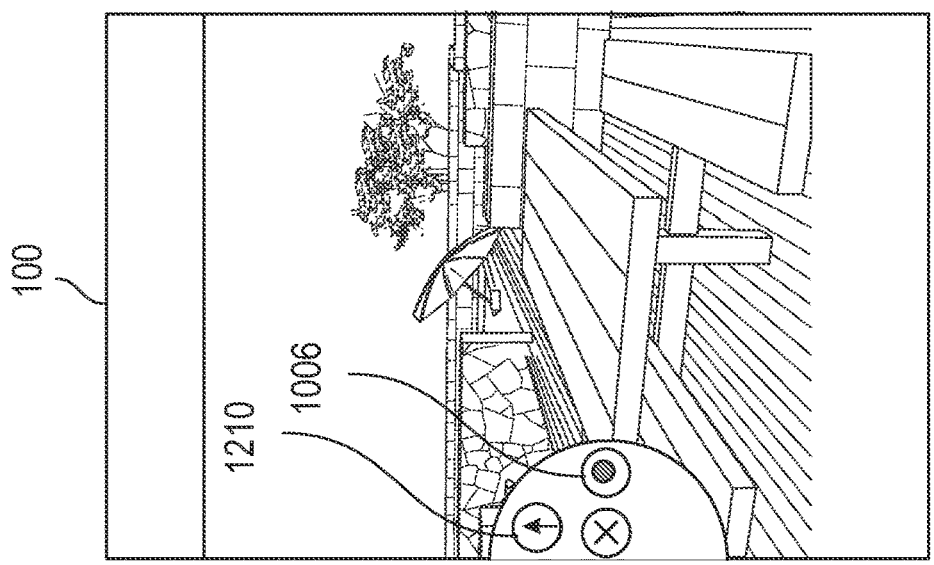

As depicted in FIGS. 13A-13C, in some embodiments, if device 100 detects that the contact has been lifted off of the display while device 100 is recording a video without detecting a contact on the send affordance 1410, device 100 can continue to record the video and replace display of the record affordance 1006 with display of a stop affordance 1212. While device 100 is recording the video, in response to detecting a contact on the stop affordance 1212, device 100 can stop recording the video and replace the stop affordance 1212 with a playback affordance 1314 for viewing the recorded video data before sending to a recipient.

Figure 14:
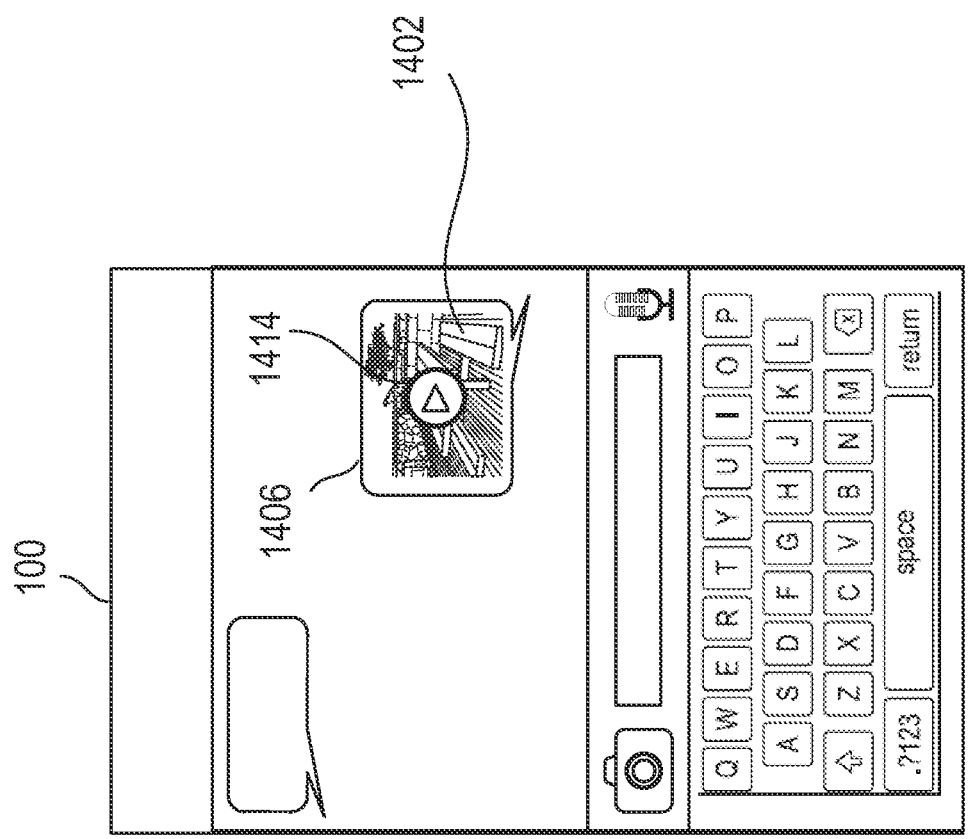
FIG. 14 illustrates an exemplary messaging user interface.

In response to detecting a contact on the send affordance 1210, device 100 can stop recording the video (if recording has not already been stopped) and send the recorded video to a participant in the message conversation. In some embodiments, as shown in FIG. 14, device 100 can insert a thumbnail 1402 of the video into the message conversation between the participants, and remove display of visually distinguished region, including the record affordance and the send affordance. In some embodiments, inserting the thumbnail includes displaying the thumbnail 1402 and a playback affordance 1414 in a bounded message area 1406 in the message region. In some embodiments, in response to detecting a contact on the playback affordance 1414 in the bounded message area 1406, device 100 can play the video within the boundaries of the bounded message area 1406. In some embodiments, in response to detecting a contact on the playback affordance 1414, device 100 can play the video in a full-screen mode.

Returning to FIG. 12A, in some embodiments, device 100 can stop recording the video in response to detecting a liftoff from the record affordance 1006 while device 100 is recording the video. In some embodiments, after detecting the liftoff from the record affordance 1006 and stopping the recording of the video, device 100 can replace display of the record affordance 1006 with display of a playback affordance 1314 for viewing the video before it is sent to the recipient, as depicted in FIG. 13C.

Thus, in some embodiments, while the visually distinguished region is displayed, a swipe upwards to the image affordance captures and sends an image, while a swipe over to the record affordance followed by a swipe upwards towards the send affordance captures and sends a video.

In some embodiments, the visual-media capture affordance 504 depicted in FIG. 10A can be used for selecting one or more existing images or videos to add to the message conversation. These images may have been captured using an application other than the messaging application; for example, such images or videos may have been captured using a camera application executing on device 100 or executing on a remote device, or may have been captured by another user using a different application either on device 100 or on a remote device. Such existing images or videos may be stored in the memory of device 100 or accessed from a remote storage location.

Figure 15B:
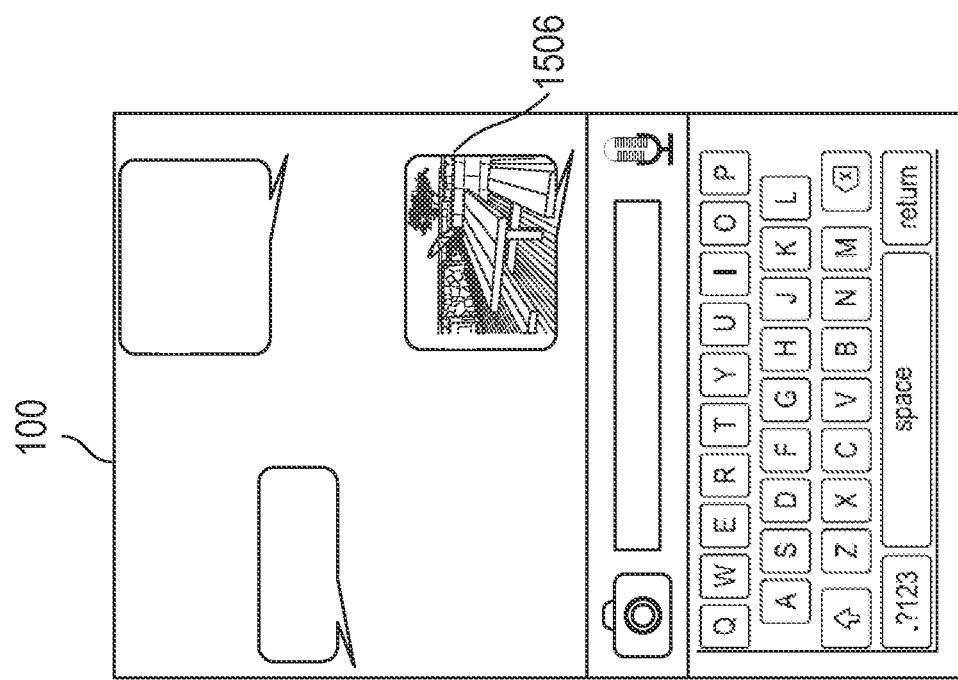
FIGS. 15A-15B illustrate exemplary messaging user interfaces.
Figure 15A:
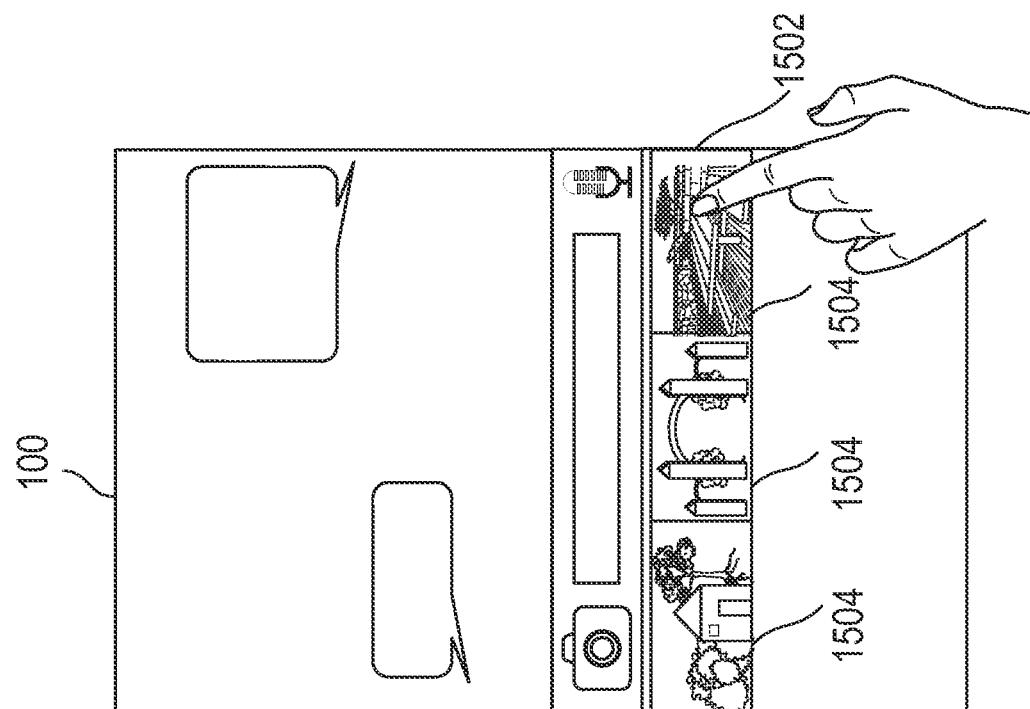

FIG. 15A displays an exemplary media selector interface that device 100 can display in response to detecting a request to add media to a conversation, such as a contact on the visual-media capture affordance 504. The media selector interface can enable a user to select one or more existing images, videos, or audio files to add to the message conversation. In some embodiments, the media selector interface is displayed below the message region while a message conversation is displayed. The media selector interface includes a filmstrip 1502 with several thumbnails 1504 representing existing images or videos. In some embodiments, the thumbnails 1504 represent the most recently captured or accessed images, videos, or audio files. In some embodiments, in response to detecting a swipe gesture on a location associated with a filmstrip 1502, device 100 can scroll the filmstrip in accordance with the swipe gesture.

In some embodiments, in response to detecting a contact on a particular thumbnail 1504, device 100 can send the image, video, or audio file associated with the thumbnail to a participant in the message conversation and insert a representation 1506 of the image, video, or audio file into the conversation, as depicted in the example of FIG. 15B.

In some embodiments, in response to detecting a contact on a particular thumbnail 1504 in the filmstrip 1502, device 100 can display an image or video represented by the thumbnail. In some embodiments, the image or video can be displayed in a larger version of the image represented by the thumbnail, such as in a full-screen view.

In some embodiments, one thumbnail in a filmstrip 1502 can represent a camera preview. In response to detecting a selection of the thumbnail representing the preview, device 100 can capture a new image using a camera on device 100 and send the new image to a participant in the conversation.

Figure 16A:
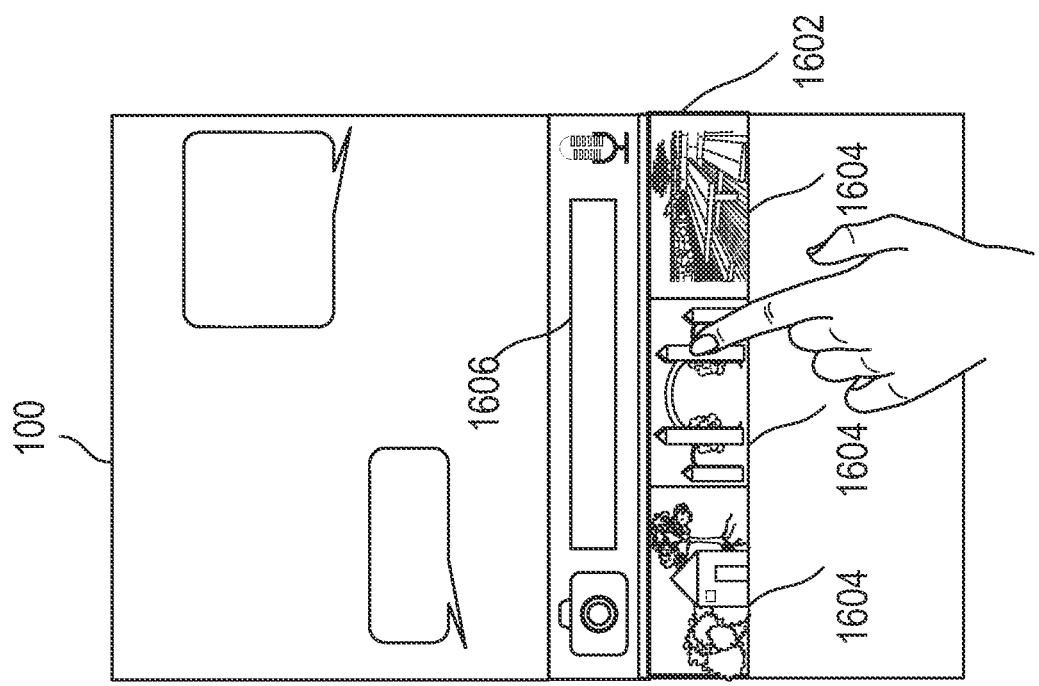
FIGS. 16A-16B illustrate exemplary messaging user interfaces.
Figure 16B:
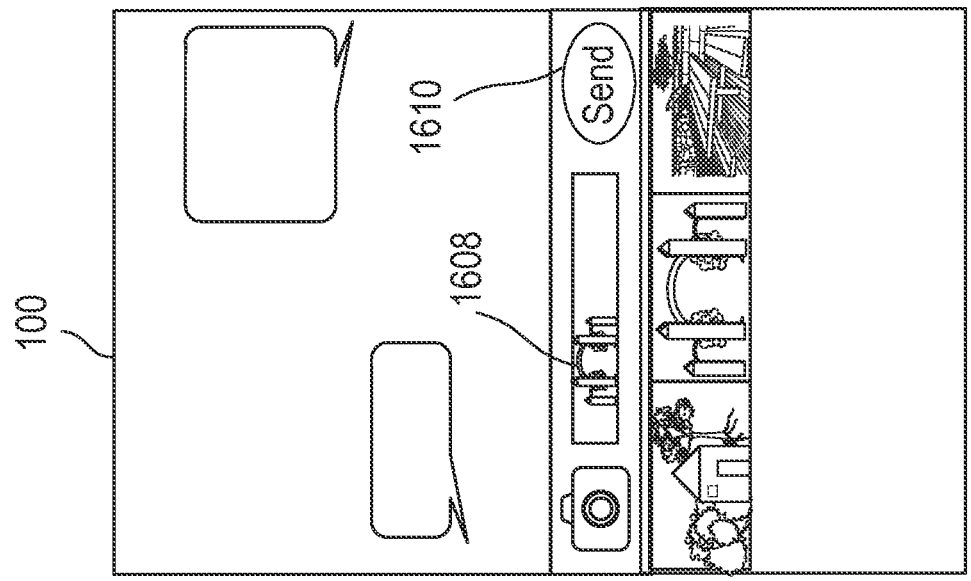

FIGS. 16A-16B depict another embodiment of a media selector interface for adding media to a conversation. In this embodiment, the filmstrip 1602 is displayed below the message compose field 1606. In response to detecting a selection of a thumbnail 1604 in the filmstrip, device 100 can display a representation 1608 of the selected thumbnail in the message compose field 1606 and replace display of the audio capture affordance with display of a send button 1610 for sending the image to a participant in the message conversation. In response to detecting a contact on the send button 1610, device 100 can send the image to the participant, and insert a representation of the sent image into the conversation, as previously shown and described with respect to FIG. 11B.

In some embodiments, device 100 can detect selection of two or more thumbnails 1604 in a filmstrip followed by a selection of the send button 1610. In response to detecting this sequence of selections, device 100 can send two or more images or videos corresponding to the selected thumbnails to a participant in the message conversation.

Figure 17C:
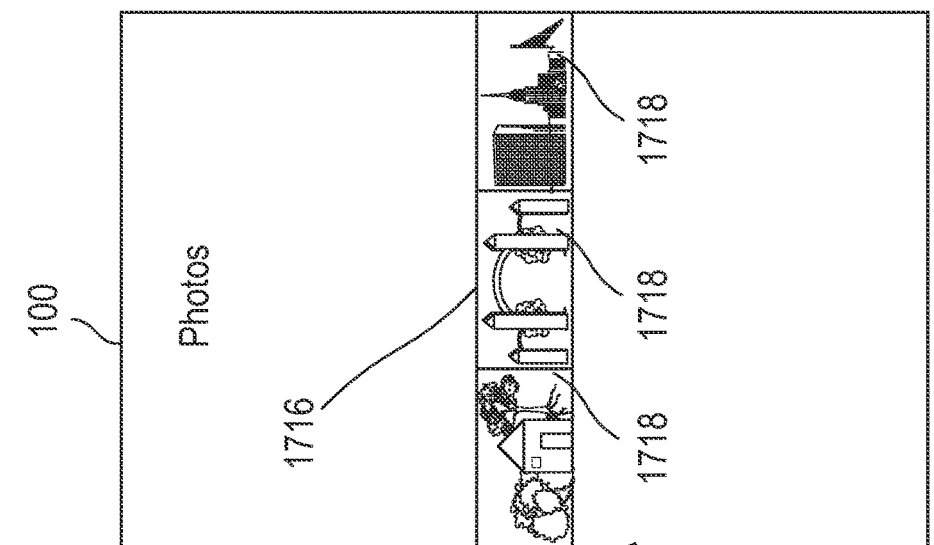
FIGS. 17A-17C illustrate exemplary messaging user interfaces.
Figure 17B:
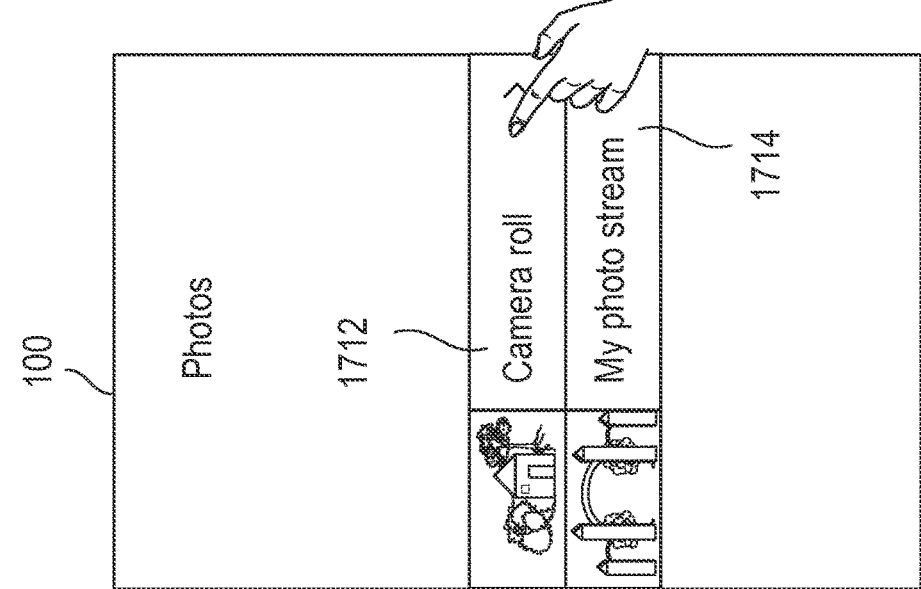
Figure 17A:
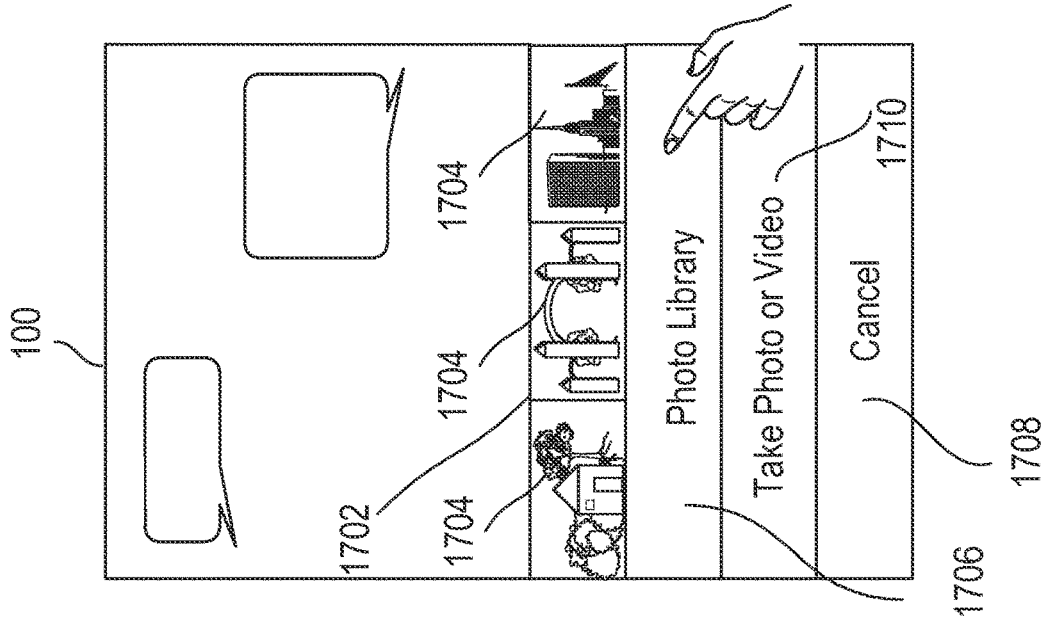

FIGS. 17A-17C depict another embodiment of a media selector interface for adding media to a conversation. As depicted in FIG. 17A, device 100 can display a filmstrip 1702 with thumbnails 1704 along with a photo library button 1706 for selecting an image or video from a library, a take photo button 1710 for capturing a new photo or video, and a cancel button 1708 for cancelling and exiting the display of the media selector interface. In some examples, the thumbnails 1704 in the filmstrip represent the most recently captured or accessed images or videos.

In response to detecting a selection of the photo library button 1706, device 100 can display a list of photo libraries 1712, 1714. In response to detecting a selection of a photo library in the list, device 100 can display another filmstrip 1716 with thumbnails 1718 of images or videos from the selected photo library. In response to detecting a selection of a particular thumbnail 1718, device 100 can display the image or video represented by the thumbnail or send the corresponding image or video to a participant in the conversation, as described above with respect to FIG. 15A.

Figure 18C:
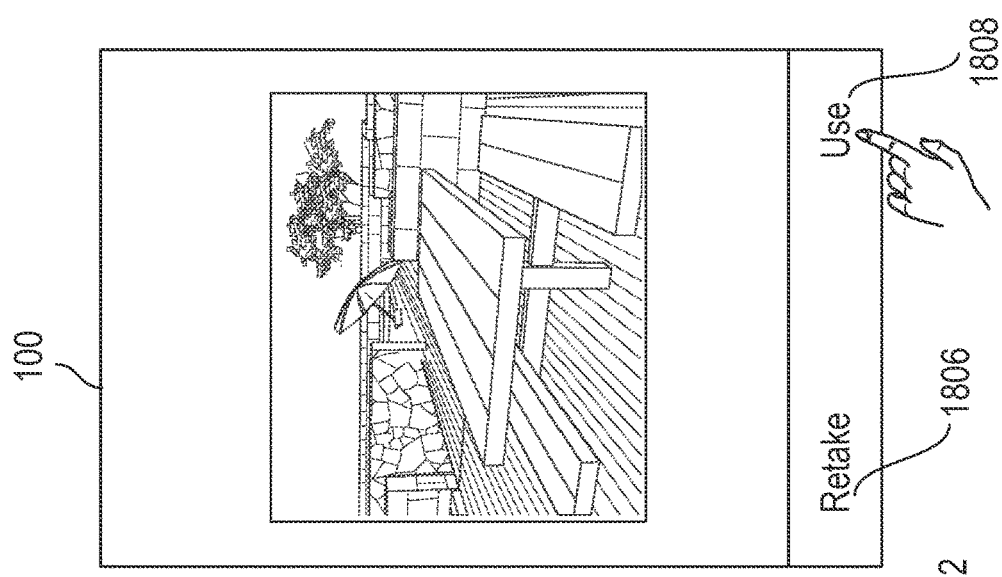
FIGS. 18A-18C illustrate exemplary messaging user interfaces.
Figure 18B:
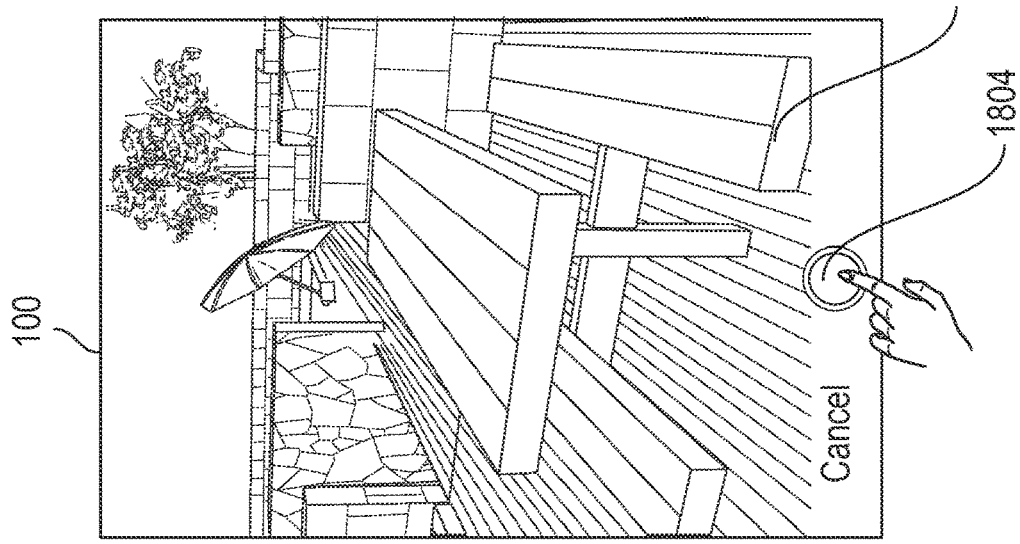
Figure 18A:
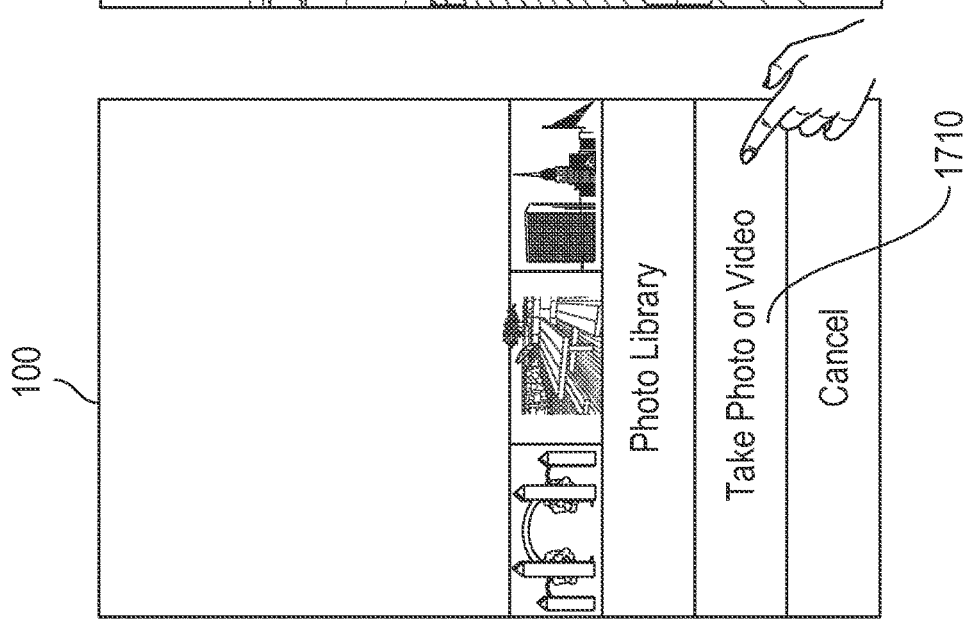

Turning to FIGS. 18A-18C, as depicted in FIG. 18B, in response to detecting a selection of the take photo button 1710 for taking a new photo or video, device 100 can display a user interface for capturing a new image or video. The user interface can include a live camera preview 1802 and a capture button 1804 for capturing the image. As depicted in FIG. 18C, in response to detecting a selection of the capture button 1804, device 100 can capture the image shown in the preview and display the captured image on the display with a retake button 1806 for retaking the image (e.g., for capturing another image) and a use button 1808 for sending the captured image to a participant. In response to detecting a contact on the use button 1808, device 100 can immediately send the captured image to the participant and return to the display of the message conversation. In some embodiments, device 100 can insert a representation of the sent image into the conversation, as described earlier with respect to FIG. 11B.

In some embodiments, the visual-media capture affordance can be used for both adding existing media to a conversation and for capturing new media to add to the conversation. Returning to FIG. 10A, in some embodiments, in response to detecting a contact at a location on the display corresponding to the visual-media capture affordance 504, device 100 can determine the duration of the contact. If the duration is greater than a threshold duration—for example, if the contact is a touch-and-hold on the visual-media capture affordance—device 100 can respond as described above with respect to FIGS. 10A-13C, and display user interfaces for capturing and sending an image or video from within the messaging application. However, if the duration of the contact does not exceed the threshold duration—for example, if the contact is a short tap on the visual-media capture affordance 504—then device 100 can display media selector interfaces for selecting one or more existing images or videos to add to the message conversation. The threshold duration may be in the range of 0.5 seconds to 10 seconds, for example.

Figure 19B:
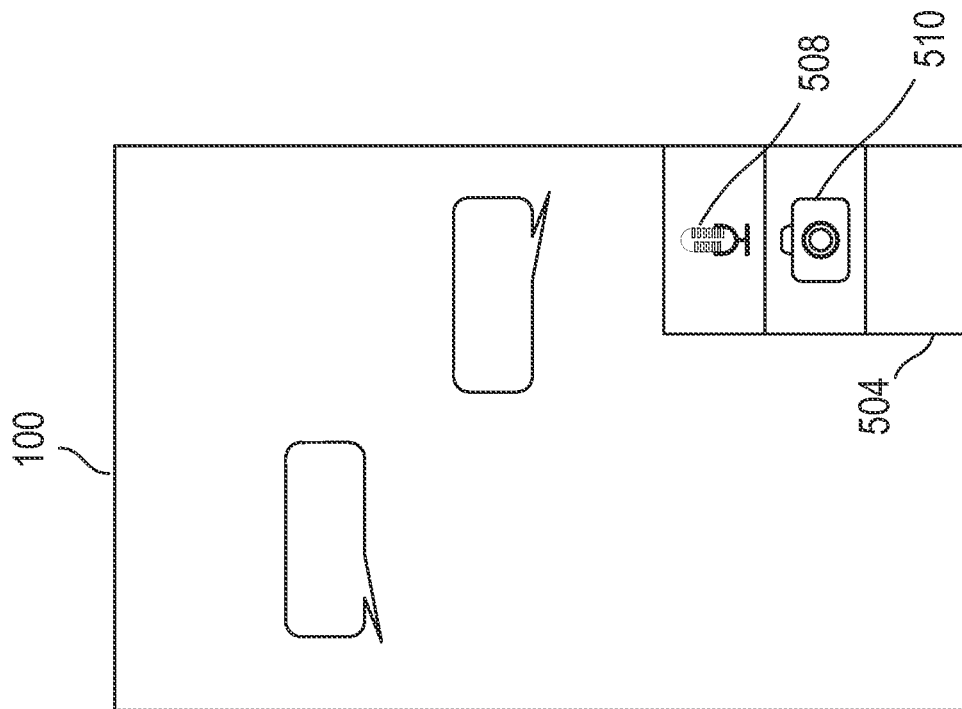
FIGS. 19A-19B illustrate exemplary messaging user interfaces.
Figure 19A:
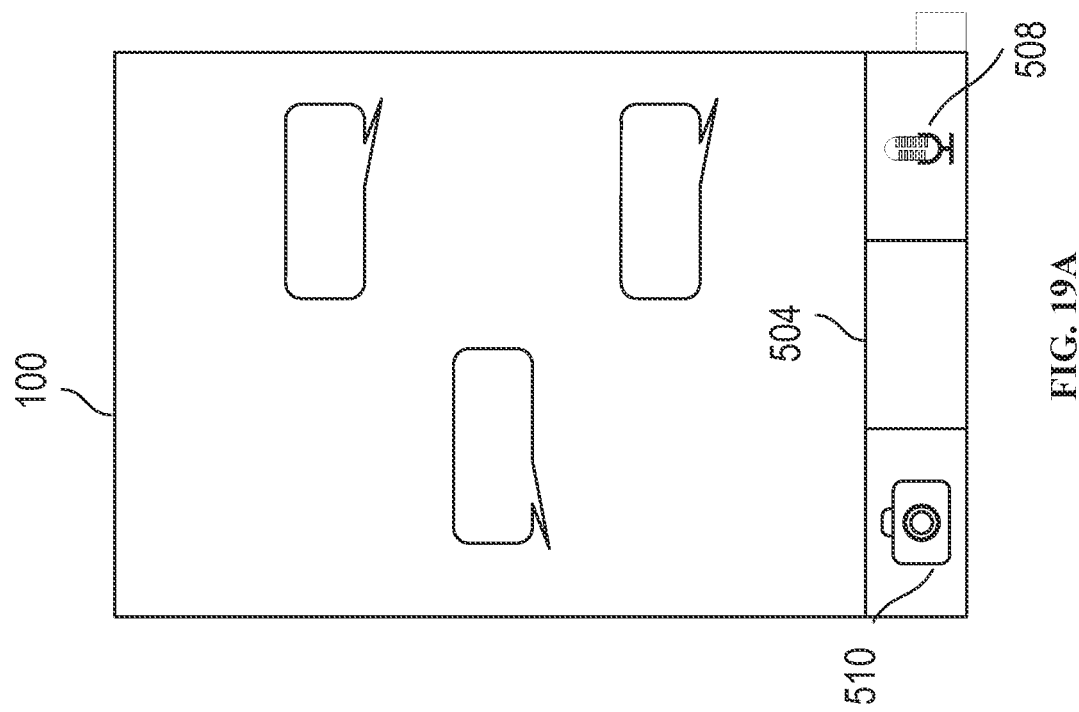

The user interfaces depicted in FIGS. 5A-12B depict media affordances and a message compose field displayed horizontally across a middle portion of the display on device 100, with each media affordance (the visual-media capture affordance and the audio capture affordance) displayed along an opposite edge of the display, on either side of the message compose field. Such locations may be appropriate when a virtual keyboard is displayed on the display for entering a message to the recipient, as depicted for example in FIGS. 5A-6B. However, the media affordances and message compose field need not be displayed in the locations or orientations shown in FIGS. 5A-12B. FIGS. 19A-19B depict exemplary alternative locations at which device 100 can display the audio capture affordance 508, visual-media capture affordance 510, and message compose field 504. Such alternative locations may be appropriate when a virtual keyboard is not displayed on the display, and may provide for a larger message region for displaying a message conversation.

As depicted in FIG. 19A, in some embodiments, device 100 can display audio capture affordance 508 at a corner of the display. As shown in FIG. 20, in response to detecting a contact on audio capture affordance in the corner, device 100 can display a visually distinguished region 2002 that is bounded by an arc 2004 that begins and ends at two different edges 2006, 2008 of the touch-sensitive display, rather than displaying a semi-circle that begins and ends at the same edge of the display as described earlier with respect to FIGS. 5A-12B. As previously described with respect to FIG. 8, in response to detecting a movement of the contact on the display away from the location of the audio capture affordance 508, device 100 can expand the visually distinguished region 2002. In some embodiments, the locations of the affordances displayed inside the visually distinguished region can move outwards in accordance with the expansion of the visually distinguished region.

Figure 19D:
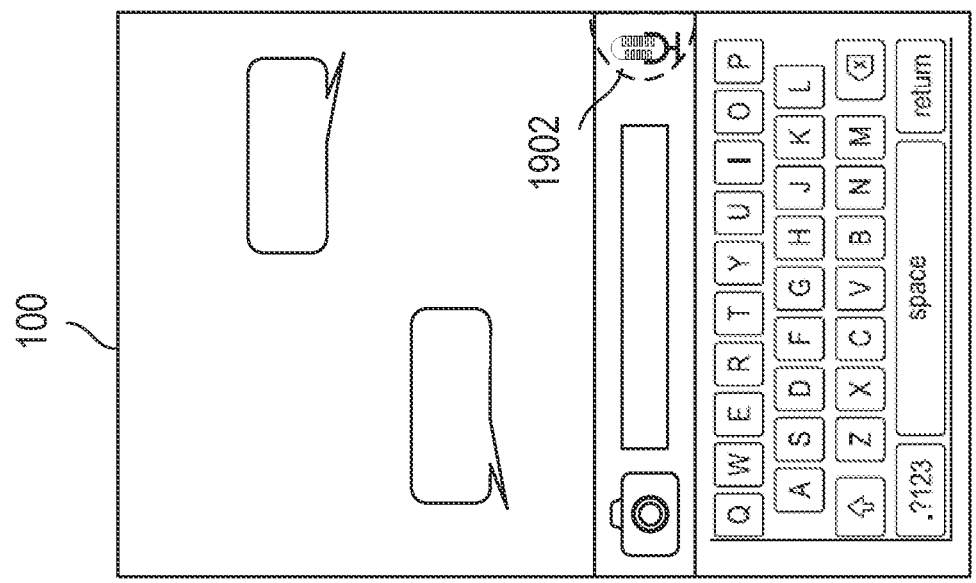
FIGS. 19C-19D illustrate exemplary messaging user interfaces.
Figure 19C:
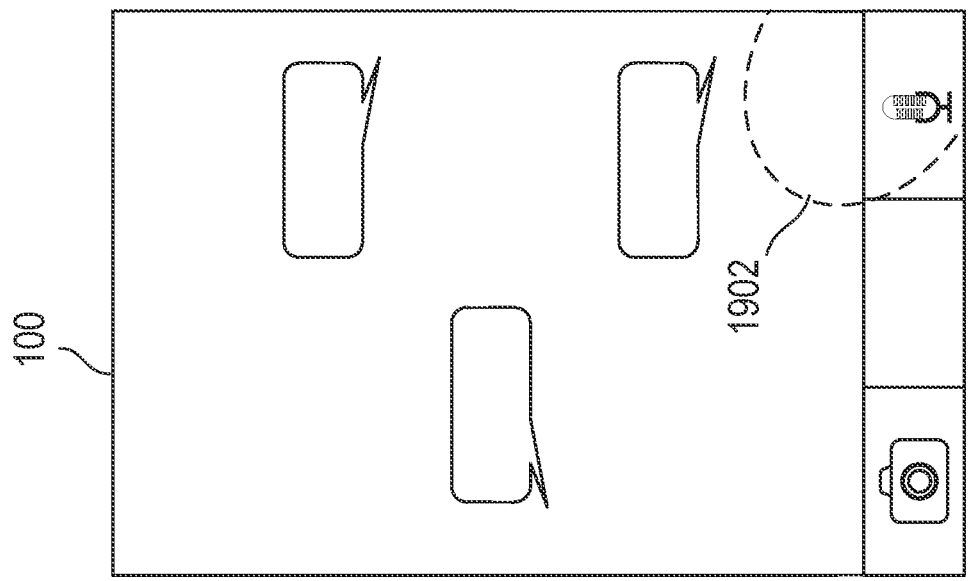

In some embodiments, a hit region on the display can be assigned to a media affordance, such that a contact anywhere on the hit region can be interpreted by device 100 as a contact on the media affordance. In some embodiments, a hit region can be larger than the displayed media affordance. As depicted in FIGS. 19C-19D, in some embodiments, a hit region 1902 for a media affordance can be larger when a virtual keyboard is not displayed, such as in FIG. 19D, than when the virtual keyboard is displayed, such as in FIG. 19C. For example, when the virtual keyboard is displayed, the hit region for the media affordance may be slightly larger than the media affordance (e.g., 5, 10, 15, or 20% larger than the media affordance) and when the virtual keyboard is not displayed, the hit region for the media affordance may encompass up to half of the bottom quarter of the display. This approach may allow the user to more easily invoke detection of a contact on the media affordance when there is sufficient room on the display to allow for a larger hit region.

Figure 21B:
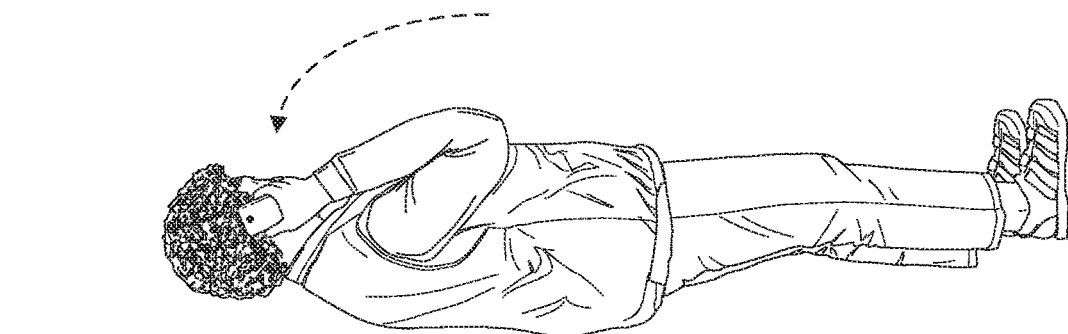
FIGS. 21A-21B illustrate exemplary messaging user interfaces.
Figure 21A:
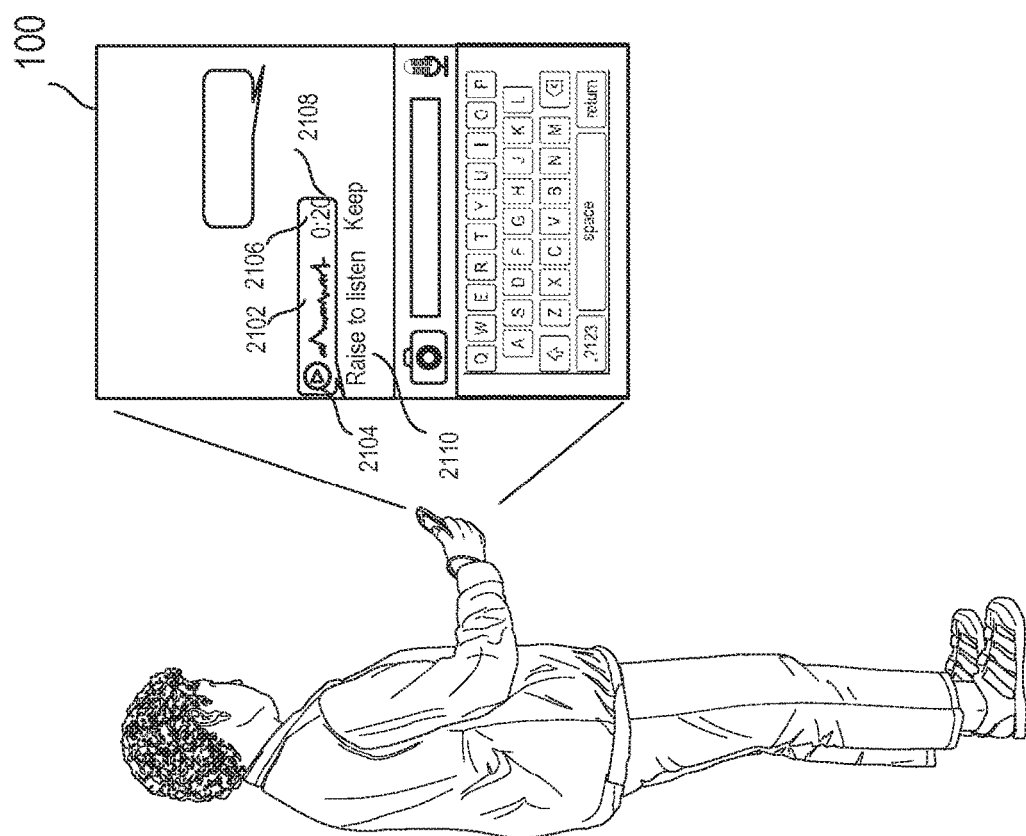

Device 100 can also play a received audio message. In some embodiments, as shown in FIGS. 21A-21B, in response to receiving an audio message from a first participant, device 100 can display a representation 2108 of the audio message in the message conversation. In this embodiment, the representation includes an image depicting a waveform 2102 representing the audio message, a playback affordance 2104 for playing the audio message, and a duration of the audio message 2106. In some embodiments, the representation can be displayed within a bounded message region. In response to detecting a contact on the playback affordance 2104, device 100 can play the audio message.

In some embodiments, after displaying the representation 2108 of the audio message, device 100 can play the audio message in response to detecting a raising of the device. Device 100 can detect that a user has raised device 100 by, for example, using one or more device motion or orientation sensors to detect movement of device 100 and/or using a proximity sensor or ambient light sensor to detect the proximity of device 100 to the user's ear. Returning to FIG. 21A, in some embodiments, device 100 may prompt the user to play the audio message in this manner by displaying an instruction 2110 instructing a user to raise device 100 to listen to the message.

As depicted in FIGS. 22A-22C, in some embodiments, device 100 can record a second audio message in response to detecting a raising of device 100. For example, if device 100 has played the received audio message (which may be indicated, as depicted in FIG. 22A, by displaying the waveform or playback affordance in a different color) and device 100 detects a raising of device 100, device 100 can begin recording the second audio message. If device 100 has played the received audio message in response to detecting a raising of the device (rather than, for example, in response to detecting a contact on the playback affordance) then device 100 may record the second audio message only after detecting a lowering of device 100 prior to detecting a second raising of device 100. In other words, a user may raise device 100 to listen to an audio message, lower device 100, and then raise device 100 again to record a new audio message. In some embodiments, device 100 can prompt the user to raise device 100 to record a message by displaying an instruction instructing a user to raise device 100 to record an audio message.

Figure 22D:
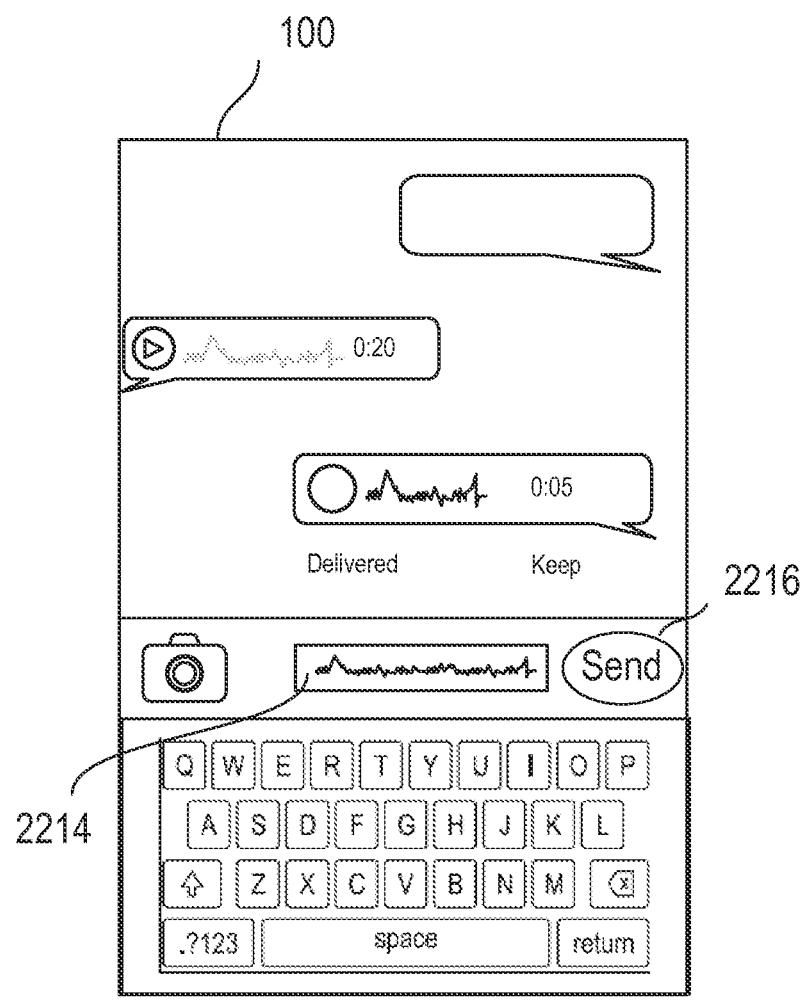

If, while recording the second audio message, device 100 detects a lowering of device 100, device 100 can stop recording the second audio message and send the second audio message to the first participant. Lowering of the device may be detected by, for example, using one or more device motion/orientation sensors to detect movement of the device and/or using a proximity sensor or ambient light sensor to detect an end of the proximity of the device to the user's ear. Thus, as described with respect to FIGS. 22A-22B, after receiving and listening to an audio message from a participant in the message conversation, the user can respond by raising device 100 to record a second audio message, and then lowering device 100 to automatically send the second audio message to the participant. In some embodiments, as depicted in FIG. 22C, device 100 can insert a representation of the sent second audio message into the conversation. In some embodiments, device 100 can determine that a recorded message should not be sent based on characteristics of the message (e.g., no detected human speech, or message duration is too long therefore indicative of accidental-messaging and thus a waste of computing resources). This aspect is shown in FIG. 22D. As depicted, device 100 displays message affordance 2214 indicating that a message has been recorded, but the message is not automatically sent upon lowering of the device. Rather, device 100 displays affordance 2216, which, when selected, sends the message to the designated contact.

Figure 23C:
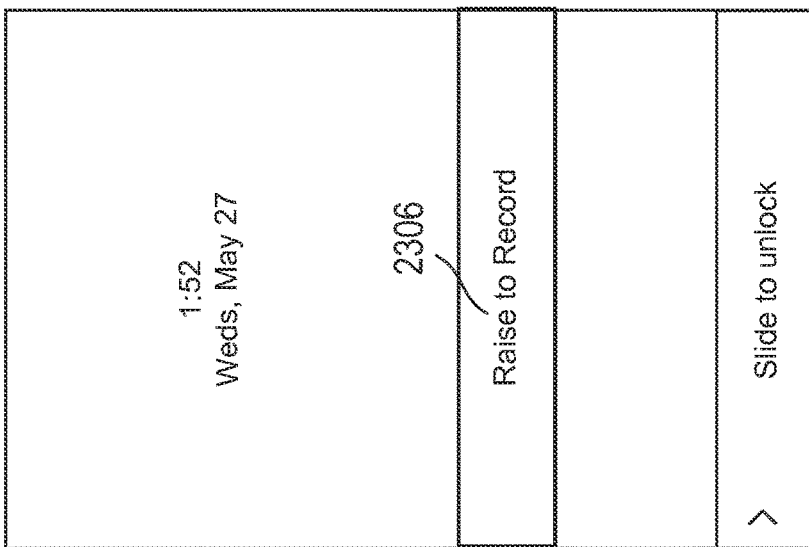
FIGS. 23A-23C illustrate exemplary messaging user interfaces.
Figure 23B:
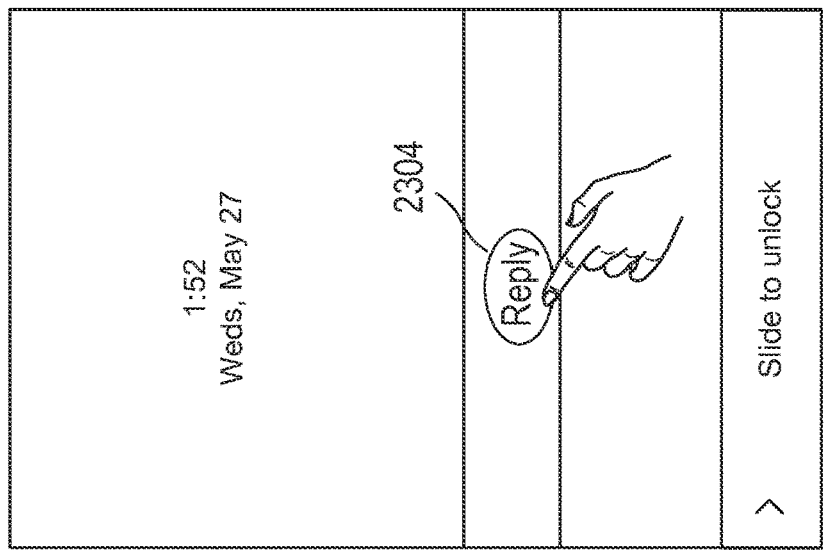
Figure 23A:
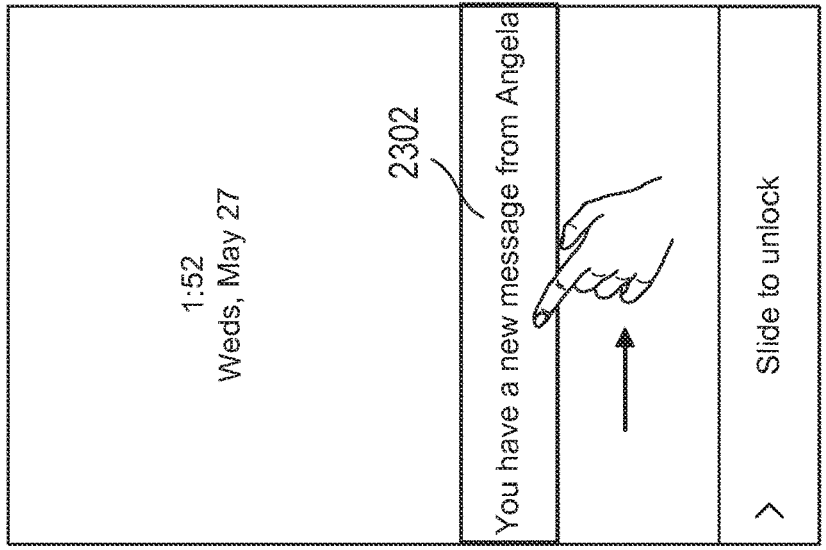

As depicted in FIG. 23A, in some embodiments, device 100 can display an affordance 2302 indicating a received message while device 100 is operating in a locked state. A locked state may be a state in which device 100 limits user interaction with device 100.

As depicted in FIG. 23B, in response to detecting a swipe gesture in a first direction on the affordance 2302, device 100 can display a reply affordance 2304 for replying to the message. As shown in FIG. 23C, in response to detecting a contact on the reply affordance 2304, device 100 can display an instruction 2306 instructing the user to raise the electronic device to record an audio message to send in a response message. In response to detecting a raising of device 100, device 100 can begin recording an audio message as previously described with respect to FIGS. 22A-22B, and similarly, in response to a subsequent lowering of the device, device 100 can send the audio message as described above with respect to FIG. 22C.

Returning to FIG. 23A, in response to detecting a swipe gesture on the affordance 2302 in the opposite direction, device 100 can prompt the user to unlock device 100 and, after device 100 is unlocked, device 100 can display the received message as part of a displayed message conversation.

In some embodiments, as shown in FIG. 24A, device 100 can display a notification 2402 of a received audio message in a notification area 2404 of the display. As shown in FIG.

24B, in response to detecting a contact on the notification 2402 or the notification area 2404, such as a downward drag or a tap, device 100 can display a user interface with a play affordance 2406 for playing the audio message, an audio capture affordance 508 for recording a reply audio message, and a cancel affordance 2408 for exiting the user interface. In some embodiments, as shown in FIG. 24C, in response to detecting a contact on the audio capture affordance 508, device 100 can display a visually distinguished region 2410 with a plurality of affordances for recording and sending an audio message, as shown and described with respect to FIGS. 6B and 20, for example.

Similar to the above-described processes for recording audio messages, in some embodiments, device 100 can play, record, and send video messages in response to detecting raising and lowering of device 100. In such embodiments, device 100 may use facial recognition techniques to determine whether device 100 has been raised into a suitable position for playback or recording of a video message.

In some embodiments, media captured by device 100 using the user interfaces described above may include meta-data. Such meta-data may include a representation of a location of device 100, for example. In some embodiments, device 100 can provide an option to allow a user to designate whether to prevent sending the meta-data with the media.

As previously discussed, device 100 can send and receive messages containing media (such as audio, video, or image), text, or both. In some embodiments, if device 100 receives multiple messages within a time interval, and the received messages meet a message grouping criteria, device 100 can represent the messages within a single, group bounded message area rather than representing the messages in multiple bounded message areas. The time interval may range from 10 seconds to ten minutes, for example.

Grouping representations of messages in this manner can reduce the amount of area required in the message region for displaying messages, and may reduce the clutter associated with receiving multiple messages. Grouping may be particularly useful for audio messages, which can be compressed into relatively small representations for display.

In some embodiments, the message grouping criteria can include a criterion that is met when the number of messages exceeds a numeric threshold. For example, if device 100 receives some number of consecutive messages within the time interval, and the number exceeds the numeric threshold, device 100 can determine that the messages satisfy the message grouping criteria and display representations of the messages within a single group bounded message area. The numeric threshold may be 3, 5, 7, or 10 messages received within the time interval, for example.

In some embodiments, the message grouping criteria includes a criterion that is met when the received messages are spaced apart from each other by less than a threshold amount of time. For example, consecutive messages that are spaced apart from each other by less than 30, 20, 10, or 5 seconds may meet the message grouping criteria. For example, if device 100 receives a text message followed by an audio message less than 30 seconds later, device 100 can determine that the messages meet the message grouping criteria and display a grouped representation of the messages in the conversation.

In some embodiments, the message grouping criteria can be based on the type of message received. For example, if device 100 receives multiple consecutive audio messages within the time interval, device 100 can determine that the messages satisfy the message grouping criteria. If, however, device 100 receives intervening messages that are not audio messages, device 100 can determine that the received messages do not satisfy the message grouping criteria and display representations of the received messages in separate bounded message areas.

In some embodiments, the message grouping criteria can be based on the sender of the message. For example, consecutive messages received from a single participant in the message conversation may satisfy the message grouping criteria, but consecutive messages received from different participants may not satisfy the message grouping criteria.

In some embodiments, the message grouping criteria can be based on whether the messages all have the same read status. In some embodiments, the read status corresponds to whether the message has been read, played, or viewed. For example, consecutive audio messages that are all unread (e.g., un-played) may satisfy the message grouping criteria, but consecutive audio messages having different read statuses—that is, some of which have been played, and some of which have not been played—may not satisfy the message grouping criteria.

Figure 25B:
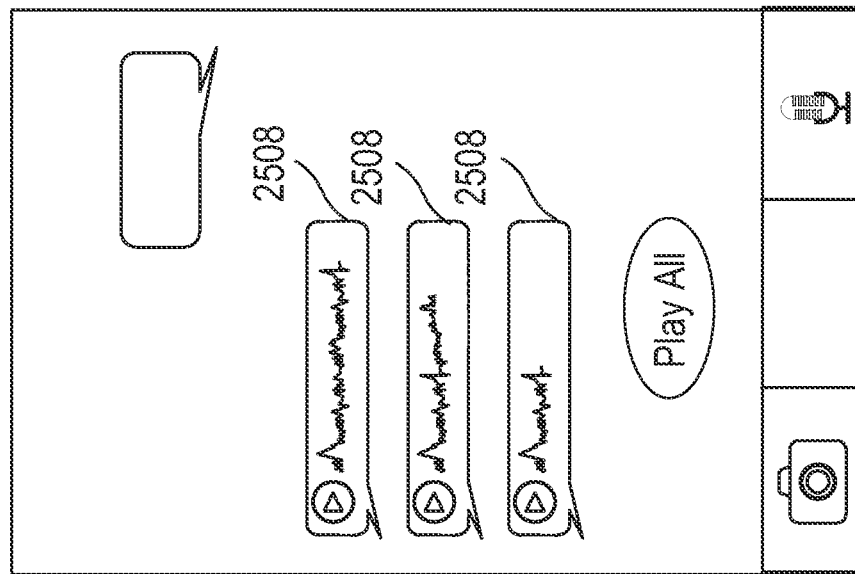
FIGS. 25A-25B illustrate exemplary messaging user interfaces.
Figure 25A:
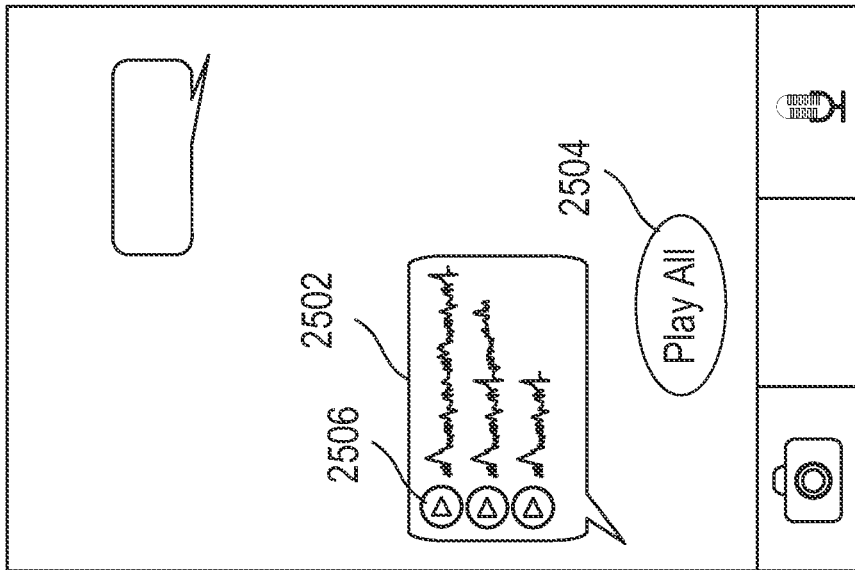

FIG. 25A depicts an example of displaying representations of multiple audio messages that meet a message grouping criteria in a grouped bounded message area 2502. In some embodiments, device 100 can display a play-all affordance 2504 for playing all of the grouped audio messages, in addition to or instead of displaying a playback affordance 2506 for each individual audio message. In some embodiments, device 100 can play back all of the grouped audio messages in response to detecting a raising of device 100. In some embodiments, device 100 can display an instruction instructing a user to raise device 100 to play all of the multiple grouped audio messages.

In the embodiment depicted in FIG. 25A, each of the audio messages is represented by a separate waveform image. However, in some embodiments, device 100 can display a single, composite waveform representing the multiple grouped audio messages.

FIG. 25B depicts an example of displaying multiple audio messages that do not meet the message grouping criteria in a plurality of bounded message areas 2508.

In some embodiments, in response to detecting a contact on a grouped bounded message area 2502, such as shown in FIG. 25A, device 100 can display the audio messages represented by the grouped bounded message area 2502 in separate bounded message areas 2508, such as shown in FIG. 25B.

Figure 25E:
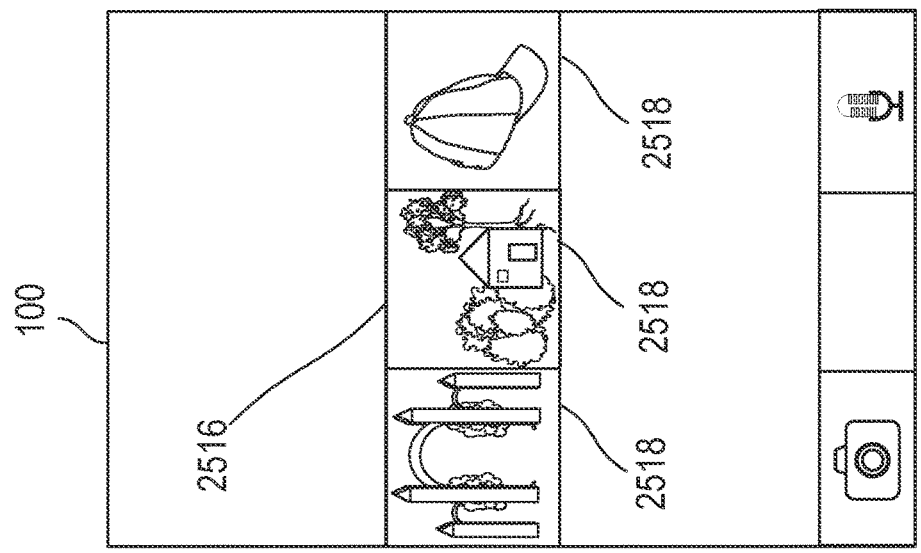
FIGS. 25C-25E illustrate exemplary messaging user interfaces.
Figure 25D:
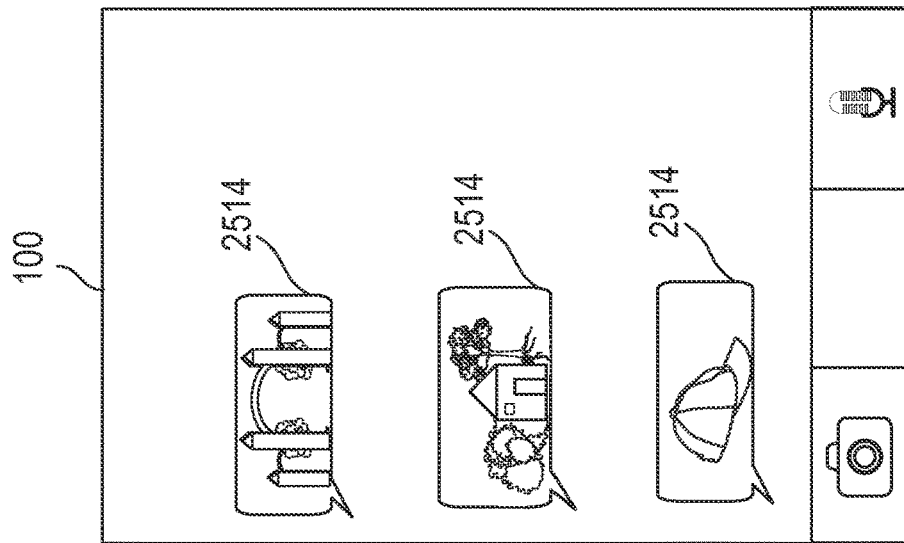
Figure 25C:
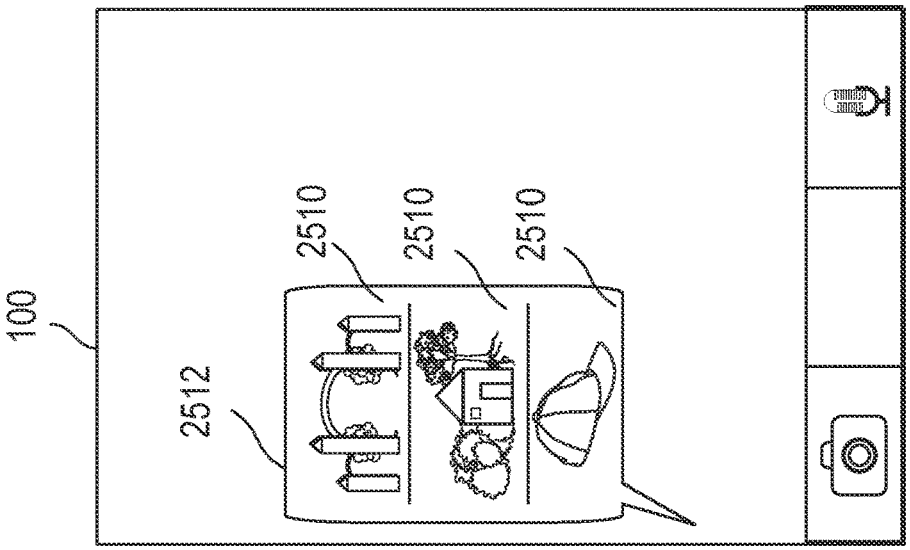

FIG. 25C depicts an example of displaying a thumbnail representation of multiple image messages 2510 that meet the message grouping criteria in a grouped bounded message area 2512. FIG. 25D depicts an example of displaying representations of multiple image messages that do not meet the message grouping criteria in a plurality of bounded message areas 2514.

In some embodiments, in response to detecting a contact on a grouped bounded message area 2512, such as shown in FIG. 25C, device 100 can display representations of the image messages in separate bounded message areas 2514, such as shown in FIG. 25D.

As shown in FIG. 25E, in some embodiments, in response to detecting a contact on a grouped bounded message area 2512 representing multiple image or video messages, device 100 can display thumbnails 2518 representing the images or videos in a filmstrip 2516 on the display. In some embodiments, the thumbnails 2518 displayed in the filmstrip 2516 may be larger than the thumbnails displayed in the bounded message area, and may be scrollable.

Because the user interfaces described above make it easy for participants to exchange media in a message conversation, in some cases, participants may exchange many media messages within a conversation session. For example, participants may exchange multiple short audio messages during the course of a message conversation. In some cases, such exchanged messages may be intended as quick, informal communications that do not need to be retained, and may clutter the participants' message conversation display. Accordingly, in some embodiments, device 100 can schedule messages that cease to be displayed in a conversation based upon satisfaction of some expiration criteria. In some embodiments, ceasing to display a message includes deleting the message from device 100. The purpose of the automatic deletion is not privacy, but rather, avoiding cluttering the conversation with transient messages.

In some embodiments, the expiration criteria may be based on whether the message contains any media content, or based on which type of media content a message contains. For example, audio messages may have a different expiration criteria than video messages. In some embodiments, text messages do not have any expiration criteria and are therefore never automatically deleted.

In some embodiments, the expiration criteria may be based on a time interval. In some embodiments, the time interval may be measured starting from the time the media is captured (e.g., for the conversation participant who captured the media), or from the time the media has been played (e.g., for the conversation participant who received the media). In some embodiments, the expiration criteria for a message may be different for a first participant than for a second participant. In some embodiments, the time interval may be 1 minute, 2 minutes, 3 minutes, 4 minutes, 5 minutes, or 10 minutes, for example.

In some embodiments, the expiration criteria may be based on whether the media object was captured using the message user interfaces described above with respect to FIGS. 5A-24, or captured using a different application, such as a camera application. In some embodiments, media captured and added to the conversation using the quick media capture approach described with respect to FIGS. 5A-14, which may be intended as informal, transitory communications, may have a different expiration criteria than media added to the conversation using a different approach, such as a media selector interface as described with respect to FIGS. 15A-18C.

A person of skill in the art will understand that the above-described exemplary expiration criteria can be combined or modified in many ways.

In some embodiments, as shown in FIG. 26, device 100 can provide an indication of the expiration criteria 2602 in the representation of the message. In the embodiment shown in FIG. 26, the indication of the expiration criteria 2602 comprises the time interval after which the message will cease to be displayed in the message conversation.

As depicted in FIG. 26, in some embodiments, device 100 can display a keep affordance 2604 for keeping a message that would otherwise be deleted after the expiration criteria are satisfied. In response to detecting a selection of the keep affordance 2604, device 100 can ignore the expiration criteria and continue to display the message in the conversation. In some embodiments, in response to detecting a contact on the keep affordance 2604, device 100 can cease to display the indication of the expiration criteria and/or cease to display the keep affordance.

In some embodiments, media messages added to a conversation using the interfaces described in FIGS. 5A-14, which may be intended as informal, transitory communications, are not added to a media library (such as a camera roll or audio library) when sent or received, but media messages added to a conversation using the interfaces described in FIGS. 15A-18C are added to the media library. In some embodiments, keeping a media message (by selecting the keep affordance, for example) adds the media to the media library.

In some embodiments, a message having an associated expiration criteria that is sent from a first participant to a second participant in a message conversation may be kept by the first participant, by the second participant, by both or by neither.

Figure 27C:
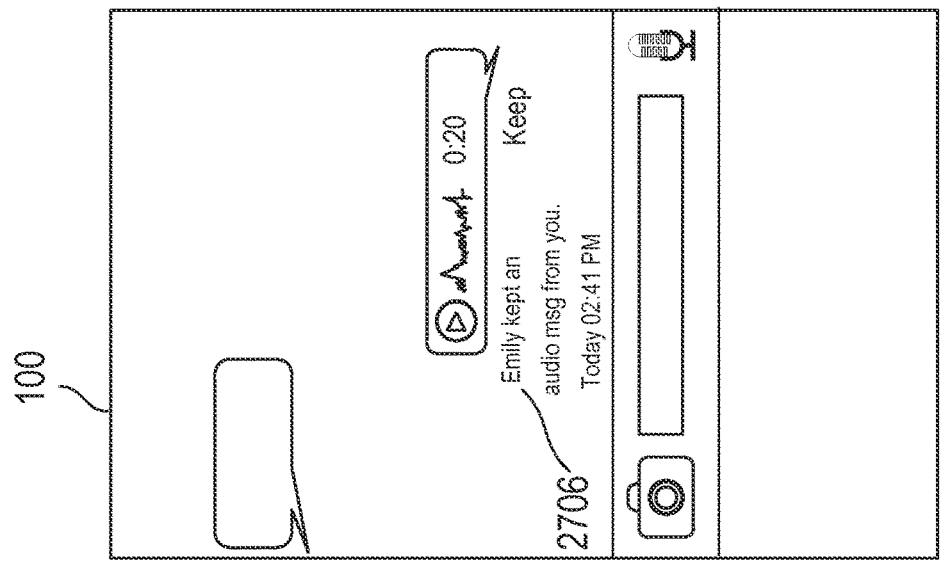
FIGS. 27A-27C illustrate exemplary messaging user interfaces.
Figure 27B:
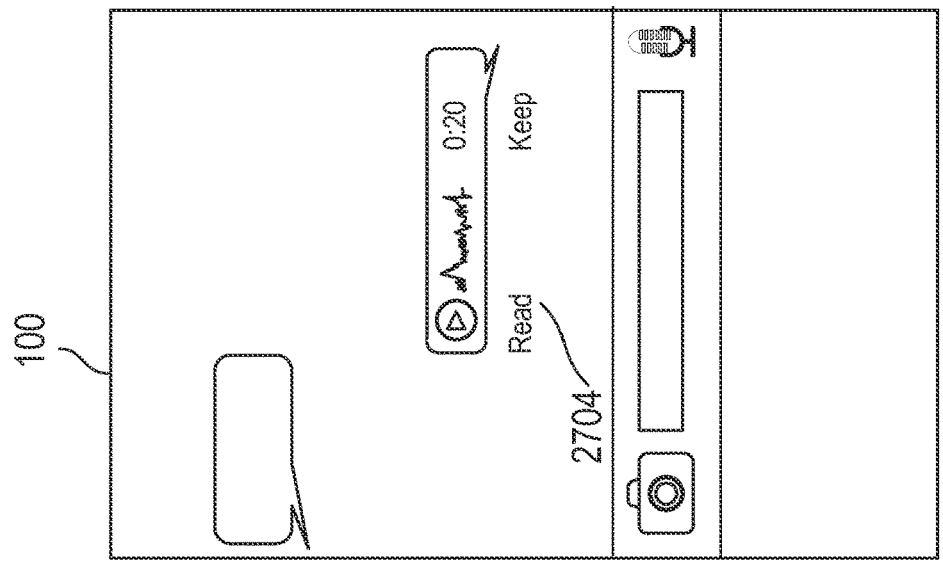
Figure 27A:
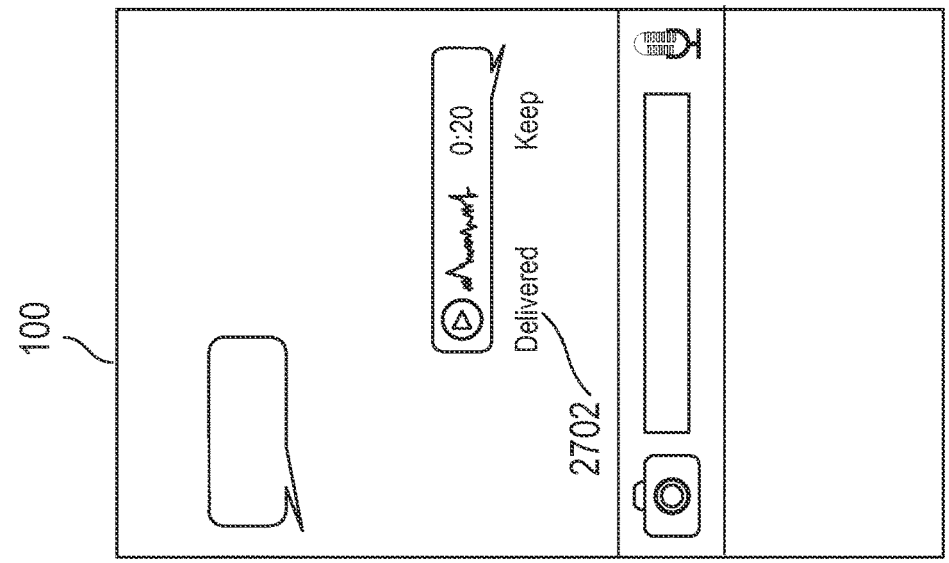

As depicted in FIG. 27A, after sending an audio message from a first participant to a second participant in a message conversation, device 100 can provide, to the first participant, an indication 2702 that the audio message has been delivered to the second participant. As depicted in FIG. 27B, in response to detecting that the second participant has played at least a portion of the audio message, device 100 can provide, to the first participant, an indication 2704 that the audio message has been played. As shown in FIG. 27C, in response to detecting that the second participant has selected a keep affordance associated with the audio message, device 100 can provide, to the first participant, an indication 2706 that the second participant has kept the message. In some embodiments, the indicator that the message has been kept replaces an indicator that the message has been delivered or played/viewed/read.

Device 100 can also send static location information or share dynamic location information between two or more participants in a message conversation, and display the location information of the two or more participants on a map.

Figure 28C:
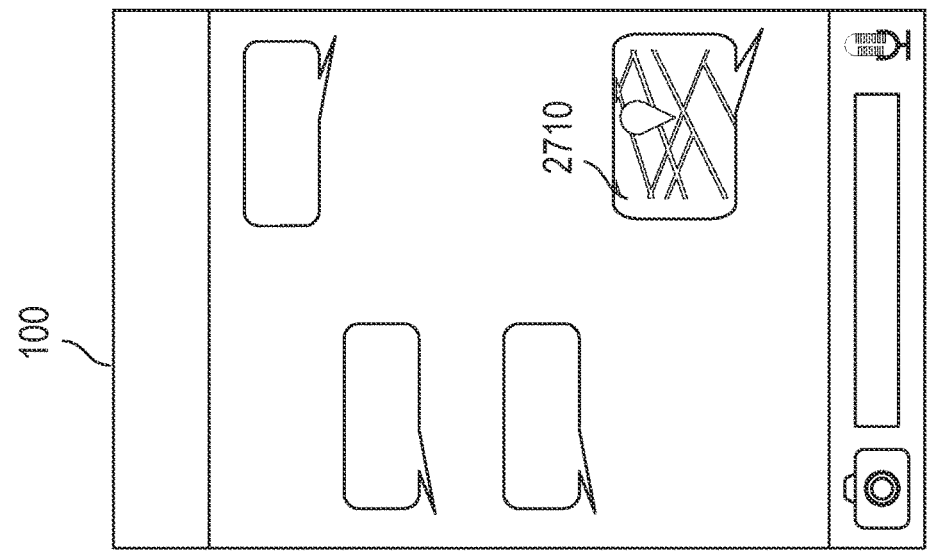
FIGS. 28A-28C illustrate exemplary messaging user interfaces.
Figure 28B:
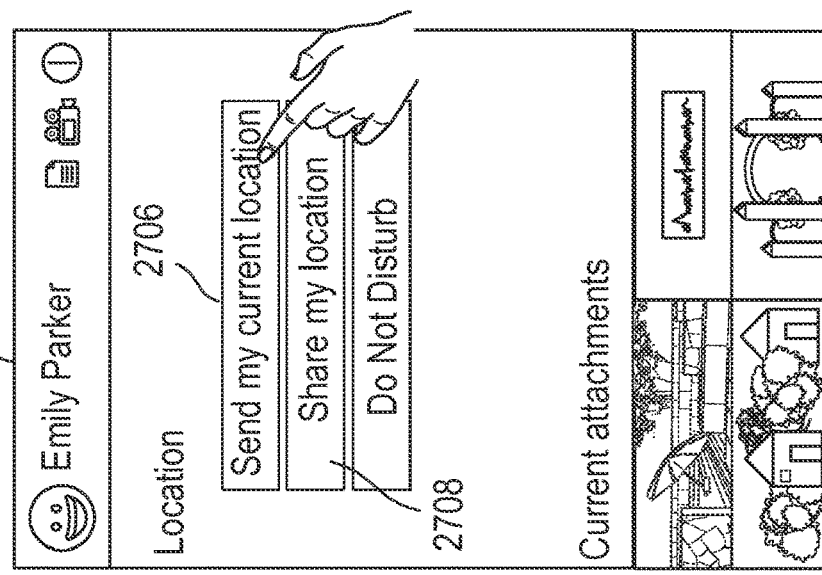
Figure 28A:
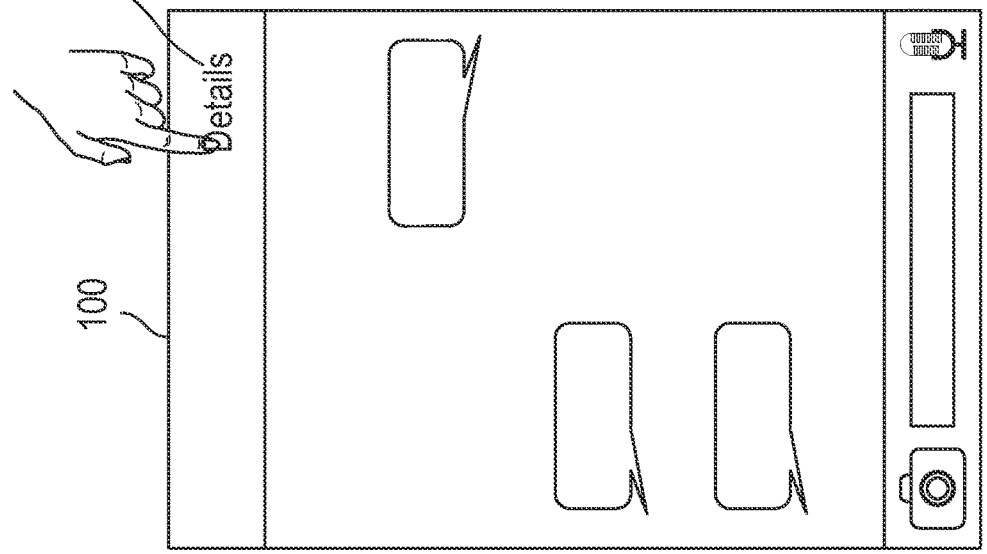
Figure 30:
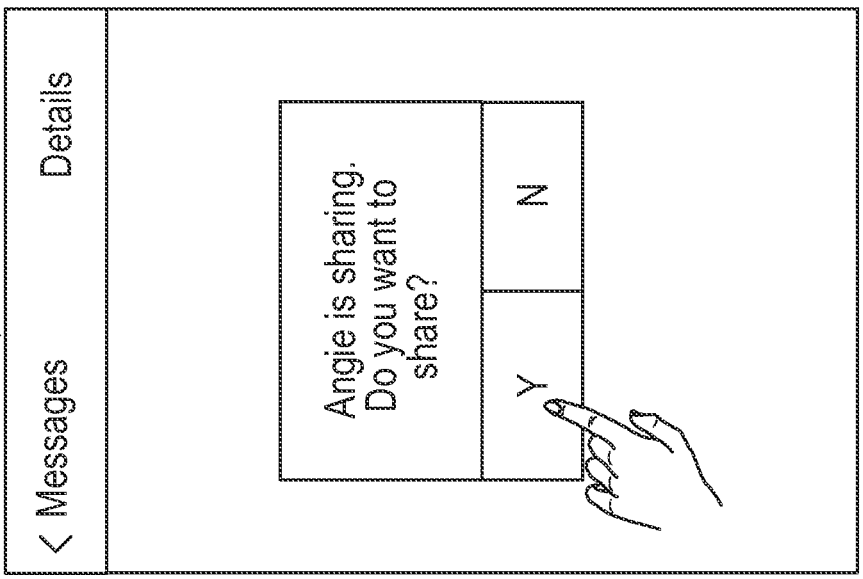
FIG. 30 illustrates an exemplary messaging user interfaces.

As shown in FIG. 28A, while displaying a message conversation, device 100 can display a details affordance 2702 for displaying additional details about a message conversation. As shown in FIG. 28B, in some embodiments, in response to detecting a contact on the details affordance, device 100 can display representations (such as thumbnails or waveforms) of media that has been exchanged during the conversation, a send-location affordance 2706 for sending the current location information of device 100 to one or more participants in the conversation, and a share-location affordance 2708 for sharing location information of device 100 with one or more participants for a predetermined period of time.

In response to detecting a selection of the send-location affordance 2706, device 100 can provide a participant in the message conversation with current location information for device 100. As shown in FIG. 28C, in some embodiments, device 100 can insert a map 2710 depicting the current location information into the conversation. In some embodiments, the location information sent in response to detecting the contact on the send-location affordance 2706 is static, and is not subsequently updated in accordance with changes in the location of device 100.

As shown in FIGS. 29A-29B, in some embodiments, in response to detecting a selection of the share-location affordance 2708, device 100 can display a user interface 2902 for selecting a predetermined time period during which the location information will be shared. In response to detecting a selection of one of the predetermined time periods, device 100 can provide a participant in the message conversation with information enabling the participant to determine the location of device 100 during the selected time period. In some embodiments, providing the information causes a remote electronic device used by the participant receiving the information to prompt the participant to share their location with the user of device 100. In some embodiments, after the selected time period has elapsed, device 100 can cease to share the location information with the participant.

In some embodiments, enabling a participant to determine the location of device 100 includes enabling the participant to request information about the location of device 100 from a location server to which device 100 sends location information.

As depicted in FIG. 29C, in some embodiments, while sharing location information, device 100 can display a stop-sharing affordance 2904 for ceasing to share the location information with the participant before the time period has elapsed.

In some embodiments, device 100 can receive location information from another participant in the message conversation. In response to receiving the location information, as shown in FIG. 30A, device 100 can prompt the user of device 100 to share their location information with the other participant. In response to detecting that the user has selected to share their location information, device 100 can provide the other participant with information enabling the participant to determine the location of device 100. As discussed previously with respect to FIG. 29B, device 100 can allow the user to select a predetermined time period for which the location information will be shared.

As discussed above, in some embodiments, device 100 can receive shared location information from a participant in a message conversation. In some embodiments, the location information comprises the location of an external device. In response to receiving the location information, device 100 can display a map depicting both the location of the electronic device and the location of the external device.

Figure 31:
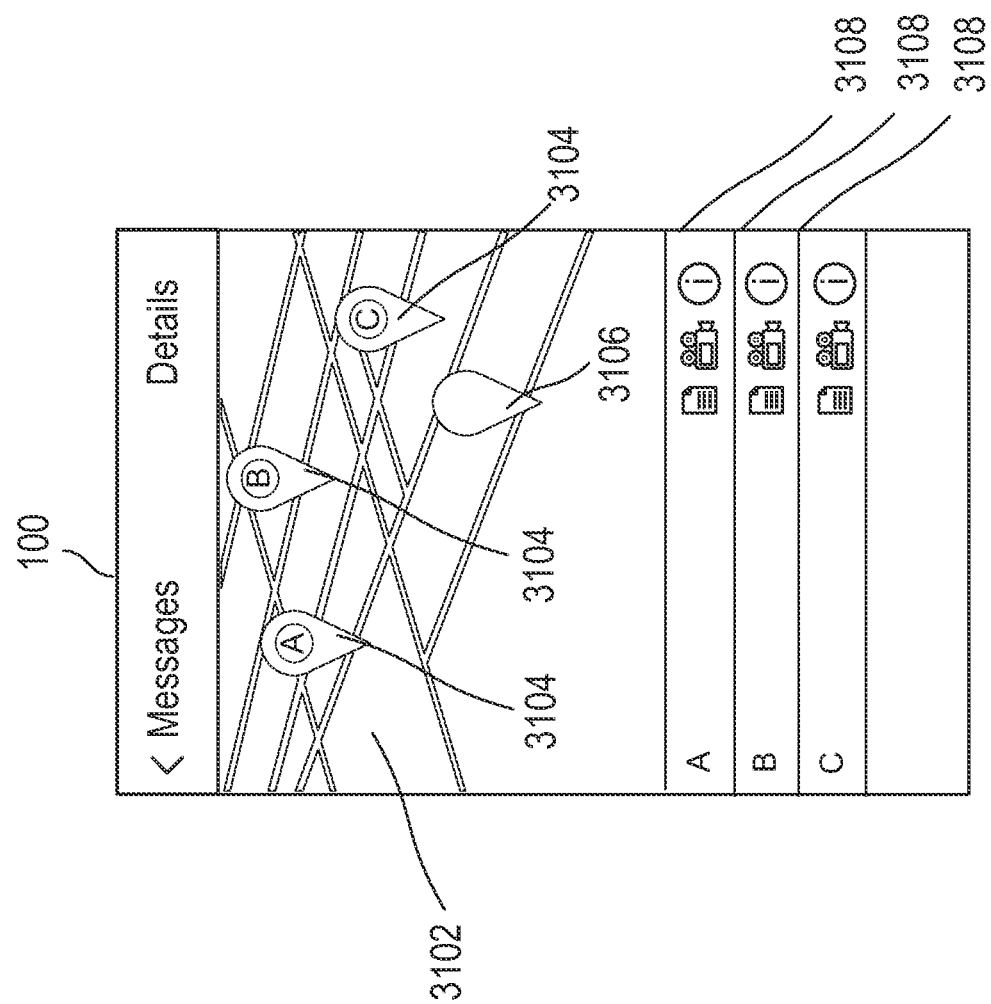
FIG. 31 illustrates an exemplary messaging user interfaces.

As shown in FIG. 31, in some embodiments, device 100 can receive shared location information from multiple participants in a message conversation, and display a map 3102 depicting the locations 3104 of the multiple participants and the location of device 100 (3106) on the same map. In some embodiments, device 100 can display information 3108 about each of the participants whose locations are displayed on the map.

In some embodiments, any one of multiple participants in a conversation can add or remove one or more other participants from the conversation, or can change the name of the message conversation.

Figure 32C:
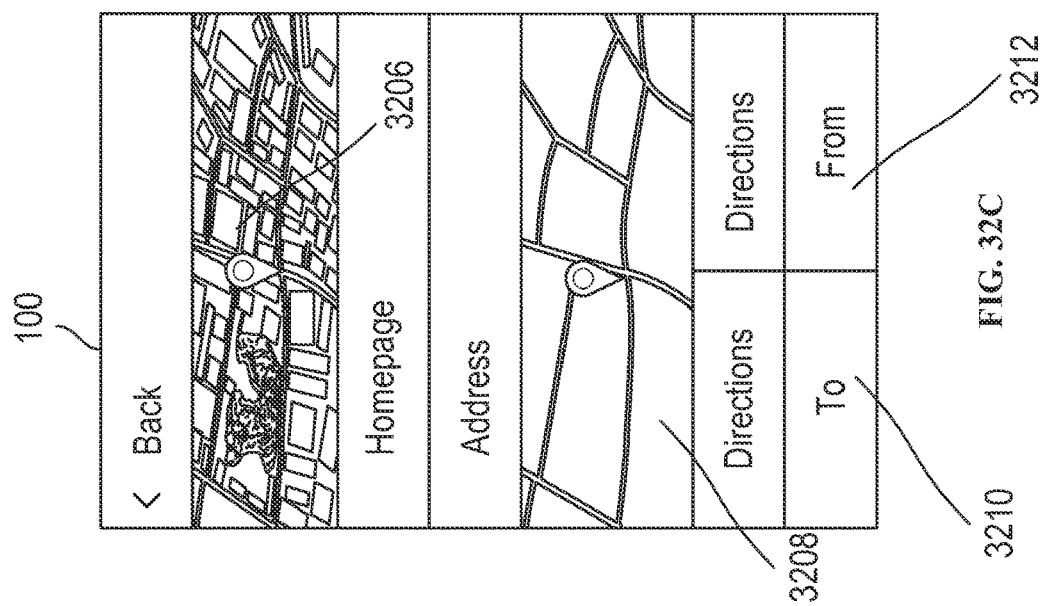
FIGS. 32A-32C illustrate exemplary messaging user interfaces.
Figure 32B:
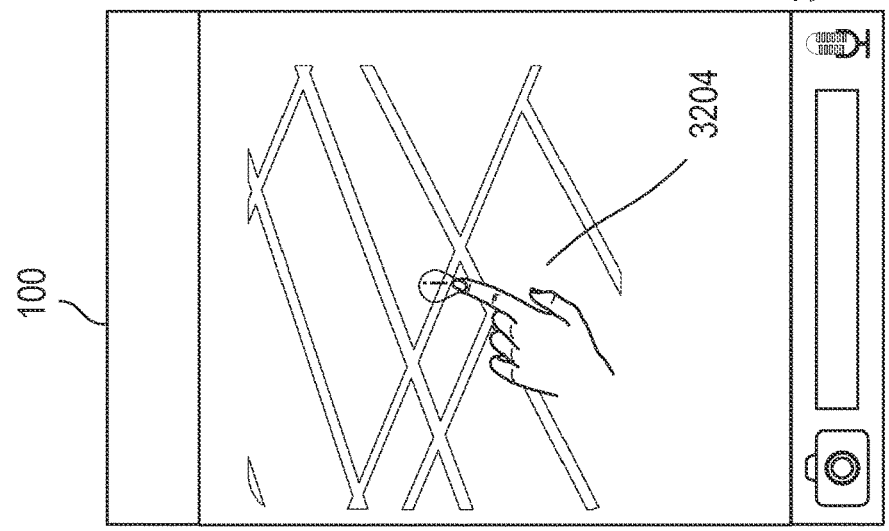
Figure 32A:
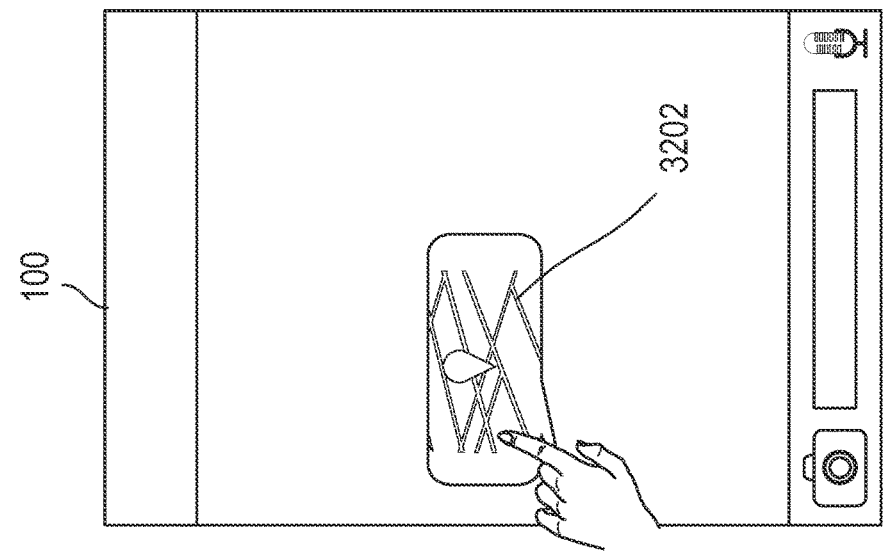

As depicted in FIG. 32, in some embodiments, in response to detecting a contact on a map in a message conversation, device 100 can display a larger version of the map 3204. In response to detecting a contact on the larger map, device 100 can display a satellite image 3206 of location information shared by a participant in a message conversation, a map image 3208 of the location information, and affordances for displaying directions to 3210 or directions from 3212 the location information.

Thus, as described above with respect to FIGS. 28 and 29, device 100 can provide message user interfaces that allow participants to easily send their current location to each other or share their location with each other for a predetermined period of time.

In some embodiments, after the predetermined time period has elapsed, device 100 may change the color of the displayed map to indicate that it is no longer being updated with the location information. In response to detecting a contact on the map after the predetermined time period has elapsed, device 100 can display an affordance indicating that the location information is no longer being shared.

FIG. 33 is a flow diagram illustrating process 3300 for quick capture and send of media. Process 3300 may be performed at an electronic device with a display and a touch-sensitive surface, like device 100 (FIG. 2). At block 3302, the device displays on its touch-sensitive display a media affordance and a message region for displaying messages sent between participants in a message conversation. At block 3304, the device detects a gesture on the touch-sensitive surface that includes detecting a contact at a location on the touch-sensitive surface that corresponds to a location of the media affordance on the display. At block 3306, in response to detecting the contact, the device displays on its touch-sensitive display a send affordance. In block 3308, the device detects a continuation of the gesture that includes detecting movement of the contact across the touch-sensitive surface followed by detecting liftoff of the contact from the touch-sensitive surface. At block 3310, the device determines whether the contact moved to a location on the touch-sensitive surface that corresponds to a location of the send affordance on the display. At block 3312, in accordance with a determination that the contact moved to the location on the touch-sensitive surface that corresponds to the location of the send affordance, and in response to detecting the liftoff, the device sends media captured in response to at least a portion of the gesture to a participant in the message conversation. Optionally, in some embodiments, in response to detecting the contact shown in block 3304, the device may display a cancel affordance on the display, determine whether the contact moved to a location on the touch-sensitive surface that corresponds to a location of the cancel affordance on the display, and, in accordance with a determination that the contact moved to the location on the touch-sensitive surface that corresponds to the location of the cancel affordance, followed by the liftoff, the device may forgo sending the captured media to the participant. In some embodiments, in accordance with a determination that the contact did not move to the location on the touch-sensitive surface that corresponds to the location of the send affordance nor to the location on the touch-sensitive surface that corresponds to the location the cancel affordance, and in response to detecting the liftoff, the device may display an image in the message compose field, the image having a waveform representing the captured media (represented by B in FIG. 33). In some embodiments, in accordance with a determination that the contact did not move to the location on the touch-sensitive surface that corresponds to the location of the send affordance nor to the location on the touch-sensitive surface that corresponds to the location the cancel affordance, and in response to detecting the movement, the device can cease to capture the media (represented by B' in FIG. 33).

Note that details of the processes described above with respect to process 3300 (e.g., FIGS. 33 and 5A-14) are also applicable in an analogous manner to the other processes described herein. For example, processes 3400, 3500, 3600, 3700, 3800, 3900, 4000, 4600, and 4900 may include one or more of the characteristics of the various processes described above with reference to process 3300. For brevity, these details are not repeated in the descriptions of the other processes. The various methods and techniques described above with reference to process (method) 3300 may be optionally implemented as one or more units, such as those described with regard to FIG. 50.

FIG. 34 is a flow diagram illustrating process 3400 for quick video capture. Process 3400 may be performed at an electronic device with a display and a touch-sensitive surface, like device 100 (FIG. 2). At block 3402, the device displays on the display a media affordance and a message region for displaying messages sent between participants in a message conversation. At block 3404, the device detects a first input corresponding to a location of the media affordance on the display on the touch-sensitive surface. At block 3406, in response to detecting the first input, the device displays a record affordance and a send affordance. At block 3408, the device detects a second input corresponding to a location of the record affordance on the display on the touch-sensitive surface. At block 3434, in response to detecting the second input, the device begins to record a video. At block 3412, the device detects a third input corresponding to a location of the send affordance on the display on the touch-sensitive surface. At block 3414, in response to detecting the third input, the device sends the recorded video to a participant and removes the send affordance and the record affordance from the display. Optionally, at block 3414, the device may, in response to detecting the third input, insert a thumbnail representation of the recorded video into the displayed message conversation.

Note that details of the processes described above with respect to process 3400 (e.g., FIGS. 34, 10A-10B, and 12A-14) are also applicable in an analogous manner to the other processes described herein. For example, processes 3300, 3500, 3600, 3700, 3800, 3900, 4000, 4600, and 4900 may include one or more of the characteristics of the various processes described above with reference to process 3400. For brevity, these details are not repeated in the descriptions of the other processes. The various methods and techniques described above with reference to process (method) 3400 may be optionally implemented as one or more units, such as those described with regard to FIG. 50.

FIG. 35 is a flow diagram illustrating process 3500 for responding to an audio message by raising an electronic device. Process 3500 may be performed at an electronic device with a display and a touch-sensitive surface, like device 100 (FIG. 2). At block 3502, the device displays a representation of a first audio message received from a first participant in a message conversation. At block 3504, the device detects a request to play the first audio message. Optionally at block 3504, in some embodiments, the device detects the request to play the first audio message by detecting a separate raising of the device while the representation of the first audio message is displayed. Optionally at block 3504, in some embodiments, the device detects the request to play the first audio message by detecting a contact at a location on the touch-sensitive surface that corresponds to the location of the displayed representation of the first audio message. At block 3506, in response to detecting the request, the device plays the first audio message. At block 3508, after playing the first audio message, the device detects a raising of the device. At block 3510, in response to detecting the raising of the device, the device records a second audio message. Optionally, at block 3510, while recording the second audio message, the device may detect a lowering of the device, and in response to detecting the lowering of the device, the device may cease to record the second audio message. At block 3512, after recording the second audio message, the device sends the second audio message to the first participant. Optionally, at block 3512, in response to detecting the lowering of the device, and after ceasing to record the second audio message, the device may send the second audio message to the first participant.

Note that details of the processes described above with respect to process 3500 (e.g., FIGS. 35 and 21A-24C) are also applicable in an analogous manner to the other processes described herein. For example, processes 3300, 3400, 3600, 3700, 3800, 3900, 4000, 4600, and 4900 may include one or more of the characteristics of the various processes described above with reference to process 3500. For brevity, these details are not repeated in the descriptions of the other processes. The various methods and techniques described above with reference to process (method) 3500 may be optionally implemented as one or more units, such as those described with regard to FIG. 50.

Figure 36:
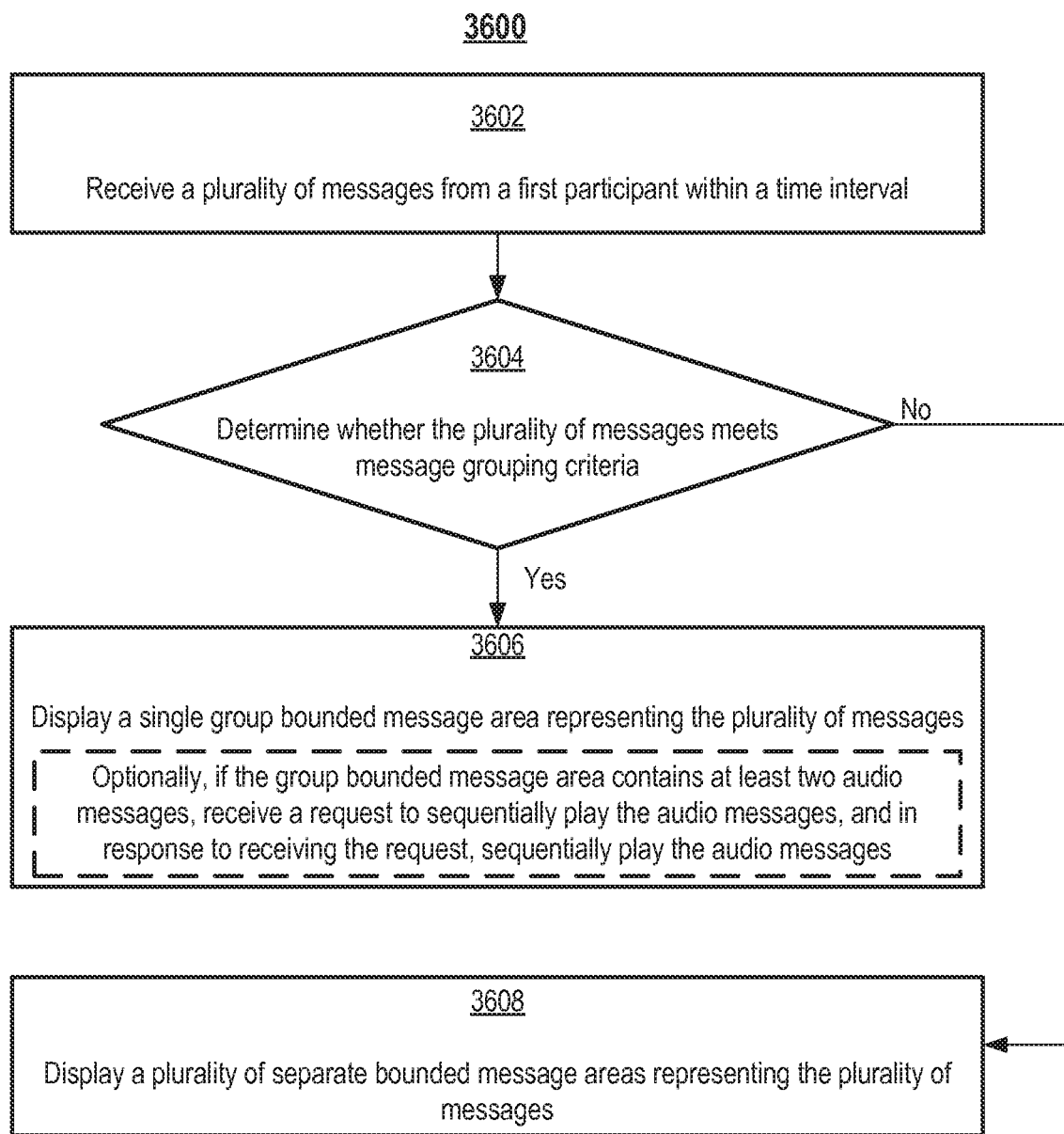
FIG. 36 is a flow diagram illustrating a process for grouping messages.

FIG. 36 is a flow diagram illustrating process 3600 for message grouping. Process 3600 may be performed at an electronic device with a display and a touch-sensitive surface, like device 100 (FIG. 2). At block 3602, the device receives a plurality of messages from a first participant within a time interval. At block 3604, the device determines whether the plurality of messages meets message grouping criteria. In some embodiments, message grouping criteria may include a criterion that is met when the number of messages in the plurality of messages exceeds a numeric threshold. In some embodiments, message grouping criteria may include a criterion that is met when the plurality of messages are spaced apart from each other by less than a threshold amount of time. In some embodiments, message grouping criteria may include a criterion that is met when the plurality of messages are sequentially adjacent messages. In some embodiments, sequentially adjacent messages may include messages having the same read status without any intervening received messages with a different read status. At block 3606, in accordance with a determination that the plurality of messages meets the message grouping criteria, the device displays a single group bounded message area representing the plurality of messages. Optionally, at block 3606, in some embodiments where the grouped bounded message area represents at least two audio messages, the device may receive a request to sequentially play the at least two audio messages and, in response to receiving the request, sequentially play the at least two audio messages. At block 3608, in accordance with a determination that the plurality of messages does not meet the message grouping criteria; the device displays a plurality of separate bounded message areas representing the plurality of messages.

Note that details of the processes described above with respect to process 3600 (e.g., FIGS. 36 and 25A-25E) are also applicable in an analogous manner to the other processes described herein. For example, processes 3300, 3400, 3500, 3700, 3800, 3900, 4000, 4600, and 4900 may include one or more of the characteristics of the various processes described above with reference to process 3600. For brevity, these details are not repeated in the descriptions of the other processes. The various methods and techniques described above with reference to process (method) 3600 may be optionally implemented as one or more units, such as those described with regard to FIG. 50.

FIG. 37 is a flow diagram illustrating process 3700 for managing message display based upon expiration criteria. Process 3700 may be performed at an electronic device with a display and a touch-sensitive surface, like device 100 (FIG. 2). At block 3702, the device receives a first message. At block 3704, the device displays a representation of the first message, which is scheduled to be deleted upon satisfaction of expiration criteria, on the display. In some embodiments, the expiration criteria may be based on a time interval. In some embodiments, the expiration criteria may be based on whether the first message contains media. In some embodiments, the expiration criteria may be based on whether the media was captured using a quick media capture approach, such as described with respect to FIGS. 5A-14, or using another approach. At block 3706, the device displays an affordance for keeping the first message. At block 3708, in accordance with a determination that the affordance was selected prior to the satisfaction of the expiration criteria, the device keeps the first message. Optionally, at block 3708, if the first message contains media, in accordance with a determination that the affordance was selected prior to the satisfaction of the expiration criteria, the device may save the media in a media library. In some embodiments, device 100 only saves media that was captured using a quick media capture approach, such as described with respect to FIGS. 5A-14. In some embodiments, if the first message contains media and the expiration is based on a time interval, the time interval may be measured starting from a time after the media is played. In some embodiments, if the first message contains media and the expiration is based on a time interval, the time interval may be measured starting from a time when the media is created. At block 3710, in accordance with a determination that the expiration criteria has been satisfied without detecting selection of the affordance, the device ceases to display the representation of the first message on the display. Optionally, at block 3710, the device may receive a second message that is not deleted based on the expiration criteria.

Note that details of the processes described above with respect to process 3700 (e.g., FIGS. 37 and 26-27C) are also applicable in an analogous manner to the other processes described herein. For example, processes 3300, 3400, 3500, 3600, 3800, 3900, 4000, 4600, and 4900 may include one or more of the characteristics of the various processes described above with reference to process 3700. For brevity, these details are not repeated in the descriptions of the other processes. The various methods and techniques described above with reference to process (method) 3700 may be optionally implemented as one or more units, such as those described with regard to FIG. 50.

FIG. 38 is a flow diagram illustrating process 3800 for location sharing. Process 3800 may be performed at an electronic device with a display and a touch-sensitive surface, like device 100 (FIG. 2). At block 3802, the device displays on the display a message region for displaying messages sent between a first participant and a second participant in a message conversation. At block 3804, the device displays a share-location affordance for sharing the location of the first participant with the second participant as the location changes over at least a predetermined time period. At block 3806, the device detects a contact at a location on the touch-sensitive display that corresponds to a location of the share-location affordance on the display. At block 3808, in response to detecting the contact at the location on the touch-sensitive display that corresponds to the location of the share-location affordance, the device provides the second participant with information enabling the second participant to determine a current location of the first participant during at least the predetermined time period. In some embodiments, the device may allow the user to select a time period. Optionally, at block 3808, in response to detecting the contact at the location corresponding to the share-location affordance, the device may display at least two affordances corresponding to at least two predetermined time periods, detect a contact at a location on the touch-sensitive surface corresponding to a location of one of the at least two affordances on the display, and, in response to detecting the contact at the location on the touch-sensitive surface corresponding to the location of one of the at least two affordances on the display, provide the second participant with information enabling the second participant to determine the current location of the first participant during the predetermined time period corresponding to the one of the at least two affordances. Optionally, at block 3808, the device may receive from the second participant location information dynamically indicating a location of a first external device and display, on the display, a location of the electronic device and the location of the first external device on a map. Optionally, at block 3808, the device may add a third participant to the message conversation, receive from the third participant location information indicating a location of a second external device, and display, on the display, the location of the second external device on the map. Optionally, at block 3808, the device may display, on the display together with the message conversation, a details affordance, detect a contact at a location on the touch-sensitive surface that corresponds to a location of the details affordance on the display, and, in response to detecting the contact at the location on the touch-sensitive surface that corresponds to the location of the details affordance on the display, display the map showing the location of two or more participants in the message conversation that have shared their location.

Note that details of the processes described above with respect to process 3800 (e.g., FIGS. 38 and 28A-32C) are also applicable in an analogous manner to the processes described herein. For example, processes 3300, 3400, 3500, 3600, 3700, 3900, 4000, 4600, and 4900 may include one or more of the characteristics of the various processes described above with reference to process 3800. For brevity, these details are not repeated in the descriptions of the other processes. The various methods and techniques described above with reference to process (method) 3800 may be optionally implemented as one or more units, such as those described with regard to FIG. 50.

FIG. 39 is a flow diagram illustrating process 3900 for adding media to a message conversation. Process 3900 may be performed at an electronic device with a display, a touch-sensitive surface, and a camera sensor. At block 3902, the device displays on the display, a message region for displaying a message conversation. At block 3904, the device receives a request to add media to the message conversation. At block 3906, in response to receiving the request, the device displays a media selection interface concurrently with at least a portion of the message conversation, the media selection interface including a plurality of affordances, at least a subset of which includes thumbnail representations of media available for adding to the message conversation, for selecting media for addition to the message conversation. At block 3908, the device detects selection of a respective affordance from the plurality of affordances. At block 3910, in response to detecting selection of the respective affordance, the device selects corresponding media for addition to the message conversation. Optionally, at block 3910, in response to selection of the respective affordance, the device may add the media to the message conversation. Optionally, at block 3910, if the plurality of affordances includes a live preview affordance, the device may detect a contact at a location on the touch-sensitive display that corresponds to a location of the live preview affordance on the display and, in response to detecting the contact at the location on the touch-sensitive surface that corresponds to the location of the live camera preview, capture a new image based on the live camera preview and select the new image for addition to the message conversation.

Note that details of the processes described above with respect to process 3900 (e.g., FIGS. 39 and 15A-18C) are also applicable in an analogous manner to the processes described herein. For example, processes 3300, 3400, 3500, 3600, 3700, 3800, 4000, 4600, and 4900 may include one or more of the characteristics of the various processes described above with reference to process 3900. For brevity, these details are not repeated in the descriptions of the other processes. The various methods and techniques described above with reference to process (method) 3900 may be optionally implemented as one or more units, such as those described with regard to FIG. 50.

Figure 40:
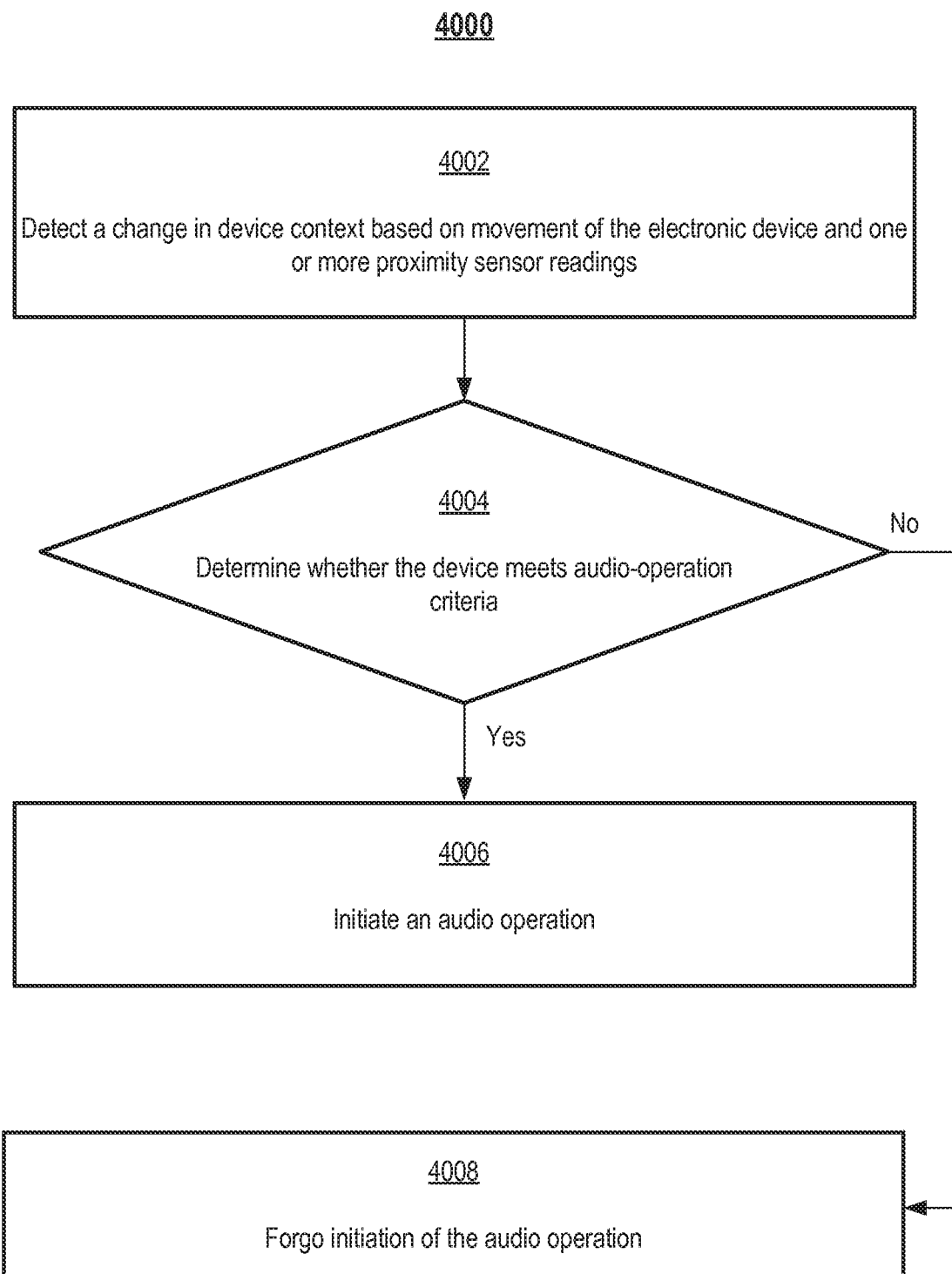
FIG. 40 is a flow diagram illustrating a process for initiating an audio operation.

FIG. 40 is a flow diagram illustrating process 4000 for initiating an audio operation. Process 4000 is performed at an electronic device (e.g., device 100) with a display (e.g., display 112 of device 100) and a microphone (e.g., microphone 113 of device 100). At block 4002, the device detects a change in device context based on movement of the electronic device and one or more proximity sensor readings (e.g., by rising motion as depicted in FIG. 21B). At block 4004, the device determines, in response to detecting the change in device context, whether the device meets audio-operation criteria. For example, the audio-operation criteria include a criterion that is met when the movement of the electronic device satisfies movement criteria and the proximity sensor reading(s) satisfy a proximity criteria. At block 4006, the device, in accordance with a determination that the change in device context satisfies the audio-operation criteria, initiates an audio operation. At block 4008, the device, in accordance with a determination that the change in device context does not satisfy the audio-operation criteria, forgoes initiating the audio operation.

Advantageously, process 4000 enables users to initiate an audio operation with a simple gesture (e.g., by raising a phone to the user's ear). Process 4000 reduces the need for users to inspect the device and select affordances thereon in order to initiate audio operations such as the sending of audio messages. Further, movement criteria and proximity criteria combine to beneficially reduce the amount of erroneous audio operations. The increased efficiency of the user interface and the reduced occurrence and duration of erroneous audio operations both reduce energy usage by the device, which is particularly important for battery powered devices where reduced energy usage increases battery life.

In some embodiments, a movement criteria is met when the device takes the upward trajectories illustrated in FIGS. 21A-22C. In some embodiments, movement of the device is tracked using one or more of accelerometer 168 and optional sensors on device 100 (FIG. 1A). In some embodiments, a movement criterion is met when the device is in an orientation distinct from a predetermined orientation(s) (e.g., met when the device is not upside down). In some embodiments, the movement criterion is met when the device takes a generally upward trajectory or a trajectory that is upward with the device rotating from having its display close to parallel with the Earth's surface (e.g., when the user is viewing the indication of the communication on the display) to its display being close to vertical with the earth's surface (e.g., when the user has raised the device to place it next to the user's ear to listen to or record an audio message).

In some embodiments, a proximity criteria is met when the phone is at the user's face as shown in FIG. 21B. In some embodiments, proximity sensor readings are provided by proximity sensor 166 of device 100 and the proximity criteria is met when the sensor indicates close proximity (e.g., within a few inches) with an object, which may be a user's face.

Figure 41A:
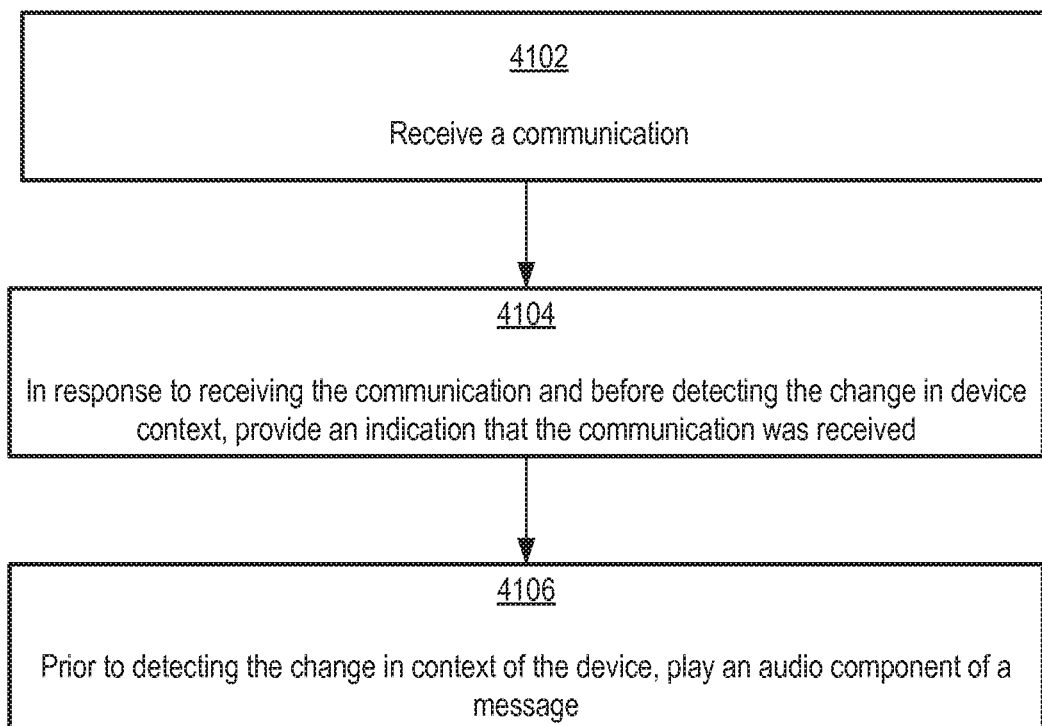
FIGS. 41A-41B are flow diagrams illustrating processes for initiating an audio operation.
Figure 41B:
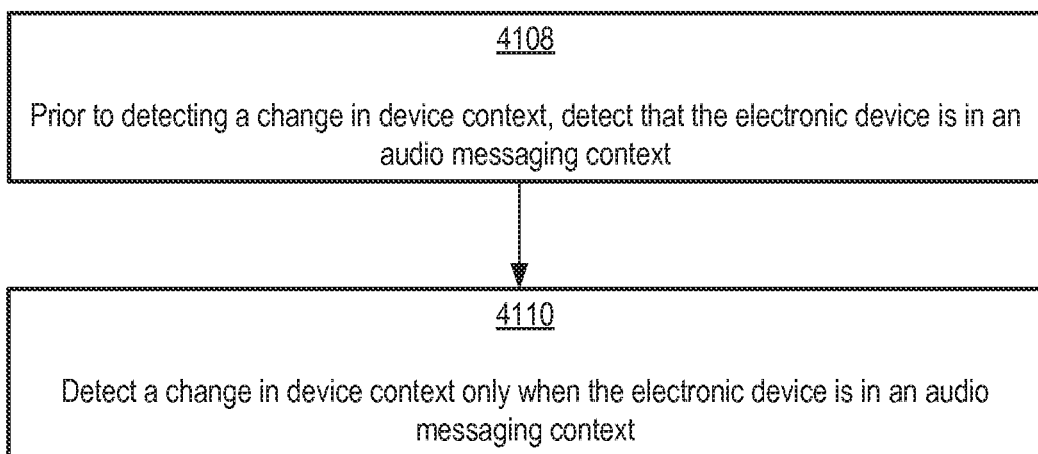

FIGS. 41A and 41B are flow diagrams illustrating optional sub-processes within block 4002 of process 4000 (FIG. 40). In some embodiments, one or more of optional processes 4102-4106 depicted in FIG. 41A are performed in block 4002 (FIG. 40). At block 4102, the device receives a communication, for example, an audio message, a text message, a voicemail, a phone call. At block 4104, in response to receiving the communication and before detecting the change in device context (e.g., before block 4004 of process 4000 in FIG. 40), the device provides an indication that the communication was received. Possible indications include a visual notification (e.g., a message received banner or an application-specific display such as a message bubble), a tactile notification (e.g., vibration), or an audio notification (e.g., a beep, or a ringtone). Possible indications include those that are displayed in a user interface locked state as well as those displayed in a user interface unlocked state. In some embodiments, displaying the indication that the communication was received involves launching a messaging application. A messaging application is one that is configured to process short messages via services such as SMS and MMS, and/or text messages via services such as iMessage® provided by Apple, Inc. of Cupertino, Calif., for example.

At block 4106, the device plays an audio component of the received communication, prior to detecting the change in context of the device. For example, if the communication includes a message with an audio component that has not been played by the device, e.g., a new audio message, then the audio operation includes playing the audio component of the message. As another example, if the communication includes a voicemail message, then plays the voicemail message.

Turning to FIG. 41B, in some embodiments, optional processes 4108 and 4110 are performed at block 4002 (FIG. 40). At block 4108, prior to detecting a change in device context, the device detects that it is in an audio messaging context. For example, the device determines that it is in the messaging-context when an incoming messaging having an audio component is received (optionally within some window of recency). As another example, the device determines that it is in the message-context when a messaging application is active. At block 4110, the device detects a change in device context only when the electronic device is in an audio messaging context (e.g., when a communication application is open or a communication has been recently received). An advantageous effect of processes 4108 and 4110 is that the accelerometers and/or proximity sensors needed to detect a raise-to-talk movement may be powered-down (or at least not actively monitored) when the device is out of the audio context, thereby reducing power usage (e.g., reducing the resources used to monitor changes in device context as well as reducing the resources used to record and process audio from false positive detections), and thus conserves power and extends battery life for the device.

In some embodiments, as discussed above, at block 4110 the device monitors for changes in device context only when the electronic device is in an audio messaging context. In some embodiments, the device does not monitor for changes in device context that satisfy the audio-operation criteria, even when a multimedia messaging application is open, unless a currently selected conversation in the multimedia messaging application includes at least one message that has an audio component (e.g., an audio component recorded and sent by the user or one of the other participants of the conversation). As noted above, reducing the situations in which the device monitors for changes in device context reduces power usage of the device, thereby conserving power and extending battery life for battery operated devices. Additionally, reducing the situations in which the device monitors for changes in device context reduces the likelihood of false positive initiation of audio operations (e.g., starting to record audio when the user lifts the device and puts it on a dresser while in a news application), thereby improving the overall quality of the user experience.

Figure 42A:
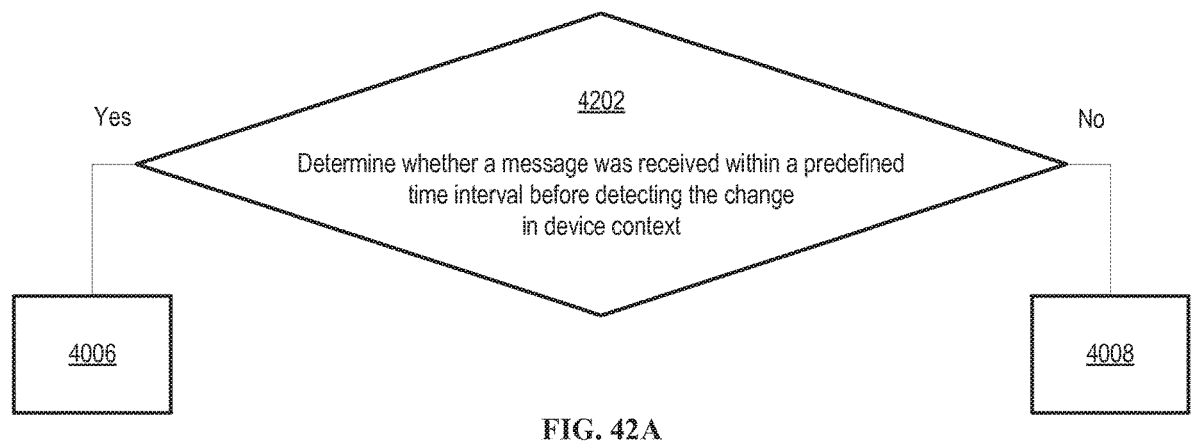
FIGS. 42A-42B are flow diagrams illustrating processes for initiating an audio operation.

FIGS. 42A-43C are flow diagrams illustrating optional sub-processes within block 4004 of process 4000 (FIG. 40). Turning to FIG. 42A, in some embodiments, optional process 4202 is performed at block 4004 (FIG. 40). At block 4202, the device determines whether the message was received within a predefined time interval before detecting the change in device context, and playing the audio component of the message includes playing the audio component of the message if the message was received within the predefined time interval. If the message was not received within the time interval, block 4202 (and thus block 4004) provides an outcome of "no" and processing proceeds to block 4008 (FIG. 40), where the device forgoes the opportunity to initiate an audio operation such as recording a new audio message. If the message was received within the time interval, block 4202 provides an outcome of "yes" and, if other requirements within block 4004 are also met, then processing proceeds to block 4006 (FIG. 40), where the device may initiate an audio operation such as recording a new audio message. As an example, the newly recorded audio message is a response to the received communication.

Figure 42B:
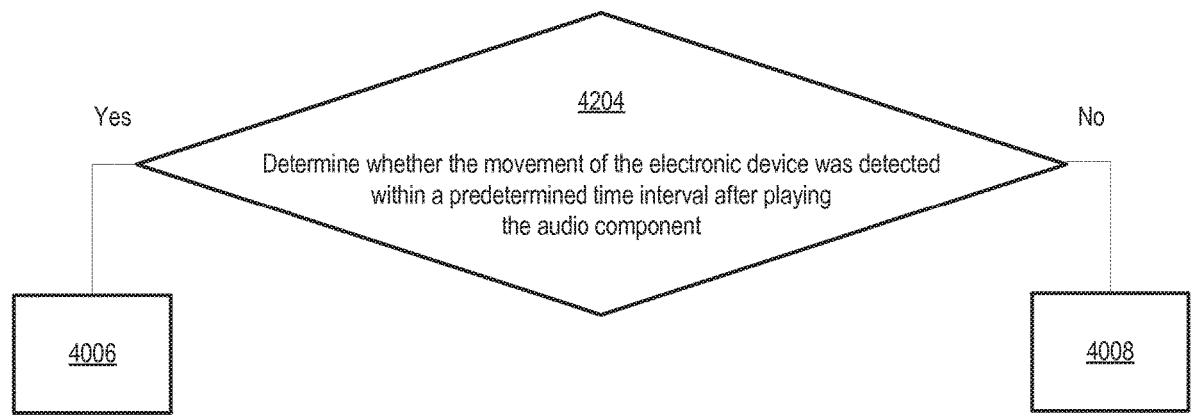

Turning to FIG. 42B, in some embodiments, optional process 4204 is performed at block 4004 of process 4000 (FIG. 40). Recall that in some embodiments, before arriving at process 4204, the device has played the audio component of a received communication. In these situations, the device may perform optional block 4204 to determine whether a detected change in device context occurred within a predetermined time interval of playing the audio message. If the change in device context occurred outside the time interval, block 4204 (and thus block 4004) provides an outcome of "no" and processing proceeds to block 4008 (FIG. 40), where the device forgoes the opportunity to initiate an audio operation such as recording a new audio message. If the change in context was detected within the predetermined time interval from the time at which the audio component was played, block 4204 provides an outcome of "yes" and, if other requirements within block 4004 are also met, then processing proceeds to block 4006, where the device may initiate an audio operation such as recording a new message.

Figure 43A:
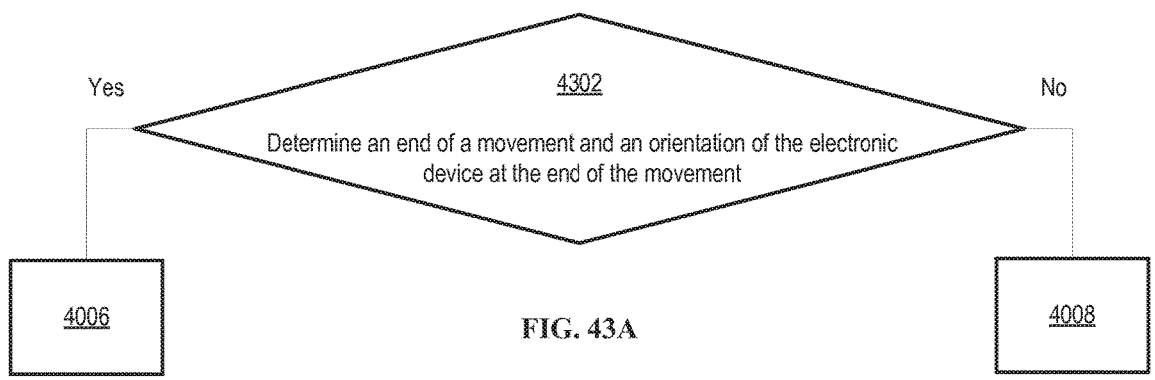
FIGS. 43A-43C are flow diagrams illustrating processes for initiating an audio operation.

Turning to FIG. 43A, in some embodiments, optional process 4302 is performed at block 4004 of process 4000 (FIG. 40). At block 4302, the device determines an end of the movement and an orientation of the electronic device at the end of the movement. For example, determining an end of movement includes determining that, after moving above a predefined threshold speed (e.g., 0.75 ft s$^{-1}$, 1 ft s$^{-1}$, 1.5 ft s$^{-1}$, 2 ft s$^{-1}$), the device has moved above a threshold amount (e.g., a noise filter value as determined by one of ordinary skill in the art in view of the exact accelerometer used) for no more than a time period (e.g., 0.5 s, 0.75 s, 1 s, 1.25 s, 1.5 s). For example, determining an orientation of the device includes determining whether the device is in a predetermined orientation (e.g., face-down or face-up, microphone down, or microphone up). In some embodiments, the movement criteria is met when the electronic device is not in a predetermined orientation (e.g., face-down) at the end of the end of the movement.

Advantageously, this feature has the effect of reducing instances of erroneous audio operations. Because some device orientations are improbably associated with an audio operation, preventing audio operations when the device is in those orientations reduces the instances of erroneous audio operations. The increased efficiency of the user interface and the reduced occurrence and duration of erroneous audio operations both reduce energy usage by the device, which is particularly important for battery powered devices where reduced energy usage increases battery life.

In some embodiments, the electronic device includes a speaker (e.g., speaker 111, FIG. 2) positioned on a surface of the device and, in the predetermined orientation, the surface faces down (e.g., relative to gravity). In some embodiments, the electronic device includes a speaker and, in the predetermined orientation, the microphone is positioned above the earpiece (e.g., relative to gravity). If the device orientation at the end of the movement does not meet the movement criteria, block 4302 (and thus block 4004) provides an outcome of "no" and processing proceeds to block 4008 (FIG. 40), where the device forgoes the opportunity to initiate an audio operation such as recording a new audio message. If the device orientation at the end of the movement meets the movement criteria, block 4302 provides an outcome of "yes" and, if other requirements within block 4004 are also met, then processing proceeds to block 4006, where the device may initiate an audio operation such as recording a new message.

Figure 43B:
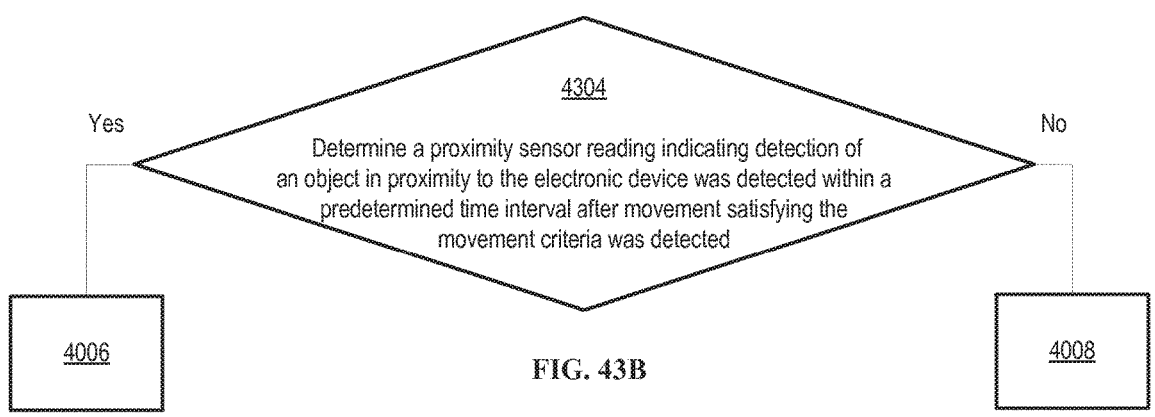

Turning to FIG. 43B, in some embodiments, optional process 4304 is performed at block 4004 of process 4000 (FIG. 40). At block 4304, the devices determines whether a proximity sensor reading indicates detection of an object in proximity to the electronic device within a predetermined time interval after movement satisfying the movement criteria was detected. An object in proximity is optionally within, e.g. 0.01, 0.02, 0.05, 1, 2, or 5 inches, or another reasonable threshold, of the device. The predetermined time interval includes, for example, 0.5, 0.75, 1, 1.25, or 1.5 seconds. If the proximity sensor reading was detected outside the time interval, block 4304 (and thus block 4004) provides an outcome of "no" and processing proceeds to block 4008 (FIG. 40), where the device forgoes the opportunity to initiate an audio operation such as recording a new audio message. If the proximity sensor reading was detected within the time interval, block 4304 provides an outcome of "yes" and, if other requirements within block 4004 are also met, then processing proceeds to block 4006, where the device may initiate an audio operation such as recording a new message.

Figure 43C:
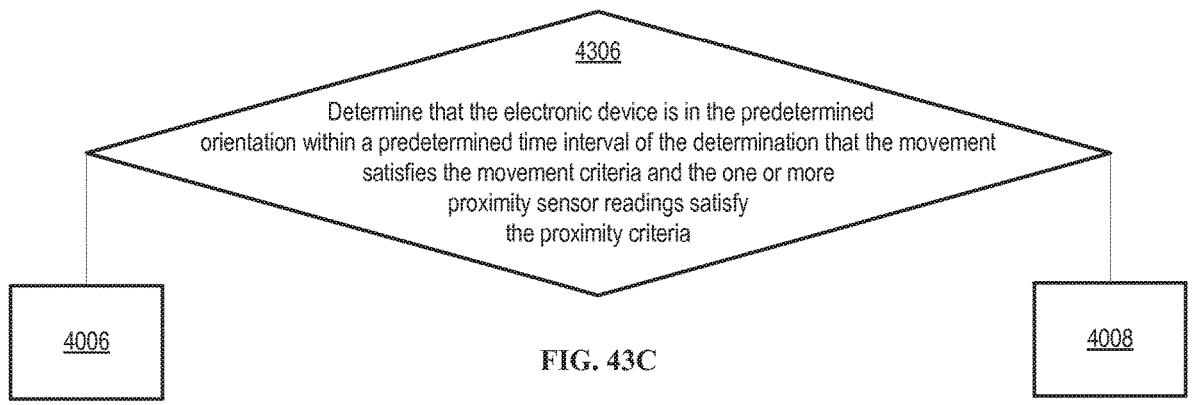

Turning to FIG. 43C, in some embodiments, optional process 4306 is performed at block 4004 of process 4000 (FIG. 40). At block 4306, the device determines whether the electronic device is in the predetermined orientation within a predetermined time interval (e.g., 3 seconds) of the determination that the movement satisfies the movement criteria and the one or more proximity sensor readings satisfy the proximity criteria. If the device is in the predetermined orientation with the predetermined time interval, the device does not meet the audio operation criteria, in which case block 4306 (and thus block 4004) provides an outcome of "no" and processing proceeds to block 4008 (FIG. 40), where the device foregoes the opportunity to initiate an operation such as recording a new audio message. If the device is not in the predetermined orientation within the time interval, block 4304 provides an outcome of "yes" and, if other requirements within block 4004 are also met, then processing proceeds to block 4006, where the device may initiate an audio operation such as recording a new message.

FIGS. 44A-45C are flow diagrams illustrating optional sub-processes within block 4006 of process 4000 (FIG. 40). In some embodiments, block 4006 includes optional processes 4402-4406 depicted in FIG. 44A. At block 4402 (FIG. 44A), after initiating the audio operation, the device determines whether the electronic device is in a predetermined orientation. If yes, processing proceeds to block 4404, where the device ends the audio operation, in accordance with a determination that the electronic device is in the predetermined orientation. Ending the audio operation optionally includes ceasing to playback audio and/or ceasing to record audio; optionally, deleting any already recorded audio; optionally, storing the already recorded audio and prompting a user to deliver the recorded audio. If no, processing proceeds to block 4406, the device forgoes ending the audio operation, in accordance with a determination that the electronic device is not in the predetermined orientation.

In some embodiments, the electronic device includes a speaker (e.g., speaker 111 of device 100) positioned on a surface of the device and, in the predetermined orientation, the surface faces down (e.g., relative to gravity). In some embodiments, the electronic device includes an earpiece and, in the predetermined orientation, the microphone is positioned above the earpiece (e.g., relative to gravity).

Figure 44A:
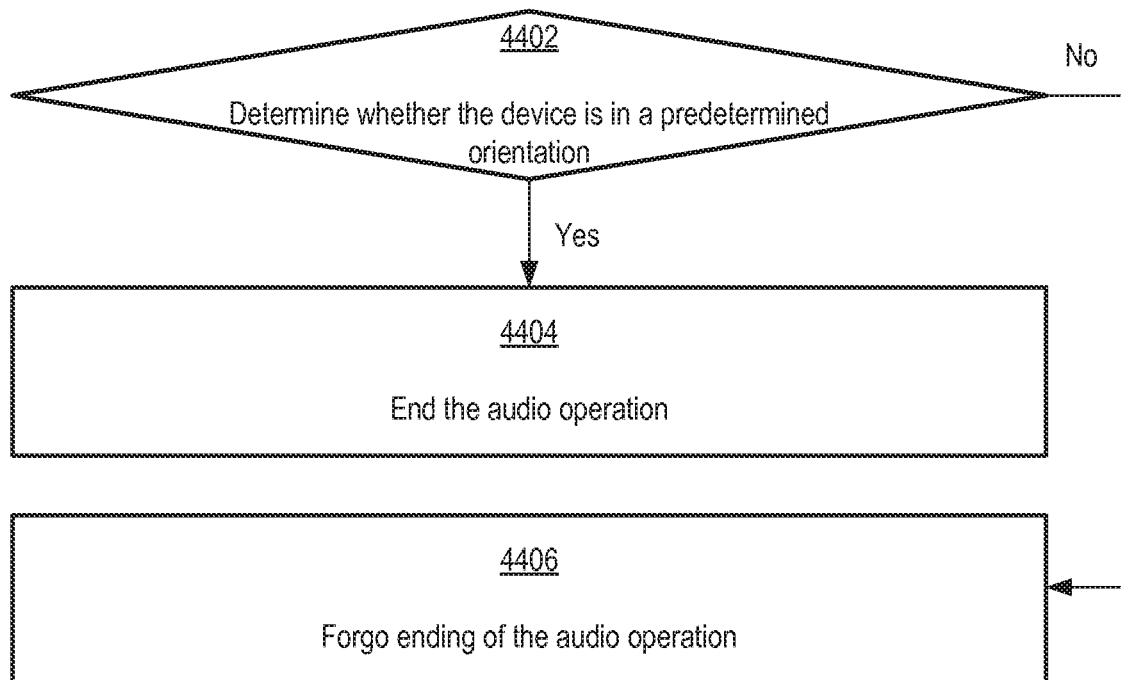
FIGS. 44A-44C are flow diagrams illustrating processes for initiating an audio operation.
Figure 44B:
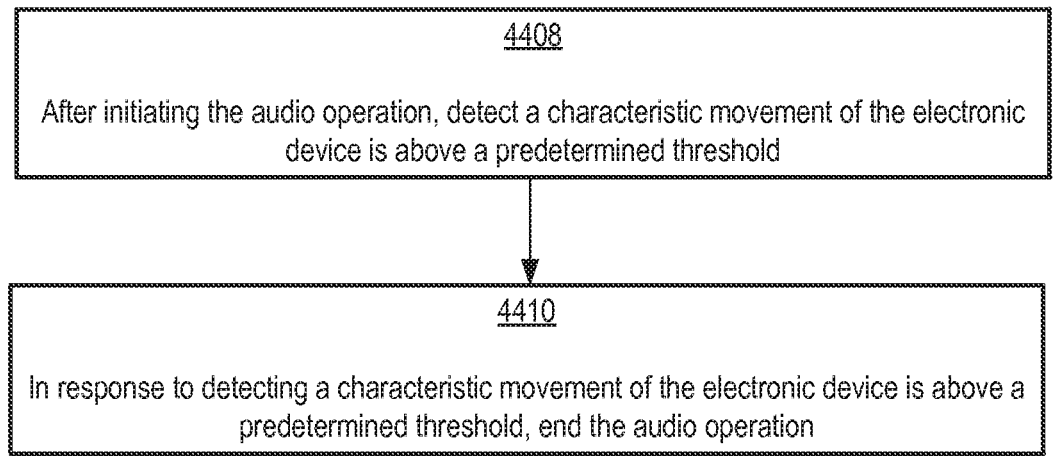

Turning to FIG. 44B, in some embodiments, optional processes 4408-4410 are performed at block 4006 of process 4000 (FIG. 40). At block 4408, after initiating the audio operation, the device detects a characteristic movement of the electronic device is above a predetermined threshold. The characteristic movement may be based on accelerometer output over time (average), peak output, output duration, or repetition. An exemplary characteristic movement that is an improbable audio messaging scenario is the wiping phone on sleeve. At block 4410, in response to detecting a characteristic movement of the electronic device is above a predetermined threshold, the device ends the audio operation. Ending the audio operation optionally includes ceasing to playback audio and/or ceasing to record audio; optionally, deleting any already recorded audio; optionally, storing the already recorded audio and prompting a user to deliver the recorded audio.

These features, which are directed to the ability to end an audio operation after it has begun, have the advantageous effect of reducing impacts to the user experience due to erroneous audio operations. It is beneficial to initiate audio operations quickly, to thereby improve responsiveness and enhance the user's experience. In such situations, many things may look like a user intended to initiate an audio operation. For example, raising a phone and putting it in a pocket may trigger movement criteria and proximity sensor criteria. The characteristic movements and predetermined orientations above are improbably associated with an audio. Ending the audio operation when those movements and/or orientations are detected advantageously reduce the number of erroneous audio operations, while not affecting the user's perception of the device's responsiveness. The increased efficiency of the user interface and the reduced occurrence and duration of erroneous audio operations both reduce energy usage by the device, which is particularly important for battery powered devices where reduced energy usage increases battery life.

Figure 44C:
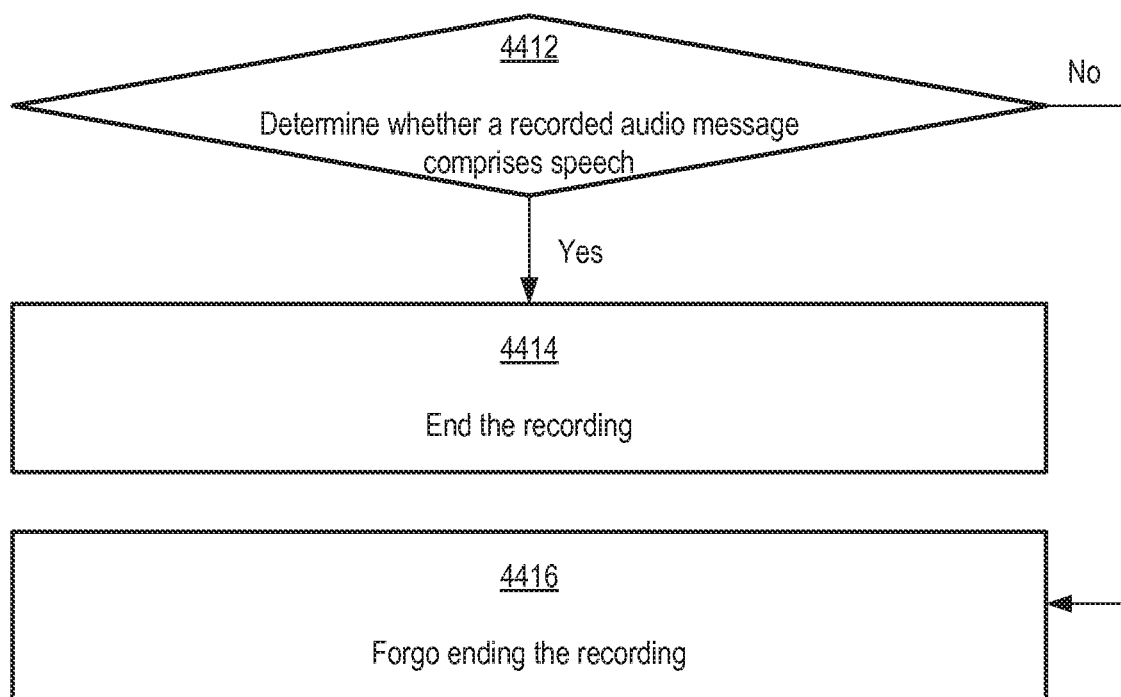

Turning to FIG. 44C, in some embodiments, block 4006 of process 4000 (FIG. 40) includes optional processes 4412-4416. Recall, as discussed above, the device may initiate recording of a new message as a result of upstream processing. At block 4412, the device determines whether the message includes speech. To detect speech, the device optionally compares a detected signal to known characteristics of speech waveforms: if recorded data includes known characteristic(s) of speech waveforms, the device determines the message includes speech; if no such characteristic(s) in the data, the device determines the message does not include speech. At block 4414, the device ends recording of the message in accordance with a determination that the message does not include speech. Ending the audio operation optionally includes ceasing to playback audio and/or ceasing to record audio; optionally, deleting any already recorded audio; optionally, storing the already recorded audio and prompting a user to deliver the recorded audio. At block 4416, the device forgoes ending recording of the message, in accordance with a determination that the message does include speech.

Figure 45A:
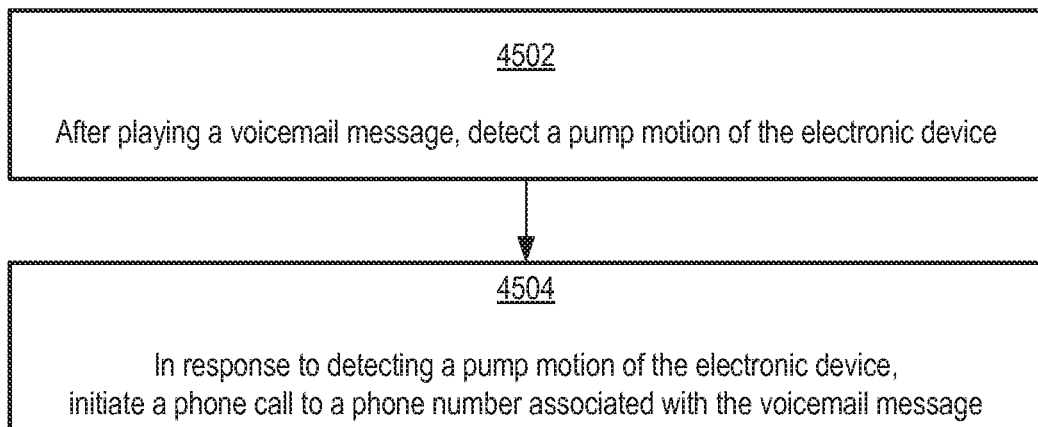
FIGS. 45A-45C are flow diagrams illustrating processes for initiating an audio operation.

Turning to FIG. 45A, in some embodiments, optional processes 4502-4504 are performed at block 4006 of process 4000 (FIG. 40). After playing a voicemail message, the device, at block 4502, detects a pump motion of the electronic device. The pump motion optionally includes a downward motion, followed by an upward motion (e.g., a motion that meets the audio-operation criteria). An exemplary pump motion is illustrated in FIGS. 22A-22C. At block 4504, the device initiates, in response to detecting the pump motion, a phone call to a phone number associated with the voicemail message (e.g., the device makes a return phone call).

Figure 45B:
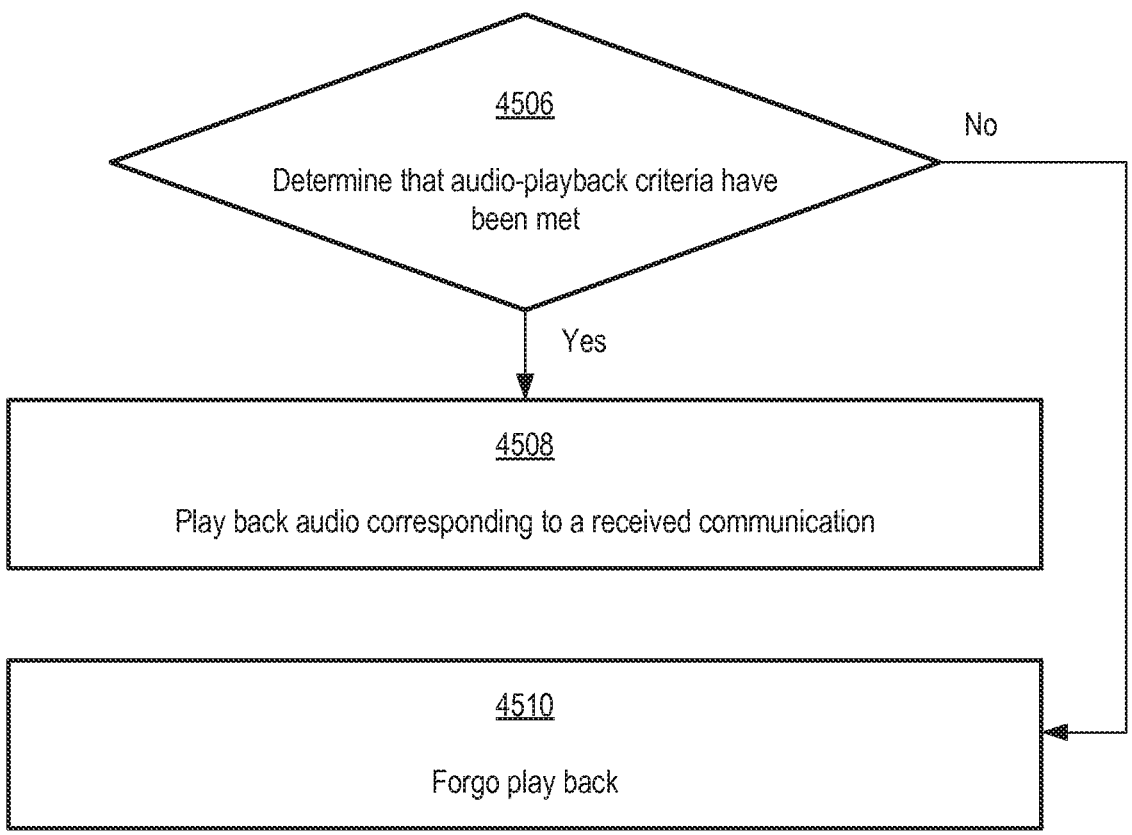

Turning to FIG. 45B, in some embodiments, optional processes 4506-4510 are performed at block 4006 of process 4000 (FIG. 40). At block 4506, the device determines that audio play-back criteria have been met. At block 4508, the devices plays, in accordance with a determination that audio-playback criteria have been met, audio corresponding to a received communication. In some embodiments, the audio-playback criteria include a criterion that is met when the communication includes audio component that has not been previously played on the device. In some embodiments, the audio-playback criteria include a criterion that is met when the communication was received within a predetermined time period from when the change in device context was detected. In some embodiments, the audio-playback criteria include a criterion that is met when the communication corresponds to a communication alert that was displayed on the display of the device when the change in device context was detected (e.g., a pop-up notification on a user interface lock screen, a pop-up notification overlaid on another user interface displayed on the display, or message in a conversation). At block 4508, the devices forgoes playback, in accordance with a determination that audio-playback criteria has not been met.

Figure 45C:
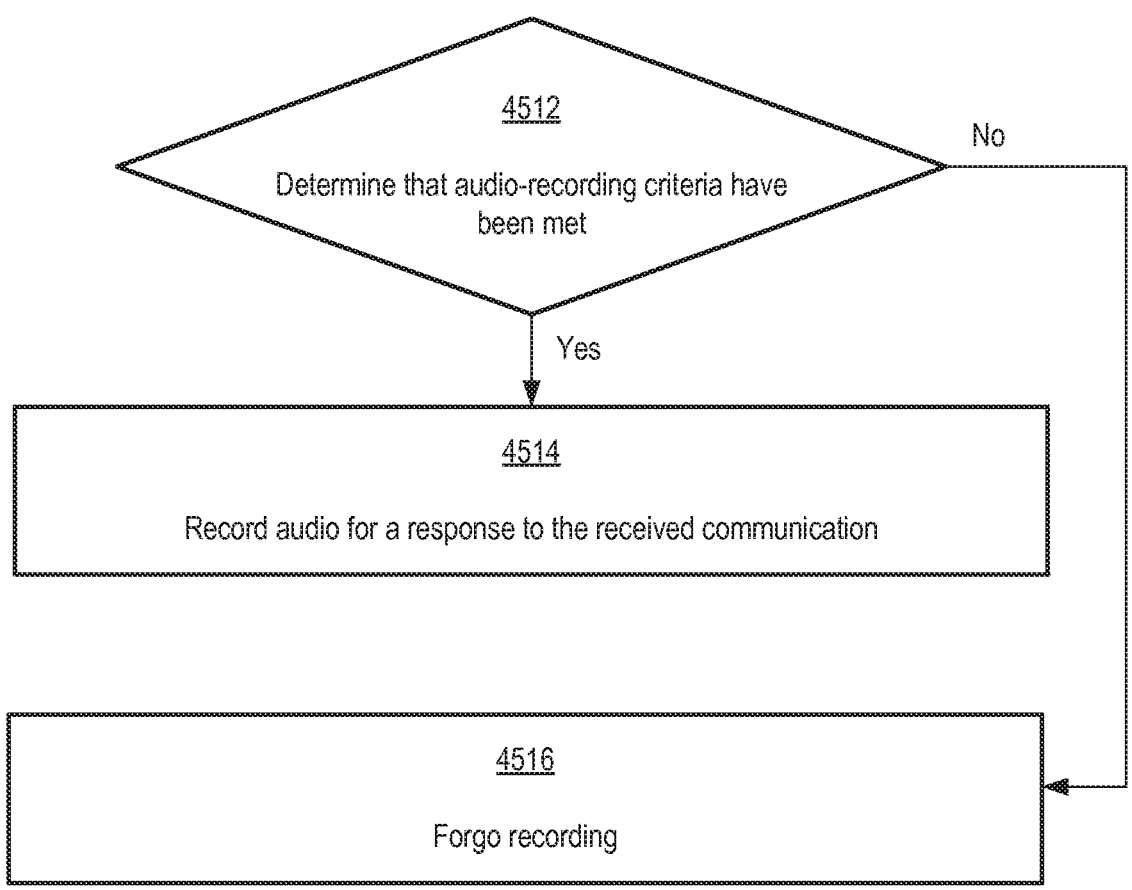

Turning to FIG. 45C, in some embodiments, optional processes 4512-4516 are performed at block 4006 of process 4000 (FIG. 40). At block 4512, the device determines that audio recording criteria have been met. At block 4514, the device records, in accordance with determination that audio-recording criteria have been met, audio for a response to the received communication. In some embodiments, the audio-record criteria include a criterion that is met when a user interface for a communication application is displayed on the display (e.g., a phone-dialer application, a conversation of a multi-media messaging application in which at least one audio message has been sent or received). In some embodiments, the audio-record criteria include a criterion that is met when an audio component of a message was played within a predetermined time period of when the change in device context was detected. At block 4516, the device forgoes recording, in accordance with a determination that audio-recording criteria has not been met.

Note that details of the processes described above with respect to process 4000 (e.g., FIGS. 40-45, 21, and 22) are also applicable in an analogous manner to the processes described herein. For example, processes 3300, 3400, 3500, 3600, 3700, 3800, 3900, 4600, and 4900 may include one or more of the characteristics of the various processes described above with reference to process 4000. For brevity, these details are not repeated in the descriptions of the other processes. The various methods and techniques described above with reference to process (method) 4000 may be optionally implemented as one or more units, such as those described with regard to FIG. 50.

FIG. 46 is a flow diagram illustrating process 4600 for sending a message. Process 4600 is performed at an electronic device (e.g., device 100) with a display (e.g., display 112 of device 100) and at least one microphone (e.g., microphone 113 of device 100), in some embodiments. At block 4602, the device detects one or more conditions that are interpreted as a request to record an audio message for a designated contact. A designated contact optionally includes a person in Contacts, e-mail, and a phone number associated with a received message or voicemail. However, an application that is responsive to voice input, without more, should not be considered a "contact." A designated contact is a contact that is identified (e.g., designated) by a user or by device 100. At block 4604, the devices generates an audio recording using the at least one microphone, in response to detecting the one or more conditions. At block 4606, the device determines whether the audio recording meets rejection criteria. At block 4608, the device sends the audio recording to the designated contact, in accordance with a determination that the rejection criteria is not satisfied. At block 4610, the device forgoes sending the audio recording to the designated contact, in accordance with a determination that the rejection criteria is satisfied.

Advantageously, process 4600 can reduce sending of erroneous messages. By monitoring an in-progress audio recording for rejection criteria, the device beneficially determines that a user has inadvertently activated an audio recording or changed his or her mind during the recording. This has the effect of improving customer satisfaction with a messaging system. The increased efficiency of the user interface and the reduced occurrence and duration of erroneous audio operations both reduce energy usage by the device, which is particularly important for battery powered devices where reduced energy usage increases battery life.

The one or more conditions in block 4602 optionally include a change in device context or a user input such as a raising gesture described in greater detail above with reference to process 4000 (FIG. 40), or other input while in a messaging context such as having a multimedia messaging application displayed on the display.

In some embodiments, the rejection criteria in block 4606 is met when the duration of the audio recording exceeds a predetermined duration of time (e.g., 15 seconds). This feature advantageously prevents sending audio recordings when the user is distracted.

Figure 47A:
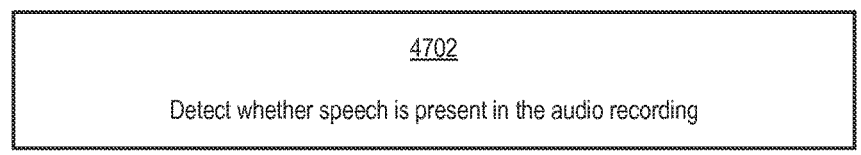
FIGS. 47A-47D are flow diagrams illustrating processes for sending an audio recording.

FIG. 47A-47D are flow diagrams illustrating optional sub-processes within block 4606 of process 4600 (FIG. 46). Turning to FIG. 47A, in some embodiments, optional process 4702 is performed at block 4606 of process 4600 (FIG. 46). At block 4702, the device detects whether speech is present in the audio recording. The rejection criteria is met when the audio recording is determined not to include more than a threshold amount. A threshold amount is optionally an absolute amount or a relative amount such as percentage. In some embodiments, the threshold amount is an energy threshold, such as short-time energy and zero-crossing rate. In some embodiments, the threshold amount is based on a speech model. In some embodiments, the rejection criteria is met when no sound (above a noise filter threshold) is detected.

Attention is now directed to rejection criteria based on a position of the device. In some embodiments, the rejection criteria is met when the electronic device is within a distance threshold from a sound source. Optionally, the device determines whether the electronic device is within the distance threshold by determining whether a proximity sensor (e.g., proximity sensor 166 of device 100) of the device has detected an object within the distance threshold of the device.

Figure 47B:
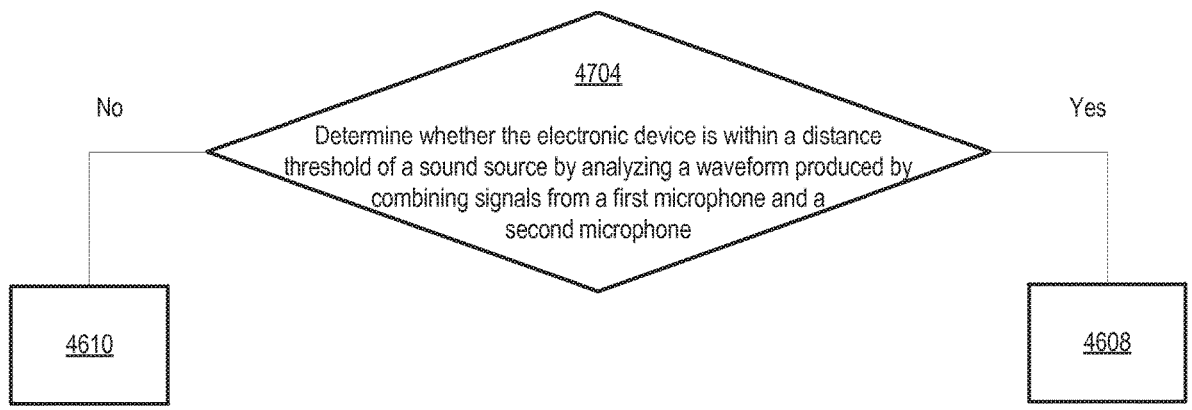

Turning to FIG. 47B, in some embodiments, optional process 4704 is performed at block 4606 of process 4600 (FIG. 46). At block 4704, the device determines whether the electronic device is within a distance threshold of a sound source by analyzing a waveform produced by combining signals captured by a first microphone and a second microphone (for example, evaluating, via beamforming, base attenuation in the formed beam, where the evaluation is optionally based on equalization of a near field beam). If the device is not within the distance threshold, block 4704 (and thus block 4606) produces an output of "no," processing proceeds to block 4610 where the device ends the recording that is in progress. If the device is within the distance threshold, block 4704 provides an outcome of "yes" and, if other requirements within block 4604 are also met, then processing proceeds to block 4608, where the device optionally continues to record and send the recorded message.

Figure 47C:
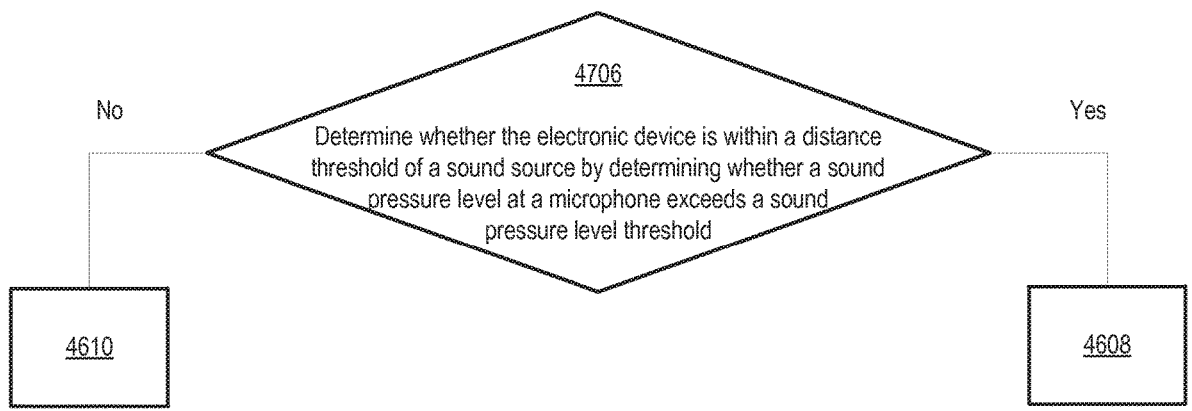

Turning to FIG. 47C, in some embodiments, optional process 4706 is performed at block 4606 of process 4600 (FIG. 46). At block 4706, the device determines whether the electronic device is within the distance threshold by determining whether a sound pressure level at the at least one microphone exceeds a sound pressure level threshold. In some embodiments, the sound pressure level threshold is based on a function (e.g., average over time, reference levels for whispering, speaking loudly, speaking softly, normal tone, etc.) of sound pressure levels previously detected by the electronic device. If the device is not within the distance threshold, block 4706 (and thus block 4606) produces an output of "no", processing proceeds to block 4610 where the device ends the recording that is in progress. If the device is within the distance threshold, block 4704 provides an outcome of "yes" and, if other requirements within block 4604 are also met, then processing proceeds to block 4608, where the device may continue to record and send the recorded message.

Figure 47D:
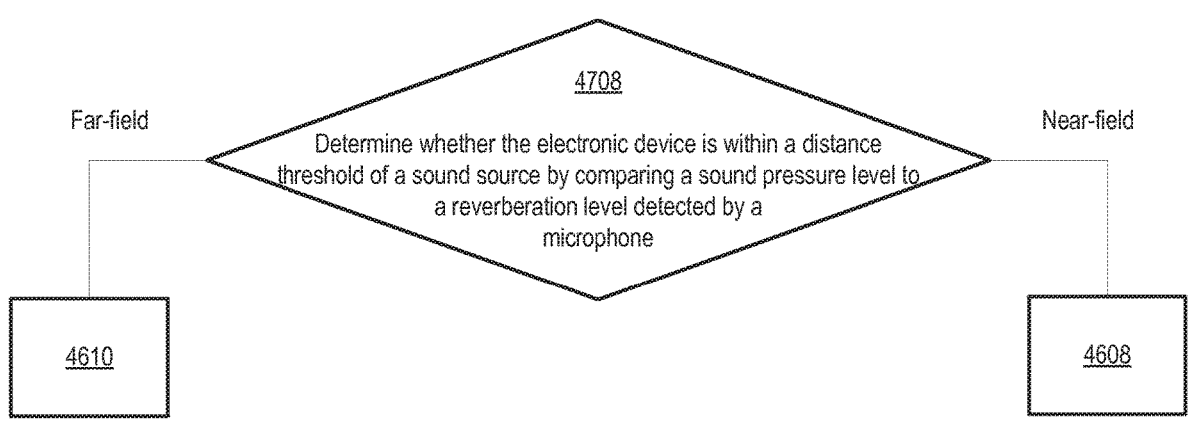

Turning to FIG. 47D, in some embodiments, optional process 4708 is performed at block 4606 of process (FIG. 46). At block 4708, the device determines whether the electronic device is within the distance threshold by comparing (e.g., calculating a ratio of direct speech energy to reverberation energy, and comparing the ratio to a threshold) a sound pressure level to a reverberation level detected by the at least one microphones. If the ratio is indicative of far-field acoustics, processing proceeds to block 4610 where the device ends the recording that is in progress. If the ratio is indicative of near-field acoustics, and if other requirements within block 4604 are also met, then processing proceeds to block 4608, where the device may continue to record and send the recorded message.

Although the description herein is offered primarily with respect to an audio operation, it should be appreciated that the systems and methods described can be extended to other operations. For example, determining the position of a phone can be utilized in other applications and can be presented as platform service to provide information on whether the phone is near a user or far away from a user. Such information can be used, for example, to set a volume of a ringtone.

In some embodiments, the rejection criteria is based on an orientation of the electronic device. In some embodiments, the electronic device includes a speaker (e.g., speaker 111 of device 100) positioned on a surface of the device and the rejection criteria is met when the surface faces down (e.g., relative to gravity). In some embodiments, the electronic device includes an earpiece and the rejection criteria is met when the microphone is positioned above the earpiece (e.g., relative to gravity).

In some embodiments, the rejection criteria is met when a characteristic movement of the electronic device exceeds a threshold. The characteristic movement optionally includes a gyroscope and/or accelerometer output over time (average), peak movement, duration of movement, or repetition in movement (such as wiping phone on sleeve).

In some embodiments, determining whether the audio recording meets rejection criteria is in response to detecting one or more conditions that are interpreted as a request to send the audio recording to the designated contact. In some embodiments, the determination is performed after recording the audio (e.g., after a brief segment of audio has been recorded). In some embodiments, the determination is performed while recording the audio (e.g., so as to terminate recording of a long audio segment when the user does not intend to be recording audio).

Figures 48A, 48B:
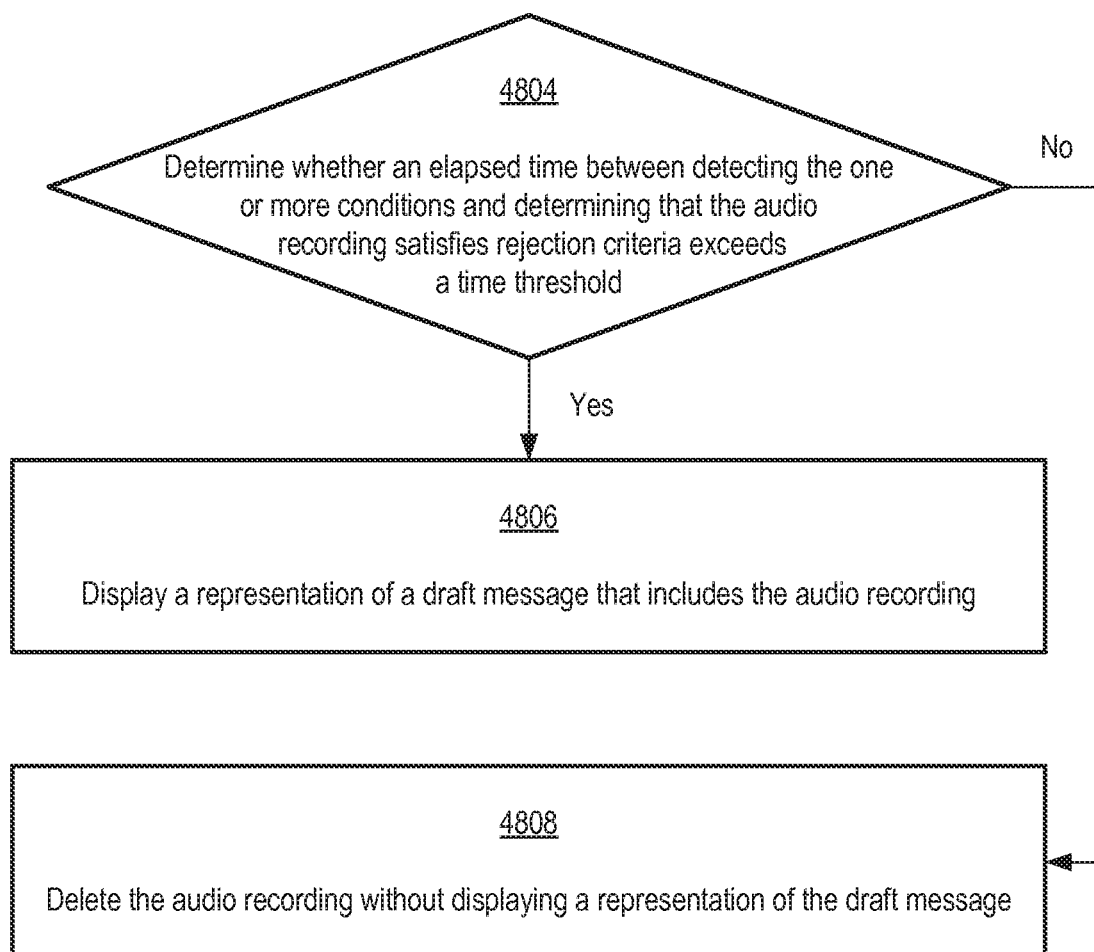
FIGS. 48A-48B are flow diagrams illustrating processes for sending an audio recording.

FIG. 48A-48B are flow diagrams illustrating optional sub-processes within block 4610 of process 4600 (FIG. 46) in some embodiments. Turning to FIG. 48A, optional process 4802 may be performed at block 4610 of process 4600 (FIG. 46). At block 4802, when the audio recording satisfies the rejection criteria, the device concurrently displays a representation of a draft message that includes the audio recording and a send affordance. (This aspect is illustrated on device 100 in FIG. 22D). Upon detecting a user selection of the send affordance, the device sends the draft message to the designated contact.

Turning to FIG. 48B, in some embodiments, optional processes 4804-4808 are performed at block 4610 of process 4600 (FIG. 46). At block 4804 (FIG. 48B), when the audio recording satisfies the rejection criteria, the device determines whether an elapsed time between detecting the one or more conditions (e.g. receiving the user input or starting to record the audio) and determining that the audio recording satisfies rejection criteria exceeds a time threshold. At block 4806, the device, in accordance with a determination that the elapsed time exceeds the time threshold, displays a representation of a draft message that includes the audio recording (for example, the user interface of device 100 in FIG. 22D). At block 4808, the device deletes, in accordance with a determination that the elapsed time does not exceed the time threshold, the audio recording without displaying the representation of the draft message. For example, if the recording of the audio message is determined to be an error shortly after starting to record the audio or shortly after finishing recording the audio, then the audio message is deleted and the user is not bothered with displaying a draft audio message. In this instance, there is a high likelihood that the recording was initiated in error and this embodiment eliminates the need to bother a user with a likely unintended recording. However, if the recording of the audio message is determined to be an error more than the threshold time after recording the audio or after starting to record the audio, the audio message is saved as a draft that is available for sending by the user, so as to avoid confusing or frustrating the user.

Note that details of the processes described above with respect to process 4600 (e.g., FIGS. 46-48, 21, and 22) are also applicable in an analogous manner to the processes described herein. For example, processes 3300, 3400, 3500, 3600, 3700, 3800, 3900, 4000, and 4900 may include one or more of the characteristics of the various processes described above with reference to process 4600. For brevity, these details are not repeated in the descriptions of the other processes. The various methods and techniques described above with reference to process (method) 4600 may be optionally implemented as one or more units, such as those described with regard to FIG. 50.

FIG. 49 is a flow diagram illustrating process 4900 for capturing and sending media. Process 4900 may be performed at an electronic device with a display and a touch-sensitive surface, like device 100 (FIG. 2). At block 4902, the device displays on the display, a media affordance, a message compose field, and a message region for displaying messages sent between participants in a message conversation. At block 4904, the device detects a contact at a location that corresponds to the location of the media affordance. At block 4906, in response to detecting the contact, the device displays a media preview in the message compose field. At block 4908, the device detects a liftoff of the contact. At block 4910, in response to detecting the liftoff, the device captures the media displayed in the media preview, and sends the captured media to a participant in the message conversation. Optionally, the device displays a send button for sending the message. The captured media is sent to the participant in response to detecting a contact at a location corresponding to the send button. Optionally, the captured media is sent in response to detecting the liftoff. Optionally, in response to detecting the liftoff, a representation of the captured media is displayed in the message compose field. The device detects user entry of additional content in the message compose field. The additional content and the captured media are sent to the participant in response to detecting the contact.

Note that details of the processes described above with respect to process 4900 (e.g., FIGS. 49 and 11C-E) are also applicable in an analogous manner to the processes described herein. For example, processes 3300, 3400, 3500, 3600, 3700, 3800, 3900, 4000, and 4600 may include one or more of the characteristics of the various processes described above with reference to process 4900. For brevity, these details are not repeated in the descriptions of the other processes. The various methods and techniques described above with reference to process (method) 4900 may be optionally implemented as one or more units, such as those described with regard to FIG. 50.

The operations described above with reference to FIGS. 33-49 are, optionally, implemented by components depicted in FIGS. 1A, 1B, 3, and 50. For example, detection operations, display operations, and determination operations are, optionally, implemented by one or more of event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A, 1B, 3, and 50.

The operations in the information processing methods described above are optionally implemented by running one or more functional modules in information processing apparatus such as general purpose processors or application specific chips. These modules, combinations of these modules, and/or their combination with general hardware (e.g., as described above with respect to FIGS. 1A, 1B, 3, and 50) are all included within the scope of protection of the invention.

Figure 50:
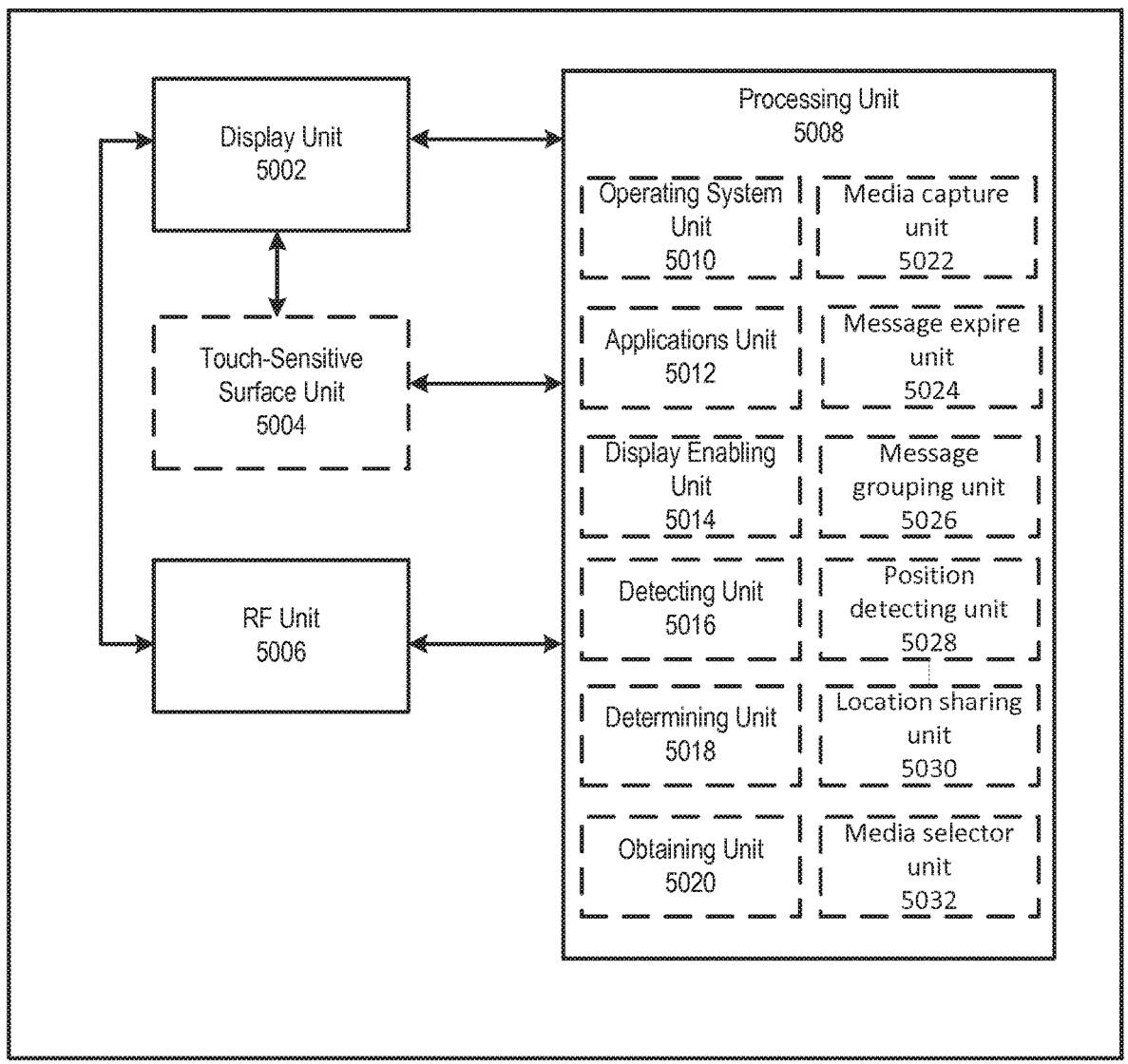
FIG. 50 illustrates a functional block diagram of an electronic device in accordance with some embodiments.

FIG. 50 shows exemplary functional blocks of an electronic device 5000 that, in some embodiments, performs the features described above. As shown in FIG. 50, an electronic device 5000 includes a display unit 5002 configured to display graphical objects; a touch-sensitive surface unit 5004 configured to receive user gestures; one or more RF units 5006 configured to detect and communicate with external electronic devices; and a processing unit 5008 coupled to display unit 5002, touch-sensitive surface unit 5004, and RF unit(s) 5006. In some embodiments, processing unit 5008 is configured to support an operating system 5010 for launching and running one or more applications 5012.

In some embodiments, the processing unit 5008 includes a display enabling unit 5014, a detecting unit 5016, a determining unit 5018, and an obtaining unit 5020.

In some embodiments, the display enabling unit 5014 is configured to cause a display of a user interface (or portions of a user interface) in conjunction with the display unit 5002. For example, the display enabling unit 5014 is optionally used for: displaying messages sent between participants in a message conversation; displaying a send affordance, a cancel affordance, and a record affordance; displaying a visually distinguished region; displaying a representation of a first audio message received from a first participant in a message conversation; displaying a single group bounded message area representing the plurality of messages; displaying a representation of the first message on the display, wherein the first message is scheduled to be deleted upon satisfaction of expiration criteria; displaying an affordance for keeping the first message; displaying a share-location affordance for sharing the location of the first participant with the second participant as the location changes over at least a predetermined time period; displaying a user send message affordance; displaying a representation of a draft message; displaying a media selection interface concurrently with at least a portion of the message conversation, wherein the media selection interface includes a plurality of affordances for selecting media for addition to the message conversation, at least a subset of the plurality of affordances including thumbnail representations of media available for adding to the message conversation; displaying a media preview in the message compose field.

In some embodiments, the detecting unit 5016 is configured to receive input, e.g., through the use of touch-sensitive surface unit 5004. For example, the detecting unit 5016 is optionally used for: detecting a contact and detecting a swipe.

In some embodiments, the determining unit 5018 is configured to make determinations. For example, determining unit 5018 is optionally used for: determining whether the contact moved to a location on the touch-sensitive surface that corresponds to a location of the send affordance; and determining whether the plurality of messages meets message grouping criteria.

In some embodiments, the obtaining unit 5020 is configured to obtain information. For example, the obtaining unit 5020 is optionally used for obtaining movement or proximity sensor readings of the external device.

In some embodiments, the media capture unit 5022 is configured to capture media. For example, the media capture unit 5022 may be used for: sending media captured in response to at least a portion of the gesture to a participant in the message conversation; beginning to record a video; and recording a second audio message.

In some embodiments, the message expire unit 5024 is configured to determine whether messages meet a message expiration criteria and remove expired messages from a conversation. For example, the message expire unit 5024 may be used for: displaying a representation of the first message on the display, wherein the first message is scheduled to be deleted upon satisfaction of expiration criteria; in accordance with a determination that the affordance was selected prior to the satisfaction of the expiration criteria, keeping the first message; and in accordance with a determination that the expiration criteria has been satisfied without detecting selection of the affordance, ceasing to display the representation of the first message on the display.

In some embodiments, the message grouping unit 5026 is configured to determine whether messages meet a message grouping criteria. For example, the message grouping unit 5026 may be used for: determining whether the plurality of messages meets message grouping criteria; in accordance with a determination that the plurality of messages does not meet the message grouping criteria, displaying a plurality of separate bounded message areas representing the plurality of messages; and in accordance with a determination that the plurality of messages meets the message grouping criteria, displaying a single group bounded message area representing the plurality of messages.

In some embodiments, the position detecting unit 5028 is configured to detect the position of the device. For example, the position detecting unit 5028 may be used for: detecting a request to play the first audio message; detecting a raising of the device; in response to detecting the raising of the device, recording a second audio message; and after recording the second audio message, sending the second audio message to the first participant.

In some embodiments, the location sharing unit 5030 is configured to share location information. For example, the location sharing unit 5030 may be used for: detecting a selection of the share-location affordance; and in response to detecting the selection of the share-location affordance: providing the second participant with information enabling the second participant to determine a current location of the first participant during at least the predetermined time period.

In some embodiments, the media selector unit 5032 is configured to provide interfaces for selecting media to add to a conversation. For example, the media selector unit 5032 may be used for: receiving a request to add media to the message conversation; in response to receiving the request, displaying a media selection interface concurrently with at least a portion of the message conversation, wherein the media selection interface includes a plurality of affordances for selecting media for addition to the message conversation, at least a subset of the plurality of affordances including thumbnail representations of media available for adding to the message conversation; detecting selection of a respective affordance from the plurality of affordances; and in response to detecting selection of the respective affordance, selecting corresponding media for addition to the message conversation.

The units of FIG. 50 are optionally used to implement the various techniques and methods described above with respect to FIGS. 5A-49.

The functional blocks of the device 5000 are, optionally, implemented by hardware, software, or a combination of hardware and software to carry out the principles of the various described examples. It is understood by persons of skill in the art that the functional blocks described in FIG. 50 are, optionally, combined or separated into sub-blocks to implement the principles of the various described examples. Therefore, the description herein optionally supports any possible combination or separation or further definition of the functional blocks described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
receiving a plurality of messages from a first participant within a time interval;
determining whether the plurality of messages meets message grouping criteria;
in accordance with a determination that the plurality of messages does not meet the message grouping criteria, displaying representations of the content of the plurality of messages in a plurality of separate message areas in a first region of the display, wherein each respective separate message area includes a representation of the content of a respective message of the plurality of messages; and
in accordance with a determination that the plurality of messages meets the message grouping criteria, displaying the representations of the content of the plurality of messages in a group message area, wherein the group message area is smaller in area than the first region.

2. The electronic device of claim 1, wherein the message grouping criteria include a criterion that is met when the number of messages in the plurality of messages exceeds a numeric threshold.

3. The electronic device of claim 1, wherein the message grouping criteria include a criterion that is met when the plurality of messages are spaced apart from each other by less than a threshold amount of time.

4. The electronic device of claim 1, wherein the message grouping criteria include a criterion that is met when the plurality of messages are sequentially adjacent messages.

5. The electronic device of claim 4, wherein sequentially adjacent messages are messages that are received from a single participant without any intervening received messages from other participants.

6. The electronic device of claim 4, wherein sequentially adjacent messages are messages of the same type that are received without any intervening received messages of a different type.

7. The electronic device of claim 1, wherein a message of the plurality of messages is an audio message, and wherein displaying the representations of the content of the plurality of messages includes displaying a waveform image corresponding to the audio message, the waveform image having a waveform representing the contents of the audio message.

8. The electronic device of claim 7, wherein displaying the waveform image comprises:
displaying the waveform in an initial color;
receiving a request to play the audio message; and
in response to receiving the request to play the audio message:
playing the audio message, and
changing a color of at least a portion of the waveform during playback to indicate the portion of the audio message that has been played.

9. The electronic device of claim 1, wherein the representations of the content of the plurality of messages displayed in the group message area include representations of at least two audio messages, the one or more programs further including instructions for:
receiving a request to sequentially play the at least two audio messages, and
in response to receiving the request, sequentially playing the at least two audio messages.

10. The electronic device of claim 1, the one or more programs further including instructions for:
detecting a selection of the group message area; and
in response to detecting the selection of the group message area, replacing the display of the representations of the content of the plurality of messages in the group message area with display of representations of the content of the plurality of messages in a second plurality of separate message areas in a second region of the display, wherein each respective separate message area of the second plurality of separate message areas includes a representation of the content of a respective message of the plurality of messages, and wherein the second region of the display is larger in area than the group message area.

11. The electronic device of claim 1, wherein the representations of the content of the plurality of messages displayed in the group message area include text representing a first message of the plurality of messages and an image thumbnail representing a second message of the plurality of messages, the one or more programs further including instructions for:
detecting a contact at a location on the touch-sensitive surface that corresponds to a location of the displayed image thumbnail; and
in response to detecting the contact at the location that corresponds to the displayed image thumbnail, displaying a larger version of the image represented by the image thumbnail.

12. The electronic device of claim 11, wherein displaying a larger version of the image comprises displaying the image as a full-screen image.

13. The electronic device of claim 1, wherein the representations of the content of the plurality of messages displayed in the group message area include text representing a first message of the plurality of messages and an image thumbnail representing a video message in the plurality of messages, the one or more programs further including instructions for:
  detecting a contact at a location on the touch-sensitive surface that corresponds to the location of the displayed image thumbnail; and
  in response to detecting the contact at the location on the touch-sensitive surface that corresponds to the location of the image thumbnail, playing the video message represented by the image thumbnail.

14. The electronic device of claim 13, wherein playing the video message comprises playing the video message in full-screen mode.

15. The electronic device of claim 13, wherein playing the video message comprises playing the video message within the group message area.

16. The electronic device of claim 1, wherein the representations of the content of the plurality of messages displayed in the group message area include text representing a first message of the plurality of messages and a waveform image representing an audio message in the plurality of messages, the one or more programs further including instructions for:
  displaying a playback affordance in the group message area, the playback affordance associated with the waveform image;
  detecting a contact at a location on the touch-sensitive surface that corresponds to a location of the playback affordance within the displayed group message area; and
  in response to detecting the contact at the location on the touch-sensitive surface that corresponds to the location of the playback affordance, playing the audio message represented by the waveform image.

17. A method, comprising:
  at an electronic device comprising a touch-sensitive surface and a display:
    receiving a plurality of messages from a first participant within a time interval;
    determining whether the plurality of messages meets message grouping criteria;
    in accordance with a determination that the plurality of messages does not meet the message grouping criteria, displaying representations of the content of the plurality of messages in a plurality of separate message areas in a first region of the display, wherein each respective separate message area includes a representation of the content of a respective message of the plurality of messages; and
    in accordance with a determination that the plurality of messages meets the message grouping criteria, displaying the representations of the content of the plurality of messages in a group message area, wherein the group message area is smaller in area than the first region.

18. The method of claim 17, wherein the message grouping criteria include a criterion that is met when the number of messages in the plurality of messages exceeds a numeric threshold.

19. The method of claim 17, wherein the message grouping criteria include a criterion that is met when the plurality of messages are spaced apart from each other by less than a threshold amount of time.

20. The method of claim 17, wherein the message grouping criteria include a criterion that is met when the plurality of messages are sequentially adjacent messages.

21. The method of claim 20, wherein sequentially adjacent messages are messages that are received from a single participant without any intervening received messages from other participants.

22. The method of claim 20, wherein sequentially adjacent messages are messages of the same type that are received without any intervening received messages of a different type.

23. The method of claim 17, wherein a message of the plurality of messages is an audio message, and wherein displaying the representations of the content of the plurality of messages includes displaying a waveform image corresponding to the audio message, the waveform image having a waveform representing the contents of the audio message.

24. The method of claim 23, wherein displaying the waveform image comprises:
  displaying the waveform in an initial color;
  receiving a request to play the audio message; and
  in response to receiving the request to play the audio message:
    playing the audio message, and
    changing a color of at least a portion of the waveform during playback to indicate the portion of the audio message that has been played.

25. The method of claim 17, wherein the representations of the content of the plurality of messages displayed in the group message area include representations of at least two audio messages, the method further comprising:
  receiving a request to sequentially play the at least two audio messages, and
  in response to receiving the request, sequentially playing the at least two audio messages.

26. The method of claim 17, further comprising:
  detecting a selection of the group message area; and
  in response to detecting the selection of the group message area, replacing the display of the representations of the content of the plurality of messages in the group message area with display of representations of the content of the plurality of messages in a second plurality of separate message areas in a second region of the display, wherein each respective separate message area of the second plurality of separate message areas includes a representation of the content of a respective message of the plurality of messages, and wherein the second region of the display is larger in area than the group message area.

27. The method of claim 17, wherein the representations of the content of the plurality of messages displayed in the group message area include text representing a first message of the plurality of messages and an image thumbnail representing a second message of the plurality of messages, the method further comprising:
  detecting a contact at a location on the touch-sensitive surface that corresponds to a location of the displayed image thumbnail; and
  in response to detecting the contact at the location that corresponds to the displayed image thumbnail, displaying a larger version of the image represented by the image thumbnail.

28. The method of claim 27, wherein displaying a larger version of the image comprises displaying the image as a full-screen image.

29. The method of claim 17, wherein the representations of the content of the plurality of messages displayed in the group message area include text representing a first message of the plurality of messages and an image thumbnail representing a video message in the plurality of messages, the method further comprising:

detecting a contact at a location on the touch-sensitive surface that corresponds to the location of the displayed image thumbnail; and in response to detecting the contact at the location on the touch-sensitive surface that corresponds to the location of the image thumbnail, playing the video message represented by the image thumbnail.

30. The method of claim 29, wherein playing the video message comprises playing the video message in full-screen mode.

31. The method of claim 29, wherein playing the video message comprises playing the video message within the group message area.

32. The method of claim 17, wherein the representations of the content of the plurality of messages displayed in the group message area include text representing a first message of the plurality of messages and a waveform image representing an audio message in the plurality of messages, the method further comprising:

displaying a playback affordance in the group message area, the playback affordance associated with the waveform image;

detecting a contact at a location on the touch-sensitive surface that corresponds to a location of the playback affordance within the displayed group message area; and in response to detecting the contact at the location on the touch-sensitive surface that corresponds to the location of the playback affordance, playing the audio message represented by the waveform image.

33. A non-transitory computer-readable storage medium storing one or more programs, the one or more programs comprising instructions, which when executed by an electronic device with a display and a touch-sensitive surface, cause the device to:

receive a plurality of messages from a first participant within a time interval;

determine whether the plurality of messages meets message grouping criteria;

in accordance with a determination that the plurality of messages does not meet the message grouping criteria, display representations of the content of the plurality of messages in a plurality of separate message areas in a first region of the display, wherein each respective separate message area includes a representation of the content of a respective message of the plurality of messages; and in accordance with a determination that the plurality of messages meets the message grouping criteria, display the representations of the content of the plurality of messages in a group message area, wherein the group message area is smaller in area than the first region.

34. The non-transitory computer-readable storage medium of claim 33, wherein the message grouping criteria include a criterion that is met when the number of messages in the plurality of messages exceeds a numeric threshold.

35. The non-transitory computer-readable storage medium of claim 33, wherein the message grouping criteria include a criterion that is met when the plurality of messages are spaced apart from each other by less than a threshold amount of time.

36. The non-transitory computer-readable storage medium of claim 33, wherein the message grouping criteria include a criterion that is met when the plurality of messages are sequentially adjacent messages.

37. The non-transitory computer-readable storage medium of claim 36, wherein sequentially adjacent messages are messages that are received from a single participant without any intervening received messages from other participants.

38. The non-transitory computer-readable storage medium of claim 36, wherein sequentially adjacent messages are messages of the same type that are received without any intervening received messages of a different type.

39. The non-transitory computer-readable storage medium of claim 33, wherein a message of the plurality of messages is an audio message, and wherein displaying the representations of the content of the plurality of messages includes displaying a waveform image corresponding to the audio message, the waveform image having a waveform representing the contents of the audio message.

40. The non-transitory computer-readable storage medium of claim 39, wherein displaying the waveform image comprises:

displaying the waveform in an initial color;

receiving a request to play the audio message; and in response to receiving the request to play the audio message:

playing the audio message, and changing a color of at least a portion of the waveform during playback to indicate the portion of the audio message that has been played.

41. The non-transitory computer-readable storage medium of claim 33, wherein the representations of the content of the plurality of messages displayed in the group message area include representations of at least two audio messages, the one or more programs further comprising instructions which cause the device to:

receive a request to sequentially play the at least two audio messages, and in response to receiving the request, sequentially play the at least two audio messages.

42. The non-transitory computer-readable storage medium of claim 33, the one or more programs further comprising instructions which cause the device to:

detect a selection of the group message area; and in response to detecting the selection of the group message area, replace the display of the representations of the content of the plurality of messages in the group message area with display of representations of the content of the plurality of messages in a second plurality of separate message areas in a second region of the display, wherein each respective separate message area of the second plurality of separate message areas includes a representation of the content of a respective message of the plurality of messages, and wherein the second region of the display is larger in area than the group message area.

43. The non-transitory computer-readable storage medium of claim 33, wherein the representations of the content of the plurality of messages displayed in the group message area include text representing a first message of the plurality of messages and an image thumbnail representing a second message of the plurality of messages, the one or more programs further comprising instructions which cause the device to:

detect a contact at a location on the touch-sensitive surface that corresponds to a location of the displayed image thumbnail; and in response to detecting the contact at the location that corresponds to the displayed image thumbnail, display a larger version of the image represented by the image thumbnail.

44. The non-transitory computer-readable storage medium of claim 43, wherein displaying a larger version of the image comprises displaying the image as a full-screen image.

45. The non-transitory computer-readable storage medium of claim 33, wherein the representations of the content of the plurality of messages displayed in the group message area include text representing a first message of the plurality of messages and an image thumbnail representing a video message in the plurality of messages, the one or more programs further comprising instructions which cause the device to:
  detect a contact at a location on the touch-sensitive surface that corresponds to the location of the displayed image thumbnail; and
  in response to detecting the contact at the location on the touch-sensitive surface that corresponds to the location of the image thumbnail, play the video message represented by the image thumbnail.

46. The non-transitory computer-readable storage medium of claim 45, wherein playing the video message comprises playing the video message in full-screen mode.

47. The non-transitory computer-readable storage medium of claim 45, wherein playing the video message comprises playing the video message within the group message area.

48. The non-transitory computer-readable storage medium of claim 33, wherein the representations of the content of the plurality of messages displayed in the group message area include text representing a first message of the plurality of messages and a waveform image representing an audio message in the plurality of messages, the one or more programs further comprising instructions which cause the device to:
  display a playback affordance in the group message area, the playback affordance associated with the waveform image;
  detect a contact at a location on the touch-sensitive surface that corresponds to a location of the playback affordance within the displayed group message area; and
  in response to detecting the contact at the location on the touch-sensitive surface that corresponds to the location of the playback affordance, play the audio message represented by the waveform image.

* * * * *